US011479478B2

(12) United States Patent
Patey

(10) Patent No.: US 11,479,478 B2
(45) Date of Patent: *Oct. 25, 2022

(54) EVAPORATION PANEL SYSTEMS AND ASSEMBLIES

(71) Applicant: ECOVAP, INC., Provo, UT (US)

(72) Inventor: Michael J. Patey, Orem, UT (US)

(73) Assignee: ECOVAP, INC., Provo, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 16/784,434

(22) Filed: Feb. 7, 2020

(65) Prior Publication Data

US 2020/0277200 A1 Sep. 3, 2020

Related U.S. Application Data

(63) Continuation of application No. 15/809,920, filed on Nov. 10, 2017, now Pat. No. 10,556,809.

(Continued)

(51) Int. Cl.
*C02F 1/04* (2006.01)
*B01D 1/00* (2006.01)
(Continued)

(52) U.S. Cl.
CPC ............ *C02F 1/048* (2013.01); *B01D 1/0035* (2013.01); *B01D 1/0047* (2013.01); *B01D 1/0088* (2013.01); *B01D 1/14* (2013.01); *B01D 1/20* (2013.01); *B01D 1/221* (2013.01); *B01D 1/305* (2013.01); *B01D 5/0015* (2013.01);
(Continued)

(58) Field of Classification Search
CPC .... C02F 1/048; C02F 1/08; C02F 1/12; C02F 1/14; C02F 2201/008; F28F 25/04; F28F 25/06; F28F 3/08; F28F 2025/005; F28F 25/08; F28F 25/082; F28F 25/085; F28F 25/087; F28C 3/08; F28C 2001/006; B01D 1/0005; B01D 1/0035; B01D 1/0047; B01D 1/0088; B01D 1/14; B01D 1/20; B01D 1/221; B01D 1/26; B01D 1/305; B01D 5/0015; F28D 3/08; F28D 1/03; F28D 1/0366; Y02W 10/37; E04B 1/6116

See application file for complete search history.

(56) References Cited

U.S. PATENT DOCUMENTS 2,877,995 A   3/1959 Schleyer
3,751,017 A * 8/1973 Lemmens ............. F28F 25/085
                                                261/111

(Continued)

FOREIGN PATENT DOCUMENTS

GB          520064        4/1940

*Primary Examiner* — Gabriel E Gitman
(74) *Attorney, Agent, or Firm* — Thorpe North & Western, LLP

(57) ABSTRACT

The present disclosure evaporation panel systems including plurality of evaporation panels, wherein a first evaporation panel and a second evaporation panel of the plurality of evaporation panels each include evaporation shelves and support columns to support and separate to the evaporation shelves. At least a portion of the support columns include evaporation fins so that wastewater is loadable along the support column. The first evaporation panel and the second evaporation panel in this example are releasably connectable to one another to form a sub-assembly.

20 Claims, 41 Drawing Sheets

Related U.S. Application Data

(60) Provisional application No. 62/580,116, filed on Nov. 1, 2017, provisional application No. 62/541,573, filed on Aug. 4, 2017, provisional application No. 62/420,460, filed on Nov. 10, 2016.

(51) Int. Cl.

| | | |
|---|---|---|
| *F28F 25/04* | (2006.01) | |
| *F28F 25/06* | (2006.01) | |
| *F28C 3/08* | (2006.01) | |
| *B01D 1/22* | (2006.01) | |
| *B01D 1/14* | (2006.01) | |
| *B01D 1/20* | (2006.01) | |
| *B01D 1/30* | (2006.01) | |
| *C02F 1/12* | (2006.01) | |
| *C02F 1/14* | (2006.01) | |
| *B01D 5/00* | (2006.01) | |
| *F28D 1/03* | (2006.01) | |
| *F28F 3/08* | (2006.01) | |
| *F28C 1/00* | (2006.01) | |
| *E04B 1/61* | (2006.01) | |
| *F28F 25/00* | (2006.01) | |

(52) U.S. Cl.
CPC ............... *C02F 1/12* (2013.01); *C02F 1/14* (2013.01); *F28C 3/08* (2013.01); *F28D 1/03* (2013.01); *F28D 1/0366* (2013.01); *F28F 3/08* (2013.01); *F28F 25/04* (2013.01); *F28F 25/06* (2013.01); *B01D 1/0005* (2013.01); *C02F 2201/008* (2013.01); *E04B 1/6116* (2013.01); *F28C 2001/006* (2013.01); *F28F 2025/005* (2013.01); *Y02W 10/37* (2015.05)

(56) References Cited

U.S. PATENT DOCUMENTS

| | | | | |
|---|---|---|---|---|
| 4,713,172 | A * | 12/1987 | Horn | ............... C02F 3/24 |
| | | | | 210/150 |
| 4,728,468 | A * | 3/1988 | Duke | ............... B01J 19/32 |
| | | | | 261/111 |
| 10,562,789 | B2 | 2/2020 | Patey | |
| 10,562,790 | B2 | 2/2020 | Patey | |
| 2005/0230238 | A1 | 10/2005 | Klausner et al. | |
| 2013/0037223 | A1 | 2/2013 | Duesel, Jr. | |
| 2016/0229706 | A1 | 8/2016 | Ackerman | |

\* cited by examiner

T-shaped

T-shaped (asymmetrical)

Comb-shaped (U-shape)

Pi-shaped

Comb-shaped (E-shape)

L-shaped

Pi-shaped (5 teeth; asymmetrical; enlarged inter-panel space)

Comb-shaped (5 teeth)

Pi-shaped (6 teeth; secondary spine; enlarged inter-panel space)

Example Sub-assemblies

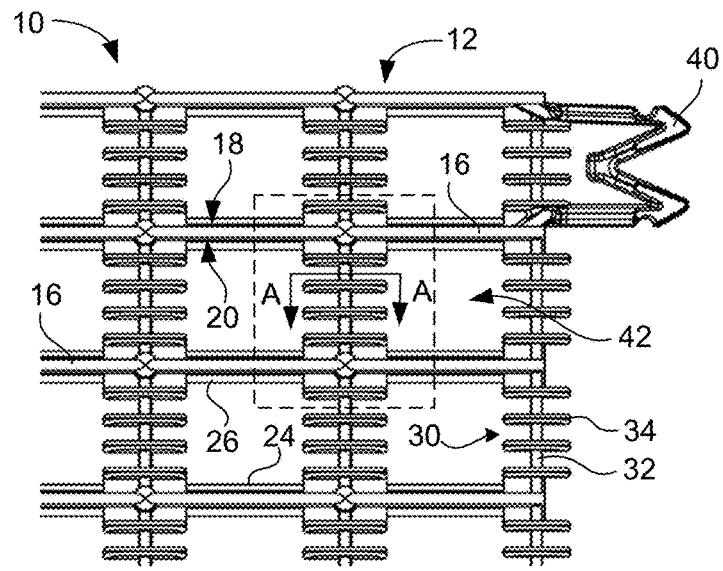
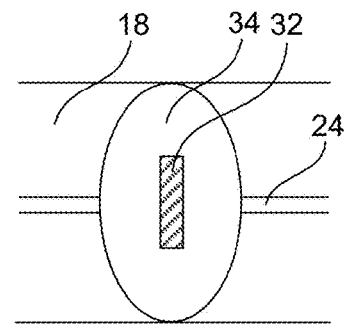
FIG. 13
FIG. 14
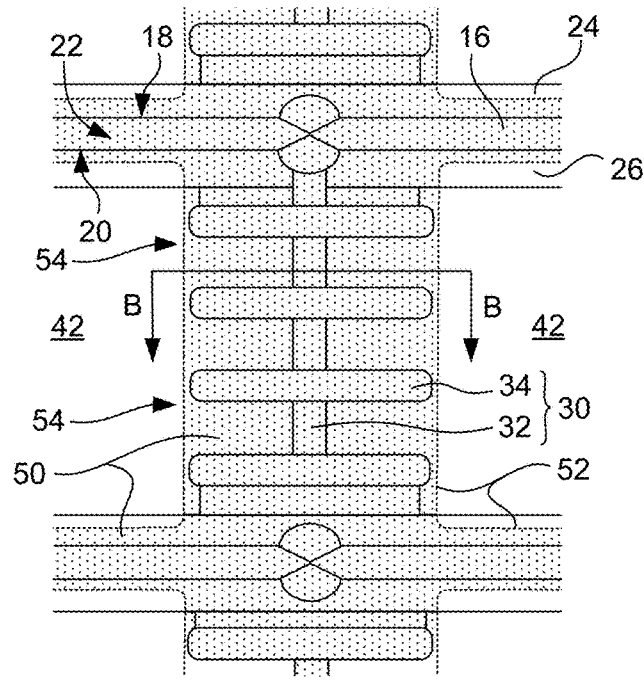
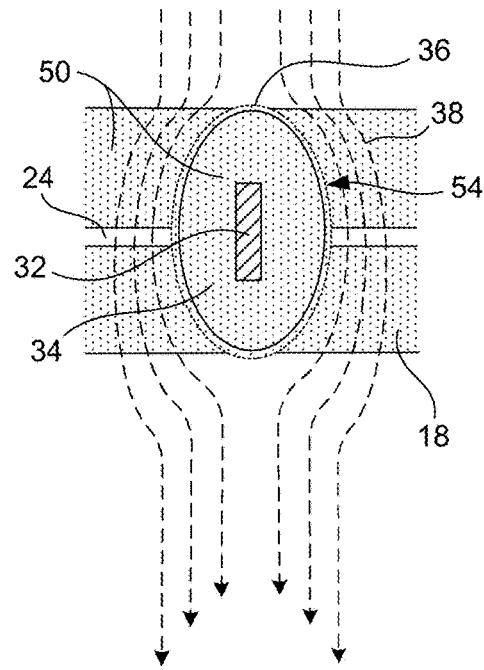
FIG. 15
FIG. 16

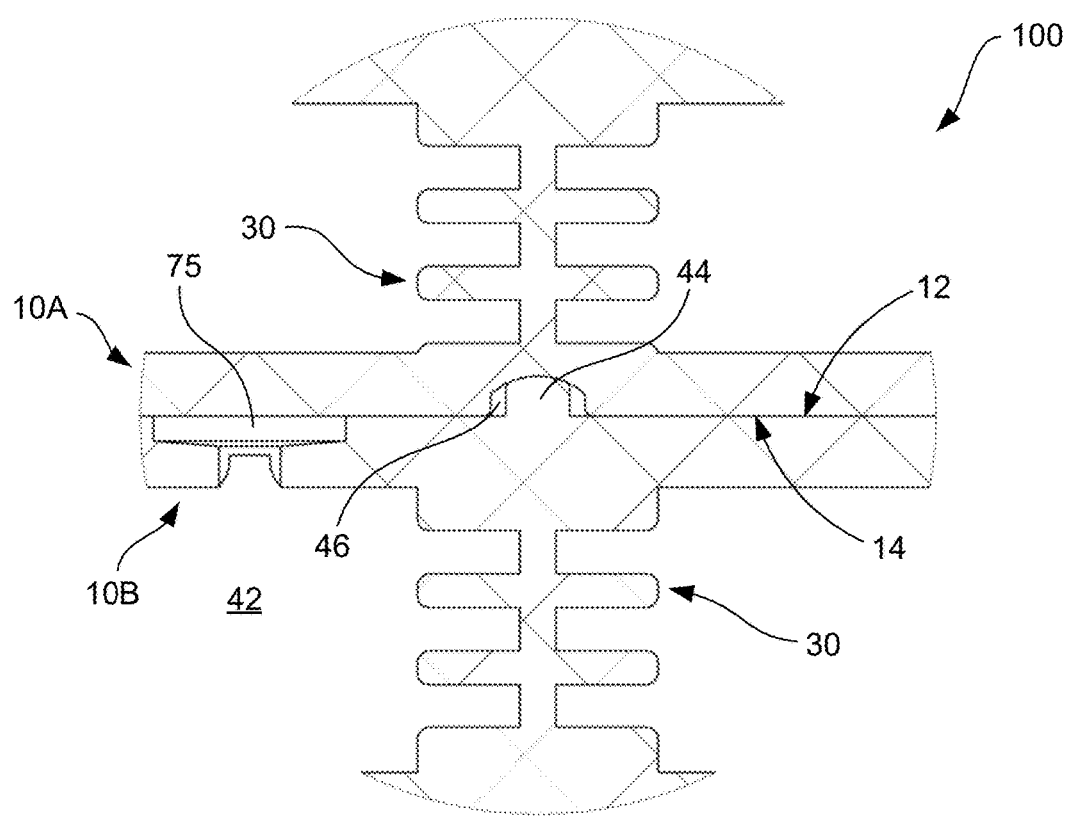
FIG. 29
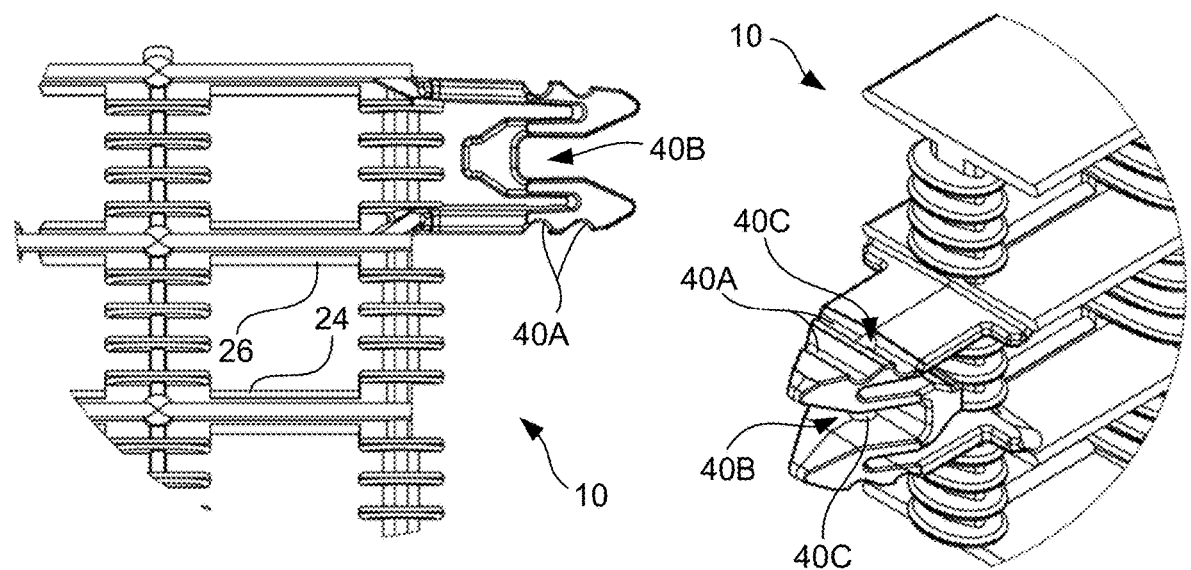
FIG. 30A
FIG. 30B

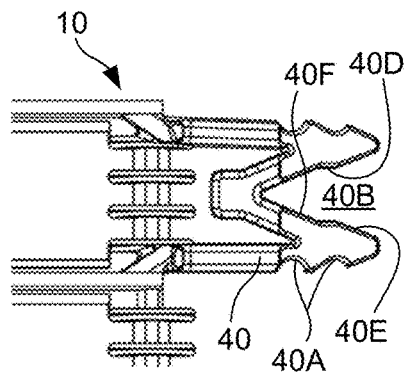
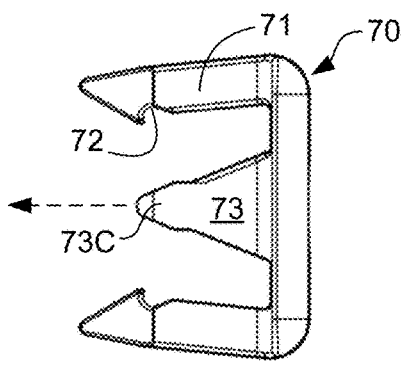
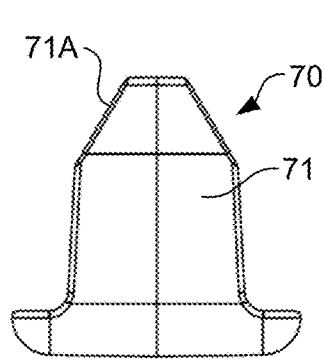
FIG. 32A   FIG. 32B   FIG. 32C
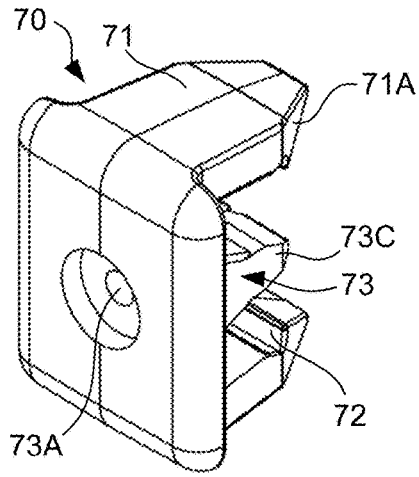
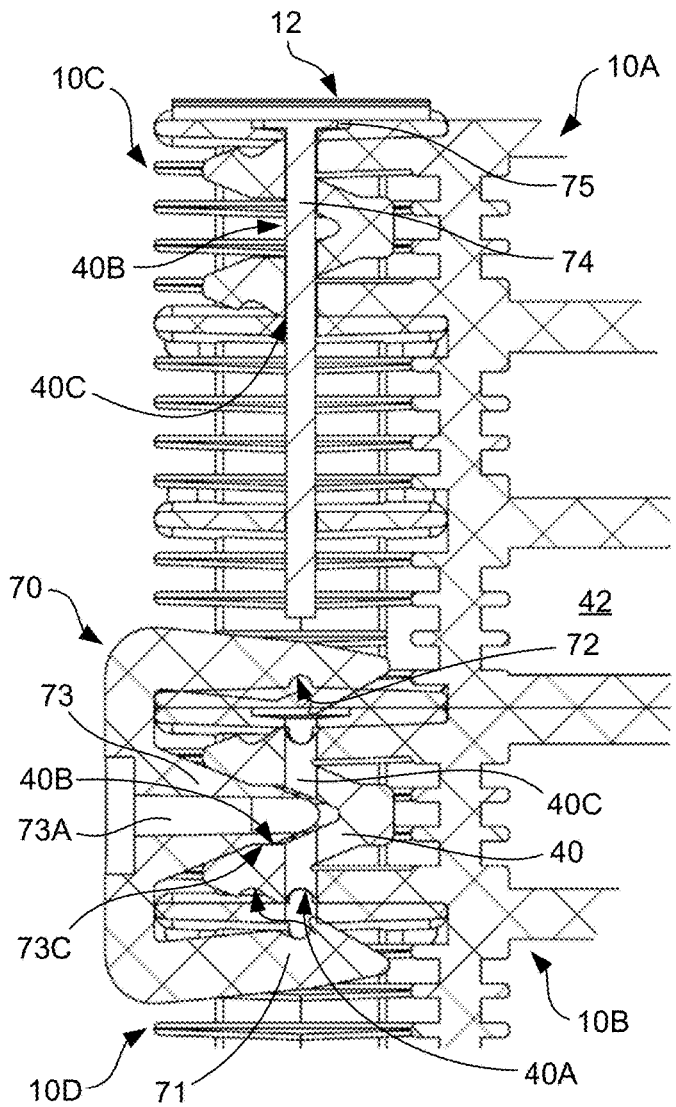
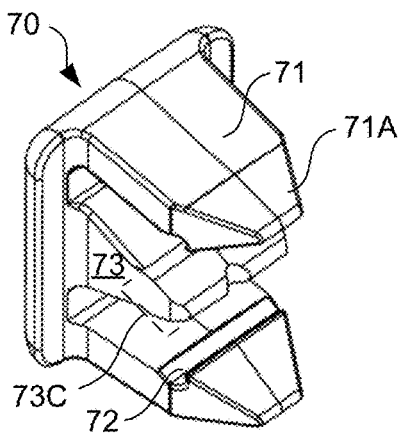
FIG. 32E
FIG. 32F   FIG. 32D

EVAPORATION PANEL SYSTEMS AND ASSEMBLIES

The present application is a continuation of U.S. patent application Ser. No. 15/809,920 filed on Nov. 10, 2017 and issuing as U.S. Pat. No. 10,445,809 on Feb. 11, 2020, which claims the benefit of U.S. Provisional Patent Application No. 62/420,460 filed on Nov. 10, 2016, U.S. Provisional Patent Application No. 62/541,573 filed on Aug. 4, 2017, and U.S. Provisional Patent Application No. 62/580,116 filed on Nov. 1, 2017, each of which is incorporated herein by reference in its entirety.

BACKGROUND

There are several techniques used to separate water from various contaminants, such as hydrocarbons, salts, debris, dirt/clay, coal, hazardous material, or the like. Sources of industrial wastewater come from various industries generally, such as from facilities including chemical plants, fossil-fuel power stations, food production facilities, iron and steel plants, mines and quarries, nuclear plants, and others. Thus, evaporation from evaporation ponds has been used to separate various types of contaminants from water. For example, salt evaporation can be used to produce salt from seawater, or can be used to dispose of brine from desalination plants. Mining operations can use evaporation to separate ore or other material from water. The oil and gas industry can use evaporation separate various hydrocarbons from water. Evaporation can also be used to separate water from various types of hazardous or non-hazardous waste, reducing its weight and volume to make it more easily transportable and stored.

As many industries produce some wastewater, there is a trend towards minimizing wastewater production and/or recycling wastewater where possible. However, typical evaporation ponds can be large, taking up a significant amount of real estate (which may not be available in some instances), and evaporation ponds can take months to adequately evaporate/separate the waste material from the water though evaporation.

BRIEF DESCRIPTION OF THE DRAWINGS

In order that the advantages of the invention be readily understood, a description of the subject matter will be rendered in part by reference to specific embodiments that are illustrated in the appended drawings, with the understanding that these drawings depict only typical examples of the subject matter and are not therefore to be considered to be limiting in scope. However, the subject matter of the present disclosure can be described and explained with additional specificity and detail through the use of the accompanying drawings.

FIG. 13 is a front plan, partial view of an example evaporation panel in accordance with the present disclosure.

FIG. 14 is a top cross-sectional, partial plan view, taken along section A-A of FIG. 13, of an example evaporation panel in accordance with the present disclosure.

FIG. 15 is a close-up view of a portion of the example evaporation panel of FIG. 13, taken within the dashed lines thereof, having wastewater loaded thereon in accordance with the present disclosure.

FIG. 16 is a top cross-sectional, partial plan view, taken along section B-B of FIG. 15, of an example evaporation panel in accordance with the present disclosure, which further shows an example airflow pattern generated by a leading edge of a symmetrical airfoil-shaped vertical water column.

FIG. 29 depicts a cross-sectional detailed view of portions of two example vertically stacked evaporation panels of an example evaporation panel securing system or assembly, including an example configuration of an upwardly extending ridge engaged with a downwardly extending ridge, as well as an example pin-receiving opening in accordance with the present disclosure.

FIGS. 30A and 30B provide a close-up view of portions of an example evaporation panel, including a front plan view and an upper left perspective view, respectively, which further details example male connector features in accordance with examples of the present disclosure.

FIGS. 32A-F provide various plan, perspective, or cross-sectional views of yet another alternative example security clip, as well as further detail regarding engagement of the security clip with an example male connector engagement groove and an alternative location for placement of an example security pin in accordance with the present disclosure.

DETAILED DESCRIPTION

Figure 1:
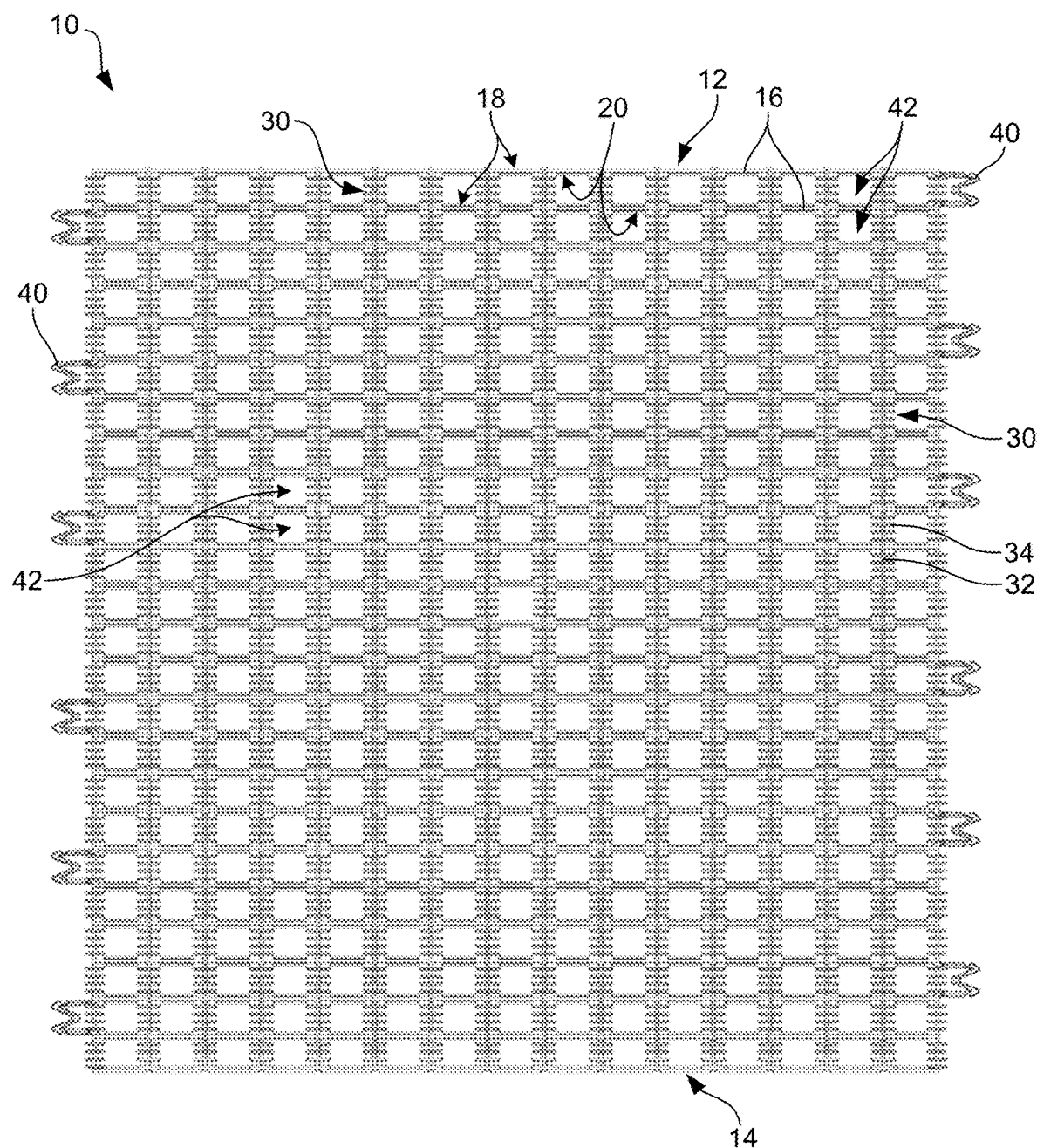
FIG. 1 is a front plan view of an example evaporation panel in accordance with the present disclosure.

In accordance with examples of the present disclosure, evaporation panels, evaporation panel systems, evaporation panel securing systems, evaporation panel sub-assemblies, evaporation panel assemblies, groups of evaporation panel assemblies, wastewater evaporative separation systems, and various methods can be used for the separation of various solids or other impurities, e.g., oil, sludge, minerals, gas fractions from fracking, chemicals, precipitants, food byproducts, metallic particles or colloids, nuclear byproduct, clays and other sediments, etc., from water. Evaporating water from wastewater can be onerous, taking up a great deal of real estate in the form of evaporation ponds, and further, can be a slow and/or expensive process. Thus, the present disclosure often provides a faster or more efficient solution, often using a much smaller footprint for wastewater evaporation and separation, and often reducing processing times compared to traditional evaporation ponds.

In accordance with the present disclosure, evaporation panels can be configured to receive wastewater at or near a top portion thereof (e.g., spraying, distributing with a distribution pan, pouring, filling, etc.). Thus, various upper surfaces of the evaporation panel can "fill up" with the wastewater, and as the water efficiently evaporates due to the high surface area to volume (of the wastewater) ratio, the contaminants or other materials to be separated therefrom can effectively work their way downward as more wastewater is added at or near the top. This process can be carried out in stages (wastewater added periodically), or the process can be continuous (wastewater added on an ongoing basis), or a combination of both (continuous addition of wastewater with periodic breaks), for example.

Thus, in accordance with the present disclosure, an evaporation panel can include an evaporation shelf that is laterally elongated and horizontally oriented (when in use) and can include an upper surface and a lower surface. The evaporation panel can also include a second evaporation shelf that is laterally elongated and positioned in parallel beneath the evaporation shelf, and can also include a second upper surface. A support column can be positioned between the first evaporation shelf and the second evaporation shelf. The support column can include a plurality of stacked and spaced apart evaporation fins oriented in parallel with the evaporation shelf.

In one example, the evaporation fins can be spaced apart leaving a gap suitable to leverage the surface tension of water relative to the material used to form the evaporation fins. If the spacing is appropriate, the wastewater can fill the gap, forming a vertical water column supported by the evaporation fins relative to the surface tension of the wastewater. In another example, the first lower surface can include a downwardly extending ridge for facilitating wastewater release from the first lower surface. In another example, the second upper surface can include an upwardly extending ridge for facilitating wastewater movement from the second upper surface along a generally downward cascading path of wastewater therebeneath. The upper surface and the lower surface can be generally flat, and thus, the loading of wastewater thereon can form a layer that thinly fills the upper surface commensurate in thickness to that provided by the surface tension of the wastewater. If the upper surface is not flat, but is slightly angled or convex, or conversely is slightly concave, the thickness of the wastewater layer can be subtly adjusted, e.g., from 60% to 140% the thickness of a layer of wastewater when applied to a flat surface of the same material. Normally, since the upper surface of the evaporation shelf is generally horizontally flat, the thickness provided by the surface tension of the wastewater on the material of the evaporation shelf contributes to the total wastewater loading volume. In further detail, the lower surface can also be used to load wastewater using the surface tension of the wastewater, and can also be generally horizontally flat. However, in one example, the lower surface of the evaporation shelf can have a slope of from greater than 0° to about 5°. In another example, the evaporation panel can include a third evaporation shelf positioned (directly, in one example) beneath the second evaporation shelf, the third evaporation shelf including a third upper surface for receiving the wastewater from the second lower surface. Notably, wastewater can also be cascaded down from evaporation shelf to evaporation shelf via the evaporation support column, which includes the evaporation fins that also retain and pass along wastewater in a generally downward direction. In further detail, the evaporation panel can include from 3 to 36 evaporation shelves, each including its own evaporation shelf and each separate from at least one other evaporation shelf by stacked and spaced apart horizontal evaporation fins. As a note, the uppermost evaporation shelf and the lowermost evaporation shelf can often be used for vertically stacking two evaporation panels, and thus, when stacked, an uppermost evaporation shelf at a top of an evaporation panel can be effectively used as a support structure to support a lowermost evaporation shelf at a bottom of another evaporation panel. Thus, the respective uppermost evaporation shelf and lowermost evaporation shelf become effectively joined to form a single evaporation shelf that is common to both evaporation panels.

In another example, a support column for separating and supporting evaporation shelves of an evaporation panel is disclosed and described. The support column can include a first evaporation fin having a first flat upper surface that is horizontally oriented (when in use); a second evaporation fin having a second flat upper surface and positioned in parallel to and spaced apart at from 0.3 cm to 0.7 cm beneath the first evaporation fin; and a third evaporation fin having a third flat upper surface positioned in parallel to and spaced apart at from 0.3 cm to 0.7 cm beneath the second evaporation fin. The support column can also include a support beam supporting the first evaporation fin directly over the second evaporation fin, and the second evaporation fin directly over the third evaporation fin. There can be, for example, any number evaporation fins that may be practical, e.g., 3 to 20, 4 to 16, 4 to 12, 5 to 10, etc.

In one example, the first evaporation fin, the second evaporation fin, and the third evaporation fin can be substantially the same shape, or can have a different lateral dimension (e.g., side to side and/or front to back) and/or different horizontal surface area at the upper surface. In one example, the evaporation fins can be spaced apart so that when wastewater is loaded thereon, a vertical water column is formed as a result of a surface tension of wastewater between and about the evaporation fins. Example shapes that can be used include, laterally (x-y axes looking at evaporation fins from above) the shape of a perpendicular cross-section of an airfoil, a circle, an ellipse, a square, a rectangle, etc. When the evaporation fins are substantially the same size, such as in the shape of the perpendicular cross-section of an airfoil, when a water column forms thereon, the outer (horizontal) shape of the evaporation fin can facilitate the water column itself in forming a vertically oriented airfoil, e.g., see FIGS. 15 and 16.

In another example, an evaporation panel can include a series of evaporation shelves that are laterally elongated and stacked in vertical alignment; and a series of support columns that are vertically oriented and positioned along the evaporation shelves to provide support to and separation between evaporation shelves. The series of evaporation shelves and the series of support columns can form a generally grid-like structure that defines a plurality of open spaces. The evaporation panel can also include a plurality of male connectors positioned at lateral ends of the grid-like structure.

In one specific example, the support column can include a plurality of stacked and spaced apart horizontal evaporation fins and/or evaporation shelves, and the support columns can further define or provide a border to open spaces (or female-receiving openings) of the grid-like structure. In further detail, the evaporation panel can include one or more male connector and one or more female-receiving opening for orthogonally coupling multiple evaporation panels together. The female-receiving opening can be one of a plurality of female-receiving openings that also can function as an open space when not orthogonally coupled to a male connector of another evaporation panel. In one specific example, individual open spaces (which includes used or unused female-receiving openings as well as other open spaces that might be present for airflow having a relative size no more than about four times larger or smaller than the female-receiving openings) can have an average area opening size, and the evaporation panel can further include an enlarged evaporative airflow channel (or even two enlarged evaporative airflow channels) that (each) has/have a channel area at least eight (8) times larger than the average area opening size, e.g., 8 to 80 times larger, 10 to 60 times larger, 10 to 40 times larger, 20 to 40 times larger, etc.

The evaporation panels of the present disclosure can be prepared using various materials, but in one example, it can be prepared as a single monolithic part of any suitable plastic material, such as polyethylene (e.g., HDPE), polypropylene, polyethylene terephthalate, or a mixture of multiple plastics or other materials as a composite. In some examples, the evaporation panel can be surface treated to generate a more polar surface compared to an inner core or portion of the plastic material. Surface treatments can include flame treatment, chemical treatment, plasma treatment, corona treatment, primer application, reactive fluorine gas treatment, etc. For example, a reactive fluorine gas process can generate a fluoro-oxidated surface, which can be present at a surface depth from 10 nm to 20 μm. In one example, the surface treatment can provide to the surface thereof a surface energy from 60 dyne/cm to 75 dyne/cm.

In another example, a method of separating contaminants from wastewater can include loading wastewater on a horizontal upper surface of a laterally elongated evaporation shelf to initiate a flow path of wastewater containing a contaminant; and flowing the wastewater along the flow path from the upper surface around a beveled side rim, and then to one or both of a downward facing lower surface of the evaporation shelf or vertically aligned evaporation fins positioned beneath the evaporation shelf. Other steps can include flowing or releasing the wastewater along the flow path from the lower surface of the evaporation shelf to one or both of the evaporation fins or a horizontal second upper surface of a laterally elongated second evaporation shelf positioned directly beneath the evaporation shelf; and moving the contaminant along the flow path while water is evaporating from the wastewater, thus causing the contaminant to move generally downward while increasing in concentration within the wastewater due to water evaporation.

In still another example, a method of separating contaminants from wastewater can (which can be combined or used to modify the prior method example) can include loading wastewater on an upward facing upper surface of an evaporation shelf; and flowing the wastewater along a flow path from the upper surface around a beveled side rim and onto a downward facing lower surface of the evaporation shelf. The path can continue along the lower surface and onto evaporation fins of a vertical support column, and from the evaporation fins onto a second upper surface of a second evaporation shelf positioned beneath the evaporation shelf. The method can also include evaporating water from the wastewater while the wastewater is flowing down along the flow path.

In these method examples, in one example, the upper surface can be generally flat, or even generally subtly concave or convex. The upper surface of at least some of the evaporation shelves can include an upwardly extending ridge that traverses a longitudinal length of the upper surface that can prevent the wastewater from pooling toward a centerline thereof or from evacuating the surface prematurely. The lower surface can also be generally flat (or subtly concave or convex), but can also be sloped from horizontal at from greater than 0° to 5°. The lower surface can include a downwardly extending ridge that traverses a length of the lower surface, and the downwardly extending ridge can both act to release wastewater therebeneath and can guide wastewater along the lower surface toward the vertical support column. The evaporation fins can be vertically spaced apart at from 0.2 cm to 1 cm, but more typically from 0.3 cm to 0.7 cm. In certain examples, the evaporation fins can be spaced apart so that when water is loaded thereon, a vertical water column is formed. The evaporation fins can have a configuration as described elsewhere herein, including square, rectangular, circular, elliptical, etc. In one example, the horizontal upper surface can have the shape of a perpendicular cross-section of an airfoil. Thus, when the vertical water column forms, the vertical water column can have the shape of a vertical airfoil.

In further detail, the flow path can continue from the second upper surface around a second beveled side rim and onto a downward facing second lower surface of the second evaporation shelf, along the second lower surface and onto the second evaporation fins of a second vertical support column, and from the second evaporation fins onto a third upper surface of a third evaporation shelf positioned beneath the second evaporation shelf, and so forth. For example, the flow path can deliver wastewater to at least four (4) vertically stacked evaporation shelves that are spaced apart by support columns, and the support columns can also be configured with evaporation fins that deliver at least a portion of the wastewater from evaporation shelf to evaporation shelf. Thus, the method can generally include moving contaminants along the flow path while the water is evaporating therefrom, thus causing the contaminants to move generally downward while increasing in concentration. Furthermore, to facilitate evaporation, the first evaporation shelf and the second evaporation shelf can vertically define, e.g., border, an open space, and the support column and a second support column can horizontally define, e.g., border, the open space. There can typically be a plurality of open spaces configured similarly, for example. Thus, the method can include flowing air through the open space or the open spaces to facilitate water evaporation. In another more specific example, to provide still more additional airflow, the vertical support columns and/or evaporation shelves (and/or evaporation fins in some examples) can generally define, e.g., border, an enlarged evaporative airflow channel having a channel area at least eight (8) times larger than an average area of the open spaces. Thus, the method can also include flowing air through the enlarged evaporative airflow channel (the relative areas can be measured as the perpendicular plane to the horizontal airflow through the open spaces and the enlarged evaporative airflow channel). Evaporative fins, vertical support column, and/or evaporation shelves can also generally define or border a second enlarged evaporative airflow channel having a channel area that is also at least eight times larger than an average area of the open space, and thus, the method can further include flowing air through the second enlarged evaporative airflow channel.

In other examples, an evaporation panel system can include a plurality of evaporation panels, wherein a first evaporation panel and a second evaporation panel of the plurality of evaporation panels can individually include a plurality of evaporation shelves that are laterally elongated, vertically stacked, spaced apart from one another, and horizontally oriented; and a plurality of vertical support columns can be positioned laterally along the plurality of evaporation shelves to provide support and separation to the plurality of evaporation shelves. Furthermore, a plurality of female-receiving openings can be present and can be individually defined or bordered by two evaporation shelves and two support columns, as well as a plurality of male connectors positioned at lateral ends of both the first evaporation panel and the second evaporation panel. The first evaporation panel and the second evaporation panel can be orthogonally connectable via the male connectors of the first evaporation panel and the female-receiving openings of the second evaporation panel.

In another example, an evaporation panel system can include a plurality of evaporation panels, each of the plurality of evaporation panels including a series of vertically stacked, laterally elongated evaporation shelves; and a series of vertically oriented support columns positioned along the elongated evaporation shelves to provide support and separation between the series of evaporation shelves. The evaporation shelves and the support columns can form a grid-like structure which define or provide borders to a plurality of substantially square or rectangular female receiving openings. The evaporation panel system can also include a plurality of male connectors positioned at lateral ends of the laterally elongated evaporation shelves, wherein the male connectors can be adapted to releasably join or lock in place with selected female receiving openings of another orthogonally oriented evaporation panel.

In another similar example (which can be used to combine with the prior evaporation panel system or substitute structural components therewith), an evaporation panel system can include a plurality of evaporation panels, wherein a first evaporation panel and a second evaporation panel of the plurality of evaporation panels each include a plurality of horizontal evaporation shelves that are laterally elongated, stacked vertically, and spaced apart vertically with respect to one another; and a plurality of vertical support columns supporting the plurality of horizontal evaporation shelves. The evaporation panels can also include a plurality of female-receiving openings individually defined or bordered by two evaporation shelves and two support columns, as well as a plurality of male connectors positioned laterally at ends of the plurality of evaporation panels. The male connectors of the first evaporation panel can be adapted to be releasably joined or releasably locked in place when the first evaporation panel is orthogonally joined with female-receiving openings of the second evaporation panel. The evaporation panel system can also include a security fastener to secure at least one male connector within at least one female-receiving opening. Thus, when the security fastener is in place, the first evaporation panel that is otherwise adapted to be releasably joined or releasably locked in place becomes locked in place. Examples of security fasteners that can be used include a specially designed security clip and/or a security pin.

With regard to the various evaporation panel systems generally, when the evaporation panels are joined or otherwise releasably joined (or locked together with a security fastener), the evaporation panel system can be referred to more specifically as an evaporation panel sub-assembly or an evaporation panel assembly. Thus, the evaporation panel systems described herein can include a first evaporation panel orthogonally connected to a second evaporation panel to form an evaporation panel sub-assembly, such an L-shaped sub-assembly or a T-shaped sub-assembly.

Thus, the present disclosure is also drawn to evaporation panel sub-assemblies, that can include a plurality of evaporation panels laterally joined together to form a unit structure that is about one evaporation panel wide, one evaporation panel deep, and one evaporation panel high, as will be described in greater detail hereinafter. Individual evaporation panels of the sub-assemblies can include a plurality of evaporation shelves that are laterally elongated, vertically stacked, spaced apart from one another, and horizontally oriented; and a plurality of vertical support columns positioned laterally along the plurality of evaporation shelves to provide support and separation to the plurality of evaporation shelves. The individual evaporation panels can also include a plurality of female-receiving openings which are individually bordered by two evaporation shelves and two support columns; and a plurality of male connectors positioned at both lateral ends of the respective evaporation panel. The sub-assembly can include a first evaporation panel and a second evaporation panel, wherein one or more male connector at one lateral end of the first evaporation panel can be connected to one or more corresponding female-receiving openings.

In further detail, the plurality of evaporation panels can also include a third evaporation panel (which can include evaporation shelves, support columns, female-receiving openings, male connectors, etc.), wherein the first evaporation panel can be orthogonally connected to the second evaporation panel and the third evaporation panel to form an evaporation panel sub-assembly, such as a comb-shaped sub-assembly (U-shaped, E-shaped, single panel spine with multiple orthogonally connected evaporation panel teeth, e.g., from 2 to 15 teeth, from 2 to 8 teeth, from 3 to 8 teeth, etc., two panel spines in parallel at each end of multiple orthogonally connected evaporation panel teeth, e.g., from 2 to 15 teeth, from 2 to 7 teeth, from 3 to 7 teeth, etc.). In one specific type of comb-shaped sub-assembly, the sub-assembly can be cube-shaped, which can be viewed as a comb-shaped sub-assembly with a second panel spine (in parallel, one at each end of the "teeth" evaporation panels.

The evaporation sub-assembly can also be a pi-shaped sub-assembly. For example, a pi-shaped sub-assembly can include an evaporation panel spine and multiple orthogonally connected evaporation panel teeth, e.g., from 2 to 13 teeth, from 2 to 7 teeth, from 3 to 7 teeth, from 4 to 7 teeth, etc. In this sub-assembly configuration, the evaporation panel "spine" (to which the multiple "teeth" are joined therein) can include a plurality of vertically aligned female-receiving openings, wherein both laterally outermost vertically aligned female-receiving openings remain disconnected with respect to the male connectors of any of the evaporation panel teeth. In further detail, the two outermost evaporation panel "teeth" can be respectively positioned, for example, one position in from the outermost vertically aligned female-receiving openings (symmetrical), or two positions in from the outermost vertically aligned female-receiving openings (symmetrical), or one position in on one side of the pi-shaped sub-assembly spine and three positions in on the other side of the pi-shaped sub-assembly spine (asymmetrical). In these types of configurations, the pi-shaped sub-assembly can be joined together to form vertical support beam assemblies, e.g., at least 4 pi-shaped sub-assemblies can be joined together to form 1 (or more) vertical support beam assembly, or at least 9 pi-shaped sub-assemblies (some symmetrical and some asymmetrical) can be joined together to form 4 (or more) vertical support beam assemblies. In further detail, even more pi-shaped sub-assemblies can be joined together to form an evaporation panel assembly with both vertical support beam assemblies and vertical airshafts, which vertical airshafts can be, for example, about as large as one sub-assembly unit.

Regardless of the types of sub-assemblies formed, they can be joined together to form more complex evaporation panel assemblies. For example, with a cube-shaped sub-assembly, a comb-shaped sub-assembly, a pi-shaped sub-assembly, an L-shaped sub-assembly, etc., can be joined to form two (or more) adjacently joined sub-assemblies, or evaporation panel assemblies. Evaporation panel assemblies can also be formed by stacking evaporation panels, evaporation panel sub-assemblies, evaporation panel assembly levels, etc.

In another example, an evaporation panel assembly can include a plurality of evaporation panel sub-assemblies or a plurality of individual evaporation panels laterally joined together to form a structure that is larger than the evaporation panel sub-assembly. Individual evaporation panels can include a plurality of evaporation shelves that are laterally elongated, vertically stacked, spaced apart from one another, and horizontally oriented; a plurality of vertical support columns positioned laterally along the plurality of evaporation shelves to provide support and separation to the plurality of evaporation shelves; a plurality of female-receiving openings which can be individually bordered by two evaporation shelves and two support columns; and a plurality of male connectors positioned at both lateral ends of the respective evaporation panel joined at one or both ends with corresponding female-receiving openings of orthogonally oriented evaporation panels.

Thus, a plurality of evaporation panel sub-assemblies can be laterally joined to form a first level of an evaporation panel assembly, or multiple levels thereon. Additional evaporation panel sub-assemblies can also be laterally joined and stacked on the first level to form a second level of the evaporation panel assembly, and so forth. For example, still more additional evaporation panel sub-assemblies can be laterally joined and stacked on the second level to form from 1 to 48 additional levels of the evaporation panel assembly, or from 1 to 38 additional levels, or from 1 to 22 additional levels, or from 2 to 22 additional levels, or from 4 to 30 additional levels, or from 4 to 30 additional levels, etc. When building evaporation panel assemblies as high as 32 levels, for example, a great deal of weight can generate downward force on particularly the lowermost evaporation panel assembly levels. Thus, particularly with very high assemblies, e.g., at least 24 feet, at least 32 feet, at least 40 feet, at least 48 feet, at least 56 feet, at least 64 feet, etc., larger sub-part dimensions of the individual evaporation panels can provide support, e.g., deeper evaporation shelves, larger support columns, etc., such that more material may be generally used to form each individual evaporation panel. Also, design configuration, e.g., how the evaporation panels are assembled, can also provide added strength to a very high evaporation panel assembly. It has been found, for example, that the pi-shaped sub-assembly provides the greatest potential for building very high evaporation panel sub-assemblies. This may be partly because the pi-shaped sub-assembly allows for the formation of vertical support beam assemblies, as will be described in greater detail hereafter.

In still further detail, the evaporation panel systems of the present disclosure can include a second evaporation panel assembly positioned immediately adjacent to a first evaporation panel assembly, but not in contact therewith. For example, a gap of from ½ to 12 inches, or from 1 to 6 inches, can remain between two adjacent evaporation panel assemblies. Various structural features can be formed in the evaporation panel assemblies, such as stairways, passageways, rooms, barriers or walls, cantilevered bridges, platforms, etc.

Various methods of assembling evaporation panel systems to form evaporation panel sub-assemblies or assemblies can include assembling evaporation panels in connection with one or more of the evaporation panel systems described herein. For example, the method can include orthogonally orienting the first evaporation panel with respect to the second evaporation panel, and releasably joining the male connectors of the first evaporation panel with corresponding female-receiving openings of the second evaporation panel to form an evaporation panel sub-assembly or assembly.

In one example, at least two (2) discrete evaporation panels (e.g., from 2 to 10 evaporation panels, at least 10 evaporation panels, at least 50 evaporation panels, at least 500 evaporation panels, at least 5,000 evaporation panels, at least 10,000 evaporation panels, etc.) can be releasably joined together as one or more evaporation panel sub-assembly and/or as an evaporation panel assembly. In one example, a first portion of the evaporation panels (e.g. of 50, 500, 5,000, 10,000, etc.) can be releasably joined together laterally, and a second portion of which can be releasably joined together laterally and stacked on top of the first portion to form a multi-level evaporation panel assembly. A third portion of the evaporation panels can be releasably joined together laterally and stacked on top of the second portion to form a third level of the multi-level evaporation panel assembly, and so forth, e.g., evaporation panel assembly (tower) at least 4 levels high, e.g., from 4 to 32 levels high or even higher limited only by safety concerns and the relative strength of the evaporation panel assemblies.

In another example, an evaporation panel securing system can include a plurality of evaporation panels. A first evaporation panel and a second evaporation panel of the plurality of evaporation panels can individually include a plurality of evaporation shelves that are laterally elongated, vertically stacked, spaced apart from one another, and horizontally oriented; a plurality of vertical support columns positioned laterally along the plurality of evaporation shelves to provide support and separation to the plurality of evaporation shelves; a plurality of female-receiving openings individually bordered by two evaporation shelves and two support columns; and a plurality of male connectors positioned laterally at ends of the plurality of evaporation panels, wherein the male connectors of the first evaporation panel are releasably joinable with female-receiving openings of the second evaporation panel. The evaporation panel securing system can further include a security fastener (such as a security clip or a security pin) to secure a male connector of the first evaporation panel within a female-receiving opening of the second evaporation panel in an orthogonally joined orientation, or to secure the second evaporation panel on top of the first evaporation panel in a vertically stacked orientation.

A related method of securing evaporation panels together can include releasably joining a first evaporation panel orthogonally with respect to a second evaporation panel by inserting a male connector of the first evaporation panel into a female-receiving opening of the second evaporation panel; and locking the male connector in place within the female-receiving opening by engaging a security fastener with the male connector that is within the female-receiving opening.

With respect to the evaporation panel securing system and related method, a security fastener can be operationally engageable with the male connector and the female-receiving opening so that the first evaporation panel becomes locked in place with respect to the second evaporation panel at the male connector positioned within female-receiving opening when in the orthogonally joined orientation. For example, a security pin can be operationally engageable with the male connector and at least two evaporation shelves that partially define the female-receiving opening when in the orthogonally joined orientation. Alternatively or additionally, security clip can be operationally engageable with the male connector and at least two evaporation shelves that partially define the female-receiving opening when in the orthogonally joined orientation. The security clip can alternatively be operationally engageable to secure the second evaporation panel in place on top of the first evaporation panel when in the vertically stacked orientation. If there are three evaporation panels, e.g., a first, second, and third evaporation panel (configured the same as the first evaporation panel and the second evaporation panel), then when the security fastener is in place, the security fastener (e.g., security clip) can secure the first evaporation panel to the second evaporation panel in the orthogonally joined orientation, and at the same time and location also secures the third evaporation panel to the second evaporation panel in a vertically stacked orientation.

In another example, a wastewater remediation or evaporative separation system can include an evaporation panel assembly (which includes a single sub-assembly, for example) including at least ten (10) discrete evaporation panels laterally joined together and positioned in fluid communication with body of wastewater. The evaporation panel assembly can be configured for receiving wastewater from the body of wastewater and evaporating water therefrom as the wastewater cascades down the evaporation panel assembly and contaminants generally become more concentrated. The wastewater remediation or evaporative separation system can also include a wastewater delivery system fluidly associated with the body of wastewater. The wastewater delivery system can include a fluid directing assembly for delivering wastewater from the body of wastewater to an upper portion of the evaporation panel assembly. Any of the features described herein with respect to individual evaporation panels, evaporation panel systems, evaporation panel sub-assemblies, evaporation panel assemblies, evaporation panel securing systems, etc., can be used with the wastewater evaporative separation systems described herein.

In one example, the evaporation panel assembly can include at least fifty (50) discrete evaporation panels or at least five hundred (500) evaporation panels (or at least 1,000, at least 5,000, at least 10,000, 20,000, etc.), a first portion of which are laterally joined together and a second portion of which are laterally joined together stacked on top of the first portion. In one example, a third portion third portion can be laterally joined together and stacked on top of the second portion, and so forth. The body of wastewater can be a pond, river, or lake, for example. The wastewater evaporative separation system can further include a platform supporting the evaporation panel assembly, and/or a platform on a top thereof. The platform(s) can be perforated or includes voids for allowing wastewater to pass therethrough, e.g., returning wastewater therethrough when wastewater reaches the bottom of the evaporation panel assembly, or allowing wastewater loading at or near a top of the evaporation panel assembly. The (bottom) platform, for example, can be positioned over a body of wastewater, floating on a body of wastewater, on a dry or land surface next to the body of wastewater, etc. "Dry" can include solid surfaces, even if loaded with water or other liquid, e.g., mud or clay. In another example, the body of wastewater can be in a vessel or other container. The body of water can be at a lower elevation with respect to the evaporation panel assembly, and the wastewater delivery system can further include a pump to deliver the wastewater from the body of wastewater to the upper portion. The body of water can alternatively be at a higher elevation with respect to the evaporation panel assembly, and the wastewater can be gravity fed from the body of wastewater to the upper portion. In one example, the body of wastewater can even be filled from a remote source body of wastewater. Plumbing or fluid directing assemblies can be used for delivery, and can include fluid directing piping, sprayer nozzles, distribution pans, vents, valves, etc., for delivering the wastewater to the top portion or top thereof, for example. Thus, evaporation panel assemblies can be configured as described generally throughout the specification, e.g., evaporation panels can be releasably joined or even locked together using security clips or other security fasteners to secure the evaporation panels together. Sub-assemblies can be formed of various configurations and used to form larger evaporation panel assemblies of varying complexity, as will be described herein after in greater detail.

In a few specific examples, the evaporation panel assembly of the wastewater evaporative separation system can be located on-site adjacent to an industrial process that generates the wastewater. For example, if the industrial process is related to oil or gas drilling, wastewater can be separated from oil or gas on-site, as conventionally done or otherwise, and can be deliverable to the body of wastewater on-site without trucking or the use of a mobile carrier (automobiles, trains, etc.) to deliver the wastewater to the body of water. When the industrial process is related to a mining operation, wastewater used form mining can be deliverable to the body of wastewater on-site without trucking or the use of a mobile carrier of any type for on-site evaporative separation. Wastewater generated from plants or other operations that can benefit from this can include, without limitation, mining, sewage, utility, oil production, gas production, lithium ponds, gray water, lithium production, cooling towers, dairy farm pond waste, olive oil pond waste, leaching pond waste, thermoelectric/cooling wastewater, salt water evaporation, artificial lake remediation, produce production, pesticides, or combinations thereof.

In still another example, a method of evaporative separating wastewater can include loading wastewater including a contaminant at an upper portion of an evaporation panel assembly, flowing the wastewater along a generally downward cascading flow path from evaporation shelf to evaporation shelf, and evaporating water from the wastewater, thereby concentrating the contaminant in the wastewater as the wastewater follows the generally downward cascading flow path. The evaporation panel assembly can include at least 10 individual evaporation panels laterally joined together. Individual evaporation panels can include: a plurality of evaporation shelves that are laterally elongated, vertically stacked, spaced apart from one another, and horizontally oriented; and a plurality of vertical support columns positioned laterally along the plurality of evaporation shelves to provide support and separation to the plurality of evaporation shelves.

This method can further include collecting wastewater from a body of wastewater after loading, flowing, and evaporating; and channeling the wastewater from the body of wastewater back to the upper portion for another cycle of loading, flowing, and evaporating. In further detail, the body of wastewater can be located adjacent to a wastewater-generating industrial plant or operation, and the evaporation assembly can be located on or adjacent to the body of wastewater. Thus, the method can include evaporative separating the wastewater on-site adjacent to the wastewater-generating industrial plant or operation without the use of trucks or other mobile carriers to provide wastewater to the body of wastewater.

As a point of clarification, the terms wastewater "remediation" or "evaporative separation" system can both be used herein, as contaminants are being effectively separated from wastewater. That being stated, the contaminants are removed from the water by an evaporative process. Thus, the water is being "purified" but when separated, it does not remain as a liquid, but rather evaporates as a water vapor. Thus, the term "remediation" can alternatively be described as wastewater "evaporative separation" from contaminants or other similar terminology.

With these general examples in mind, it is noted that reference throughout this specification to "one embodiment," "an embodiment," "an example," "one example," "examples," or similar language means that a particular feature, structure, or characteristic described in connection therewith is included in at least one example of the present disclosure, but also may be applicable to other examples. Thus, appearances of the phrases such as "in one embodiment," "in one example," or similar language throughout this specification may, but do not necessarily, all refer to the same embodiment. For example, when discussing any one of the embodiments herein, e.g., evaporation panels, evaporation panel systems, evaporation panel sub-assemblies, evaporation panel assemblies, wastewater evaporative separation systems, methods, etc., each of these discussions can be considered applicable to the other examples, such as other evaporation panels, evaporation panel systems (which include 2 or more evaporation panels which can be orthogonally joined together or vertically stacked), the evaporation panel sub-assemblies (which include multiple evaporation panels joined together as a single assembly unit structure, as defined more fully hereinafter), the evaporation panel assemblies (referring to multiple evaporation panels that are orthogonally joined—releasably joined or locked—together, and in many instances include multiple stacked "levels" of orthogonally joined evaporation panels), the wastewater evaporative separation systems, or the various methods described herein, whether or not they are explicitly discussed in the context of that specific example. As such, features, structures, or characteristics of the disclosed evaporation panels, systems, sub-assemblies, assemblies, methods, etc., may be combined in any suitable manner. In other instances, well-known structures, materials, or operations may not be specifically shown or described in detail to avoid obscuring aspects of the disclosure.

References to terms, such as "horizontal," "vertical," "upwardly," "downwardly," "upper," lower," "top," bottom," etc., are generally used relative to the normal operating orientation of the evaporation panels, evaporation panel systems, evaporation panel sub-assemblies, evaporation panel assemblies (single or multiple grouped evaporation panel assemblies), wastewater evaporative separation systems, methods, or the like; or to provide information regarding the spatial relationship between relative features, unless the context indicates otherwise, e.g., such as use of the term "upper" to describe a drawing sheet per se rather than to describe a structure depicted by a FIG. on the drawing sheet. That being stated, some degree of flexibility is intended with respect to absolute orientation or relative relationships. For example, a "horizontal" evaporation shelf may be generally horizontal within a few angular degrees from completely horizontal, or "upwardly facing" may face generally upward, but not necessarily directly upward, etc. In some instances, as an exception where the context may dictate otherwise, minor deviations from absolute orientation or spatial relationships can be specifically described and can thus exclude an absolute orientations or spatial relationships, e.g., referring to a lower surface of an evaporation shelf having a slope of from greater than 0° to about 5° would exclude an absolute horizontal lower surface.

The term "laterally" or "lateral" herein generally refers to a side-to-side relationship, and in some limited instances, a front-to-back relationship when defined. For example, when referring to a single evaporation panel, male connectors can be described as being positioned laterally at ends of the evaporation panel (as opposed to a top or a bottom, or a front or back of the panel). Thus, front-to-back (or evaporation panel "depth") of a single evaporation panel is not considered to be lateral as used herein. On the other hand, when describing the orthogonal (or perpendicular) joining of two evaporation panels, as one evaporation panel has a first orientation and a second evaporation panel has a second perpendicular orientation, this relationship can be described as laterally joining two evaporation panels together, because it results in laterally building out a larger evaporation panel sub-assembly or assembly. More specifically, these two evaporation panels can even more accurately be described as being joined laterally and orthogonally together. Stated another way, when using the terms "laterally" or "lateral," with respect to a single evaporation panel or an evaporation panel sub-assembly or assembly, there is typically at least one evaporation panel that is being described with respect to an end thereof, such as at a right and/or left end where one or more male connector is positioned (based on normal operating and upright positioning or orientation, unless the context clearly dictates otherwise). As a further minor point, when referring to an individual feature of an evaporation panel, such as a specific male connector or a specific evaporation fin or a column of evaporation fins, for example, the term "laterally" can be used more generally to describe the feature in any essentially horizontal direction. For example, an evaporation fin can be described as having lateral dimensions along an x-y axes as viewed from above (with the evaporation panel in its upright normal orientation).

When referring generally to one or more "support columns," these can be described in two general contexts. A support column, in one example, can be described as spanning the vertical length of the evaporation panel, from the lowermost evaporation shelf to the uppermost evaporation shelf. Thus, the support column can likewise be described as including various support column "sections" between immediately adjacent evaporation shelves. However, in other contexts, a support column, when the context is appropriate, may alternatively refer to the support column section between two immediately adjacent evaporation shelves. In this latter context, the support column typically refers more specifically to the spatial relationship of the support column. For example, a support column may be described as being "between" a first evaporation shelf and a second evaporation shelf. The support column in this example can be understood to be between two immediately adjacent evaporation shelves, or two other evaporation shelves that have one, two, three, four, etc., evaporation shelves therebetween, depending on the context.

The term "releasably join" or "releasably joined," or even "releasably locked" refers to a mechanical engagement where two (or more) structures (e.g., a structure and an opening defined or bordered by a structure) are joined or snapped together with a locking mechanism, but the locking mechanism can allow for unlocking by an affirmative mechanical action placed on one or both structures, e.g., pinching, pushing, pulling, sliding, lifting, twisting, etc. The mechanical action can include a human finger interaction or can include the use of an unlocking tool of some type, for example. Once two structures are "releasably joined" in place, the two structures should remain together unless a typically intentionally mechanical action occurs. On the other hand, the term "locked" or "un-releasably locked" refers to two (or more) separate structures joined together by a locking mechanism, but they cannot be disjoined without damaging one or more of the structures, or alternatively, by removing a third mechanism (such as a security fastener, e.g., security clip, security pin, etc.) that may be used to convert a joint from being "releasably joined" to "locked." As an example, a security clip can itself be "releasably joined" with respect to a joint, e.g., a male connector/female-receiving opening, but even though it may itself be releasably joined thereto, it can also cause the joint per se to become a "locked" joint. To unlock the joint, the security clip can be removed, and now the joint reverts back to a "releasably joined" joint.

The term "wastewater" is used to broadly include any type of water that has been adversely affected in quality by anthropogenic (human activity) influence, or which has other material therein (even naturally) for which there is a desire to separate that material from water. Thus, wastewater includes produced water, effluent water, or any other type of contaminated water that may benefit from the use of the evaporation panels, evaporation panel systems, evaporation panel sub-assemblies and assemblies, wastewater evaporative separation systems, methods, and the like described herein. Furthermore, wastewater also includes bodies of water with any material where evaporative separation may be desirable, whether caused by human activity or not, or whether that material is technically "waste" or not. For example, the term "wastewater" can also include bodies of water that include large natural mineral content for which evaporable separation may be beneficial. Thus, water of any type that can be separate from "contaminants" or even from "desirable material," e.g., evaporation to concentrate a salt for salt recovery, that can be concentrated by water evaporation is referred generally herein as "wastewater," regardless of how it is produced.

The terms "first," "second," "third," etc., are used for convenience and do not infer any relative positioning, nor need these terms be used consistently through the entire specification and claims, as they are intended to be relative terms with respect to one another and not absolute with respect to structure. Thus, because these terms are relative to one another, they may be used interchangeably from one example to the next, but are typically used consistently within a single example or within a specific claim set. To illustrate, the use of "first" and "second" in the present disclosure may be used one way describing two relative evaporation panels, and in a different example or in the claims, "first" and "second" terminology may be reassigned. However, within a single example, or a single claim set, the use of the terms "first" and "second" should be used in an internally consistent manner as to that specific example or that specific claim set.

Reference will now be made to certain FIGS. that represent specific examples of the present disclosure. The FIGS. are not necessarily to scale, and various modifications to the examples shown can be carried out in accordance with examples of the present disclosure. Additionally, reference numerals will be used consistently throughout as they relate to a specific type of structure, even if that similar structure from embodiment to embodiment is not identically shaped, configured, or located. Each FIG. may include reference numerals not specifically described when discussing that specific illustration, but which may be described elsewhere herein. Likewise, discussion of structures on a specific illustration may not be numerically identified, but will be numerically identified elsewhere herein.

FIGS. 1-5 are discussed together, as they depict an example evaporation panel 10 taken from different views. The evaporation panel in this example can be oriented in an upright position, with a top 12 and a bottom 14 shown. The evaporation panel receives wastewater (not shown) generally at or towards the top thereof, but can also be filled from the sides in some examples. Thus, the wastewater thinly fills a series of evaporation shelves 16 by receiving the wastewater, often toward the top or at the top, and cascading the wastewater in a generally downward direction, filling other evaporation shelves positioned therebeneath. Essentially, a plurality of evaporation shelves can include an upper surface 18 and a lower surface 20 for receiving, holding, and distributing the wastewater in a generally downward direction, while exposing a large surface area (air/liquid interface) of the wastewater to the natural properties of evaporation, for example. In one specific example, the evaporation shelves can have a flat or essentially flat upper surface with a slight taper over an edge 22 (such as a beveled edge) thereof and a minor slope at the lower surface underneath, e.g., from >0° to 5°, 1° to 4°, 2° to 4°, or about 3° from horizontal. The very slight slope is difficult to see in FIGS. 1-5, but an example is shown more clearly in the alternative embodiment of FIG. 19. This configuration provides an arrangement so that once the wastewater has overfilled the upper surface, the excess wastewater can gently roll over the edge using natural water tension to retain a thin layer of the wastewater on the lower surface until full enough to pass the wastewater downward to the next lower evaporation shelf. Thus, the lower surface can include this minor or subtle slope as described, but in another example, can be horizontal without slope.

Additional features that can be present on the evaporation panel 10 of FIGS. 1-5 can include a support column 30. In the example shown, there are sixteen vertical support columns that support twenty-five evaporation shelves 16. The number of support columns and evaporation shelves shown in FIGS. 1-5 is somewhat arbitrary, as any number of support columns and evaporation shelves can be present, e.g., support columns and/or evaporation shelves can be independently numbered from 2 to 200, from 2 to 100, from 4 to 50, from 8 to 36, from 10 to 24, from 12 to 18, etc. In this example, support columns can include a support beam 32, which in this instance is a center positioned support beam relative to evaporation fins 34. The support beam can be positioned elsewhere, but when in the center, water can fill around the support beam on the evaporation fins, providing more surface area for evaporation.

Though there is a great deal of wastewater surface area generated by the multiple evaporation shelves 16, a significant amount of additional surface area can also be provided by the support columns 30 that are used to support and separate the evaporation shelves. For example, when the evaporation panel including the evaporation shelves are filled with wastewater, the support columns can also load wastewater, providing still more wastewater surface area (air/liquid interface) suitable for evaporation.

The evaporation panel 10 can also include structures that are suitable for joining or connecting (and disconnecting) adjacent evaporation panels to form an evaporation panel assembly. In FIGS. 1-5, this particular evaporation panel includes a series of male connectors 40 at side or lateral end surfaces of the evaporation panel. The male connectors can be joined orthogonally with other adjacent evaporation panels in any of the many female-receiving openings 42 that may be available and configured to join with the male connectors. In this particular example, each and every opening is configured to act as a female-receiving opening; however, for practical purposes, when two orthogonal evaporation panels are joined together and both rest on a common horizontal surface, female-receiving openings that can be used are in alignment with the location of male connectors of the other (orthogonally oriented) evaporation panel. Other female-receiving openings that go unused can act as "open spaces" for providing airflow and/or evaporative venting, for example. That being stated, at open space locations where an evaporation panel may not be intended to join with a male connector, in one example, those specific open spaces may or may not be configured as female-receiving openings, but can still act as open spaces for airflow and evaporation purposes. See, for example, FIGS. 17-20, which includes open spaces that are not also female-receiving openings, or FIGS. 21C-24D which include open spaces with cross-supports therein that may not accommodate insertion of a male connector at certain locations (depending on the position and/or configuration of the male connector and/or the cross-support).

In further detail, the male connectors 40 on the right side in FIG. 1 are vertically offset compared to the male connectors on the left side. This is so that two evaporation panels can be aligned and joined along a common vertical plane (with an orthogonally positioned third evaporation panel positioned therebetween to provide the respective joinable female-receiving openings as shown for example in FIG. 10). If these male connectors were not vertically offset along opposite ends or sides of the evaporation panel, they would not be able to be aligned in this particular configuration, assuming all panels were at rest on a common horizontal planar surface, e.g., the male connectors of two different evaporation panels would occupy the same female-receiving opening. On the other hand, if the male connectors were shorter, or if the male connectors were offset with respect to one another but were not necessarily positionally offset with respect to the occupying female-receiving opening, they could be configured to occupy a common female-receiving opening.

Figure 2A:
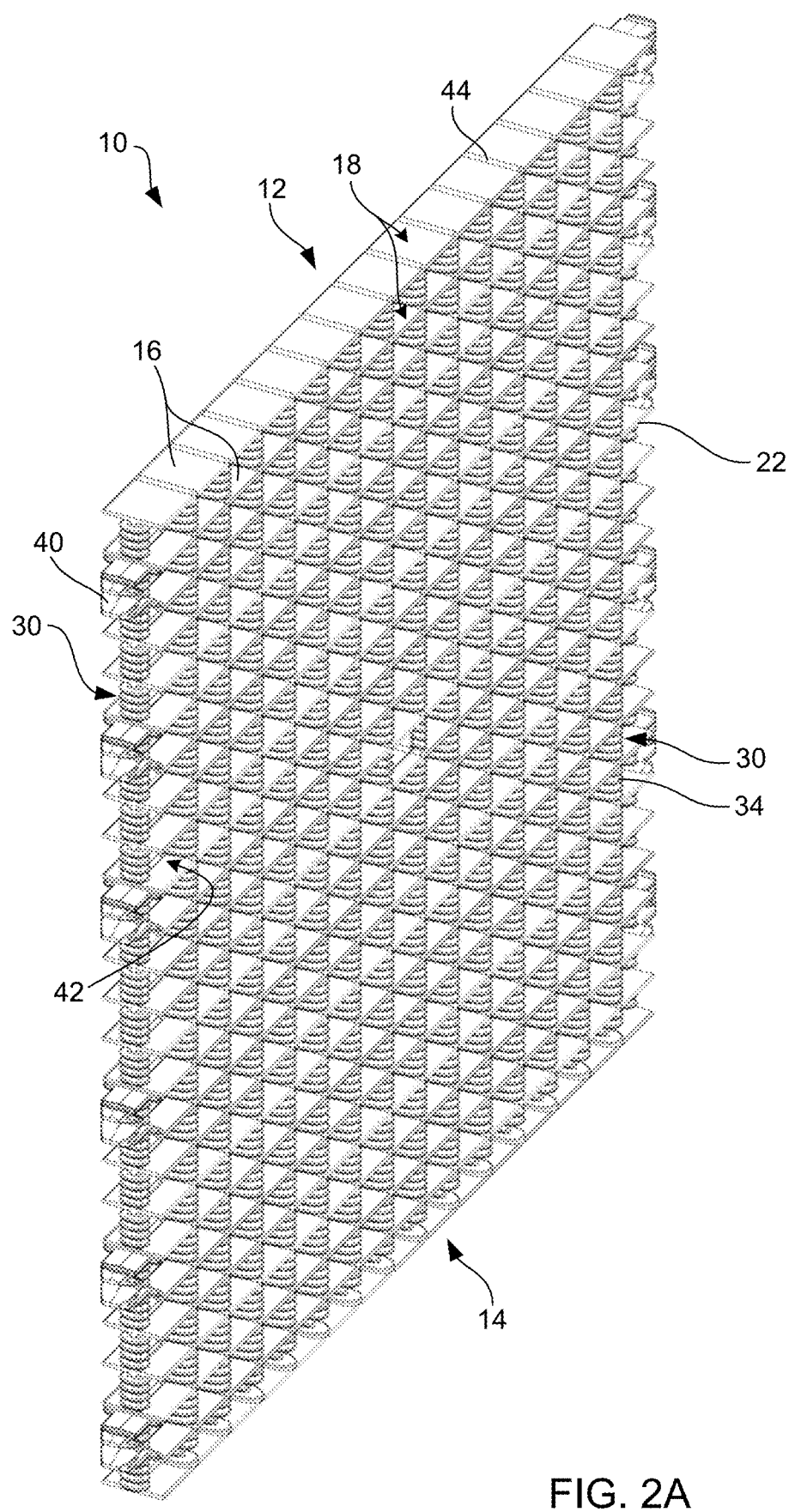
FIG. 2A is an upper left perspective view of the example evaporation panel of FIG. 1.
Figure 2B:
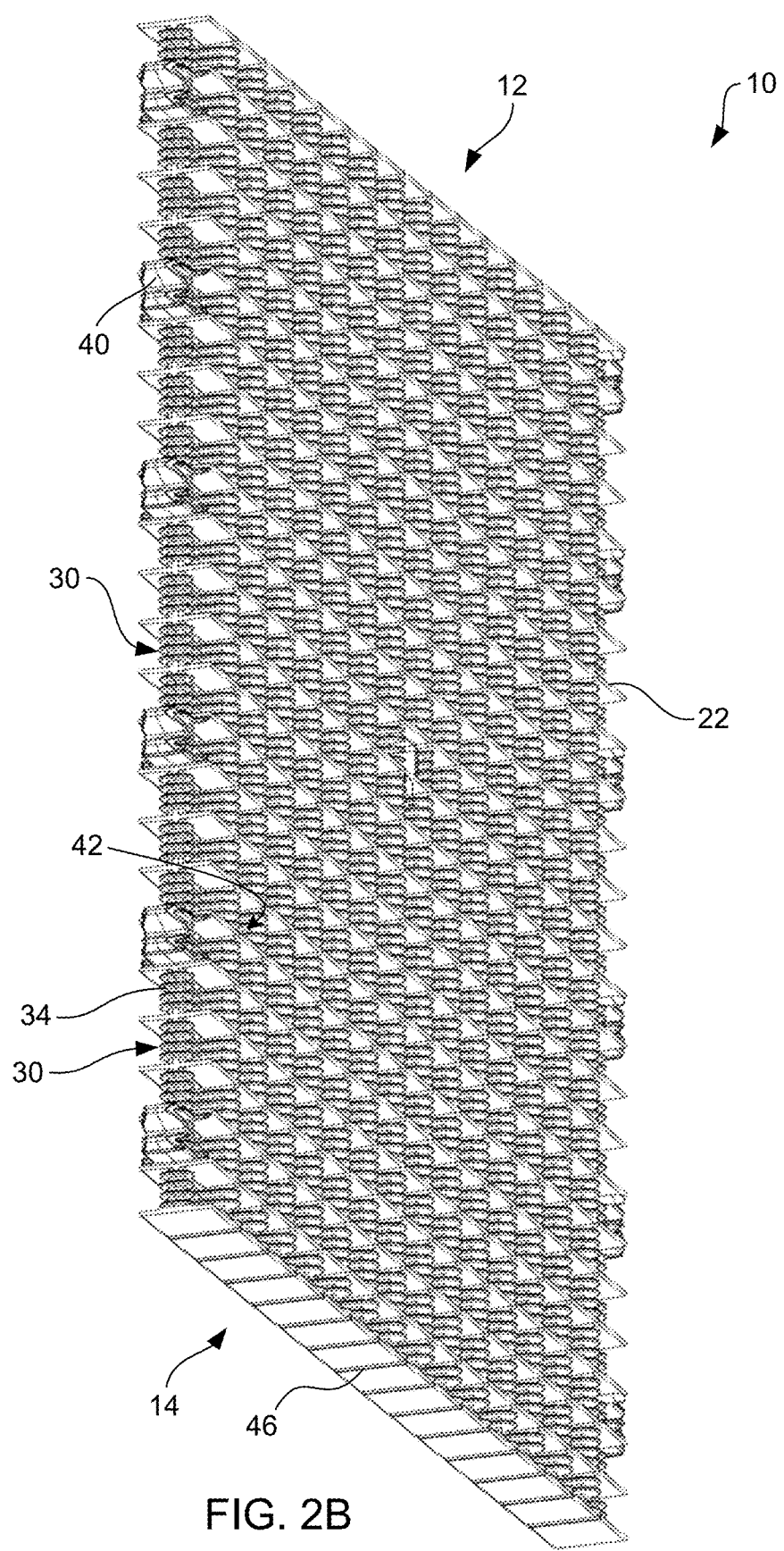
FIG. 2B is a lower left perspective view of the example evaporation panel of FIG. 1.
Figure 2C:
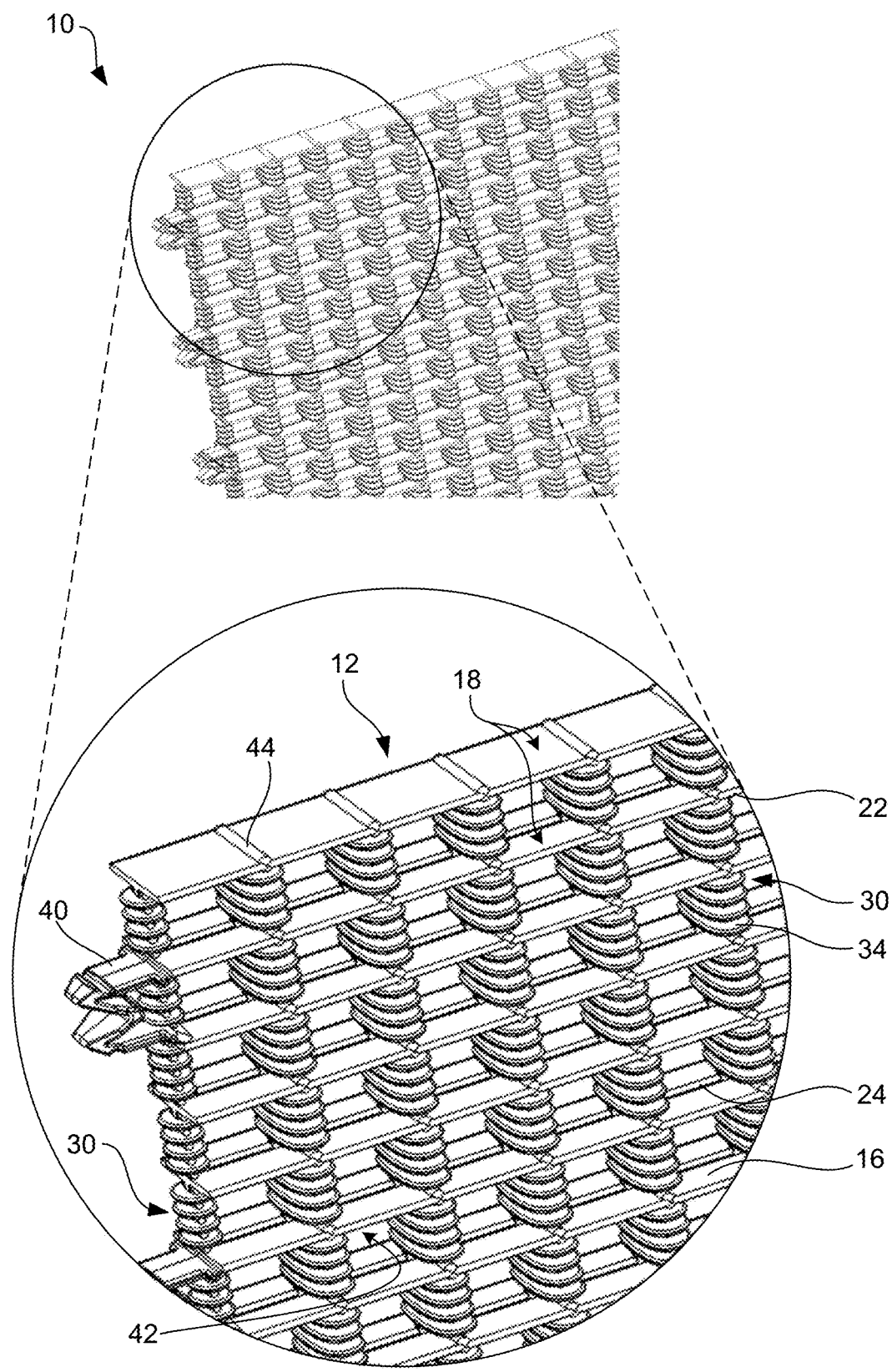
FIG. 2C provides two close-up, alternative perspective views of portions of the example evaporation panel of FIG. 1.
Figure 3:
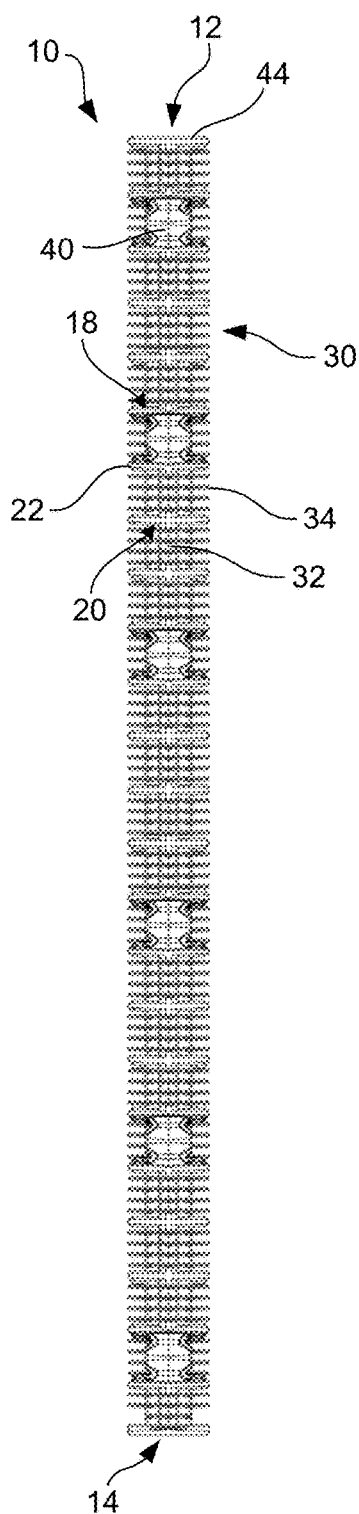
FIG. 3 is a left side or end plan view of the example evaporation panel of FIG. 1.
Figure 4:
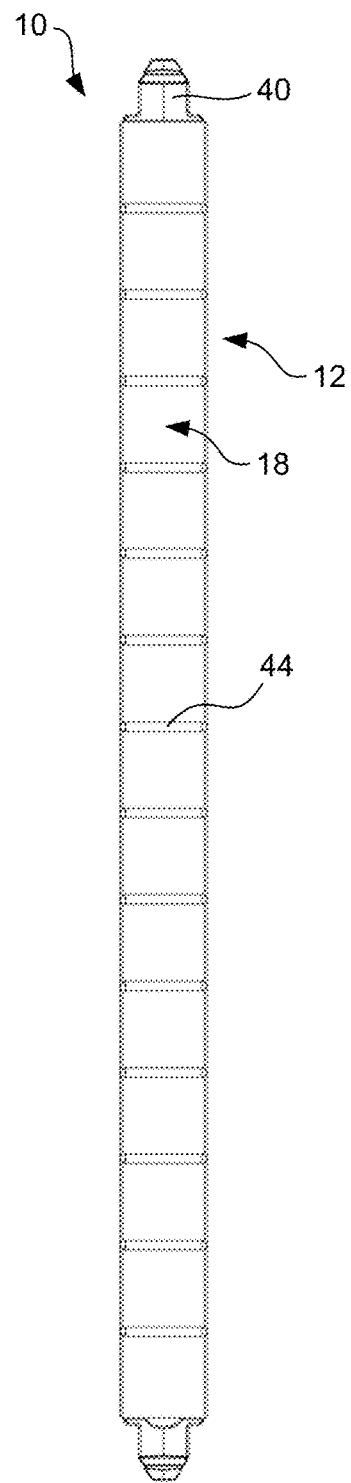
FIG. 4 is a top plan view of the example evaporation panel of FIG. 1.
Figure 5:
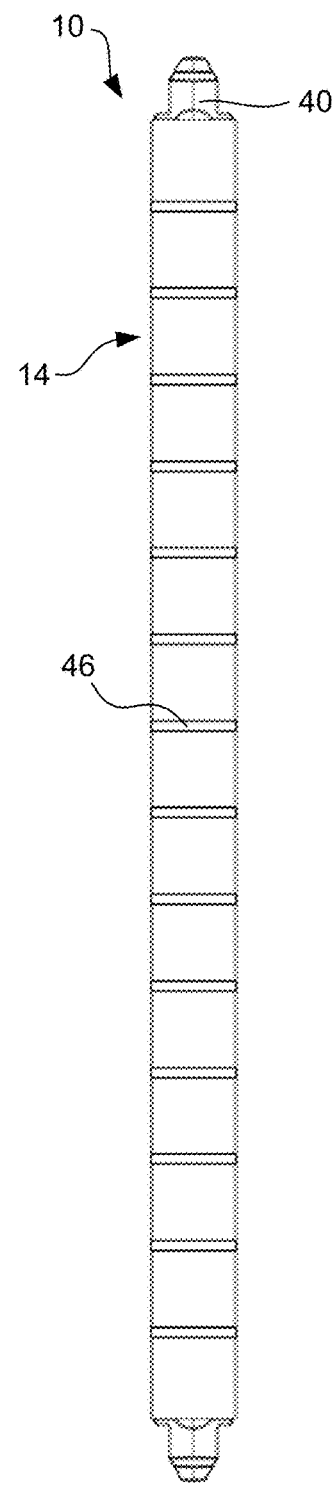
FIG. 5 is a bottom plan view of the example evaporation panel of FIG. 1.

In further detail, and particularly visible in FIGS. 2A, 2B, and 3, evaporation fins 34 found at lateral ends or sides of the evaporation panel (on the support column(s) immediately adjacent to the male connectors) can be smaller in size than other evaporation fins. This is so that the evaporation fins can fit within a female-receiving opening of an orthogonally adjacent evaporation panel when two evaporation panels are joined together.

As can be seen particularly in FIGS. 1, 2A, and 2B, the evaporation panel 10 generally includes a series of vertically stacked, laterally elongated evaporation shelves 16, and a series of vertically oriented support columns 30 positioned periodically along the elongated evaporation shelves which provide support and separation between the series of evaporation shelves. In this configuration, the evaporation shelves and the support columns have the appearance of and provide a "grid structure" with essentially uniformly shaped and aligned rectangular open spaces throughout, and evaporation shelves and support columns defining the grid structure. For definitional purposes, a grid structure such as this, e.g., more than 95% of the area (width by height) is a grid structure with shelves and columns defining the grid with open spaces that are rectangular (or square) defined therebetween, can be more generally described as part of a larger class of structures referred to herein as "grid-like structures."

Support columns 30 and female-receiving openings 42 (or other open spaces), on the other hand, can alternatively be positioned non-periodically or at locations that are not evenly spaced along a length of the evaporation shelves, as shown by example in FIGS. 17-20. This configuration includes openings of multiple sizes, some of which are female-receiving openings 42 and other of which are not as suitable for joining with a male connector 40, referred to more generically as open spaces 48. Though the male connector can be inserted into these open spaces, because of the larger size of the openings, the male connector may not receive the lateral support otherwise provided at the female-receiving openings duo to the close proximity of the support column to male connector releasably joined therebetween. That being mentioned, it is noted, however, that "open spaces" can be of any configuration where a male connector is not ultimately joined therein, whether that be an unused female-receiving opening or a more dedicated open space not intended to receive a male connector. For definitional purposes, even though the evaporation panel structure shown in FIGS. 17-20 includes open spaces of varied lateral size dimensions or widths, the structure still includes vertical columns and horizontal evaporation shelves forming generally rectangular open spaces of different sizes, and thus, this type of structure can be referred to herein as a "grid-like structure," or more specifically, a "non-periodic horizontally varied grid-like structure."

For that matter, evaporation panel structures that include "grid" or "grid-like" portions along a significant area of the evaporation panel, e.g., at least 50% by area (width by height dimension, excluding depth), can also be considered to be grid-like structures. For example, as shown in FIGS. 21A-24D hereinafter, there are two enlarged evaporative airflow channels shown at 58A and 58B. Those channels are not really part of the grid structure, but the evaporation panel in those examples include more than 50% area of grid or grid-like structure up to about 95% area of grid or grid-like structure, so this evaporation panel can be considered to be a "grid-like structure" in accordance with examples of the present disclosure. Furthermore, FIGS. 21C-24D show examples with cross-supports. These cross-supports are provided in some examples for structural integrity, as they provide positive structure that are not involved in retaining and evaporating wastewater in any appreciable amount, and thus are not considered with respect to whether or not a panel is a grid-like structure.

Figure 6A:
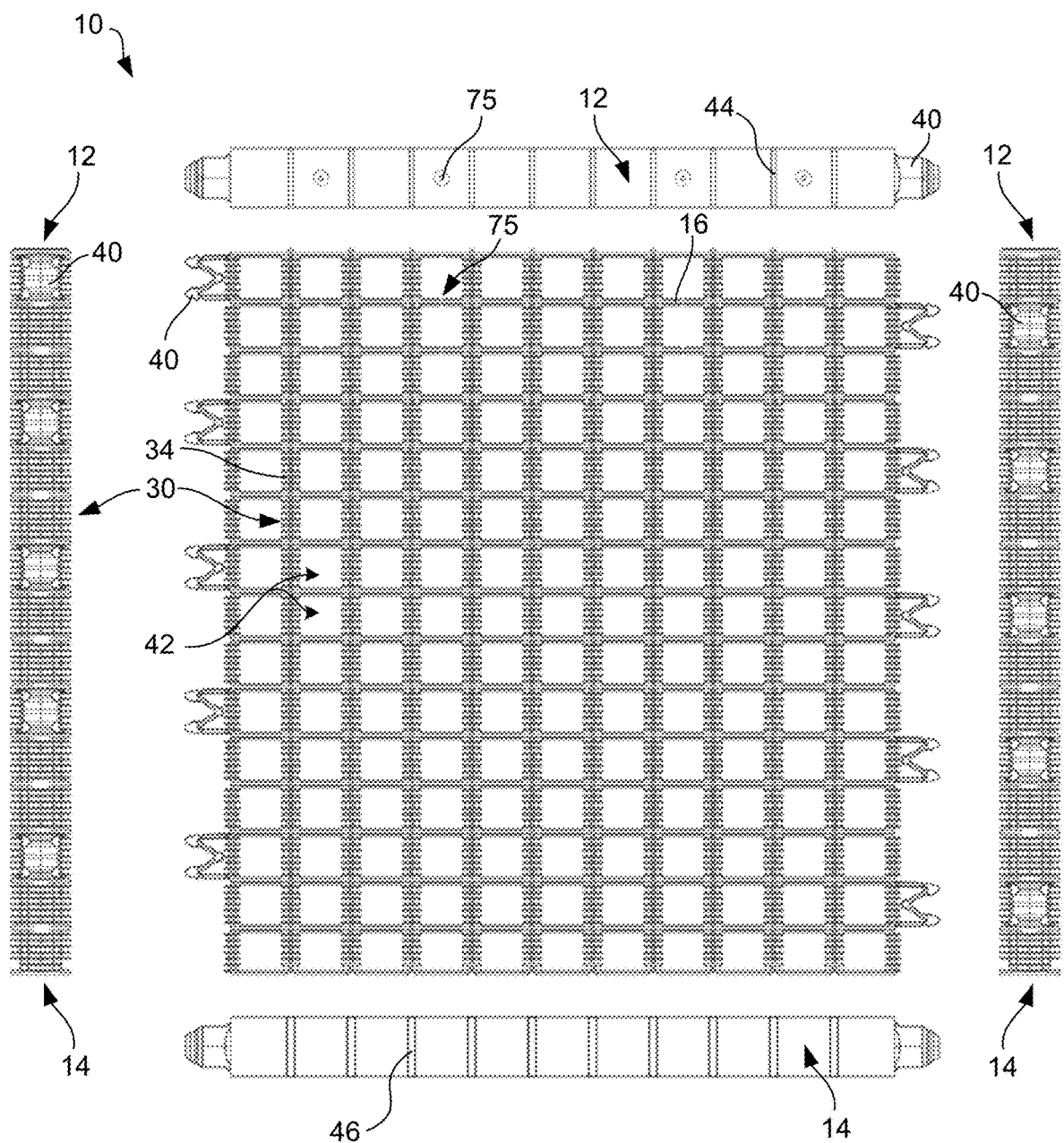
FIG. 6A provides a front plan view, left and right side or end plan views, a top plan view, and a bottom plan view of an alternative example evaporation panel in accordance with the present disclosure.

FIG. 6A depicts an alternative example similar to that shown in FIGS. 1-5, but includes fewer support columns 30, fewer evaporation shelves 16, fewer male connectors 40, and fewer female-receiving openings 42. However, assuming that the evaporation panel has the same relative width and height dimensions as that shown in FIGS. 1-5, the open spaces or female receiving openings can be larger and the male connectors can also be correspondingly larger. Furthermore, the spatial relationship or gaps between evaporation fins 34 can be based on the surface tension of water which may be suitable to form a vertical water column (see FIG. 15, for example), and thus the spacing can remain within the range of 0.2 cm to 1 cm, or 0.3 cm to 0.7 cm, or 0.4 cm to 0.6 cm range. As a result, there can be more evaporation fins present between two adjacent evaporation shelves, for example. In this example, for the most part, there are typically seven evaporation fins at the various support column sections (at the bottom, this section of the support column includes six evaporation fins). Furthermore, in one example, the evaporation shelf depth can be about the same or greater than that shown in FIGS. 1-5, though any suitable depth can be used that can hold a thin layer of wastewater and pass the wastewater therebeneath in a cascading manner as described elsewhere herein. This particular evaporation panel also includes pin-receiving openings 75, which are shown and described in greater detail in the context of FIGS. 28, 31, and 32D. Other structural features can be as previously described, and need not be re-described in the context of this example.

Figure 6B:
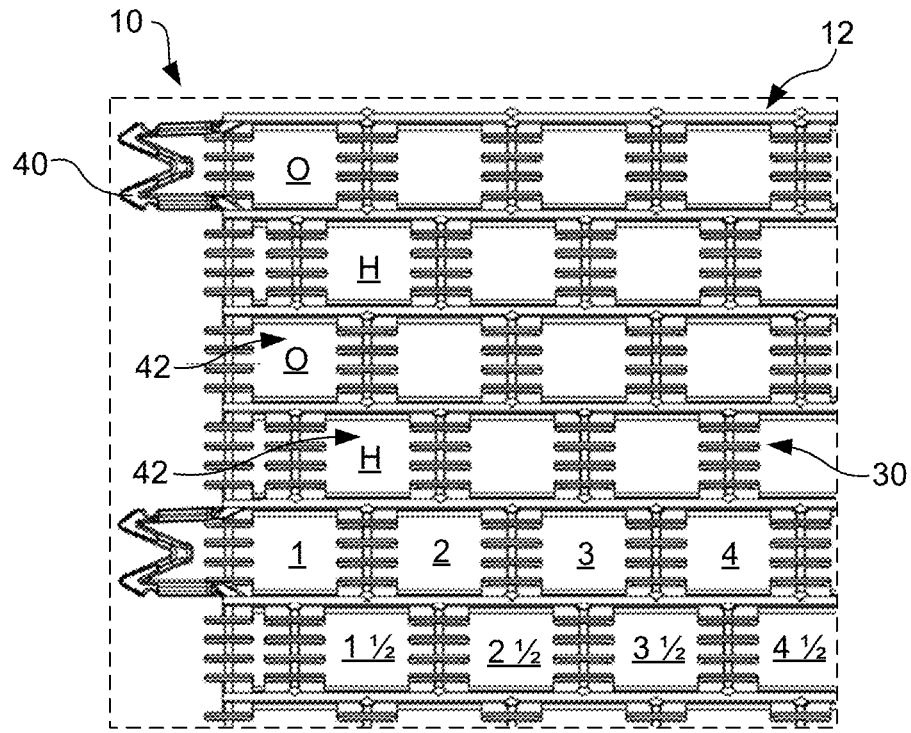
FIG. 6B is a partial front plan view of an alternative arrangement with staggered support columns and female receiving openings therein in accordance with the present disclosure.
Figure 6C:
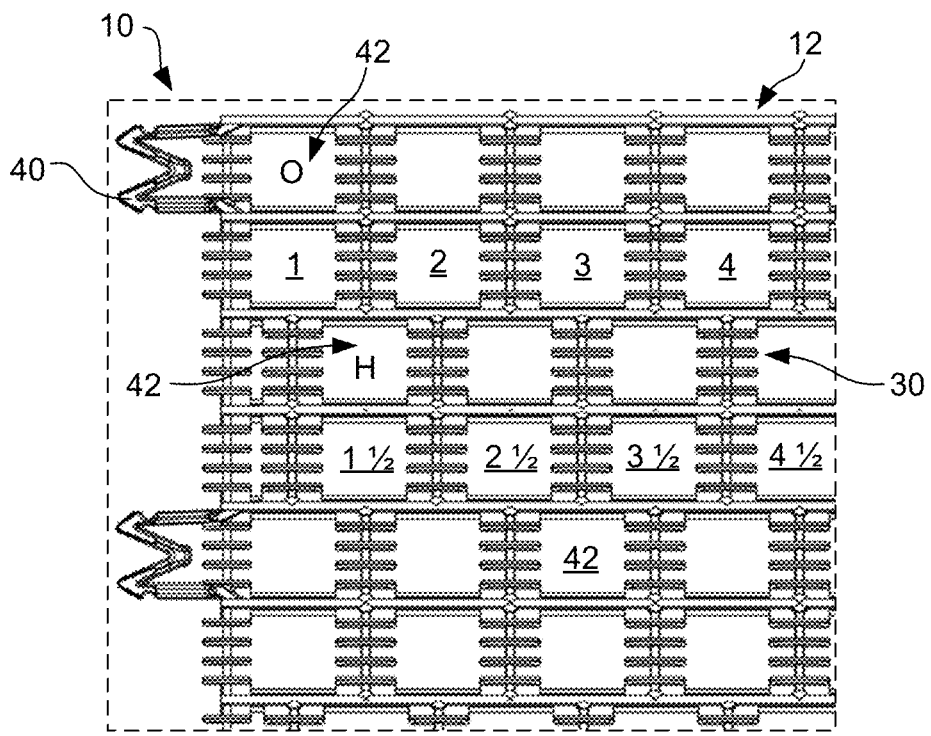
FIG. 6C is a partial front plan view of another alternative arrangement with support columns and female receiving openings that are vertically aligned in pairs and staggered therebeneath in accordance with the present disclosure.

In still another example, as shown generally in FIGS. 6B and 6C, two other alternative example evaporation panel configurations can be used. In accordance with this, the support columns 30 can be vertically staggered from evaporation shelf 16 to evaporation shelf (see FIG. 6B), or staggered in vertical pairs or larger vertical groups (see FIG. 6C), or can be staggered or arranged in any other manner that allows for functional attachment between two orthogonally positioned evaporation panels. Typically, the female-receiving openings 42 can be rectangular in shape, and thus, even though the support columns and the female-receiving openings (or other remaining open spaces) are offset, these configurations can also be considered and defined herein to be "grid-like structures," or more specifically, both of these example evaporation panel structures can be referred to as "horizontally offset grid-like structures."

With further reference to FIGS. 6B and 6C, these evaporation panels can include otherwise similar features described with respect to FIGS. 1-5, and thus, these similar features are neither labeled with reference numerals or re-described again to avoid redundancy. The notable feature described with respect to these specific examples relates to the staggered or offset support columns 30 and open spaces or female receiving openings 42. With these arrangements, similar spacing relationships can exist between parallel panels as compared to the evaporation panels shown in FIGS. 1-5. However, depending on the specific configuration, in one example, male connectors on the relative lateral ends of an evaporation panel can be vertically positioned differently than that shown in FIGS. 1-5 to accommodate the location of vertically aligned female-receiving openings, male connectors on each side of the evaporation panel could be repositioned to allow for evaporation panel alignment, similar to that shown in FIG. 10 (with an orthogonal evaporation panel positioned therebetween). For example, with respect to FIG. 6B in particular, the male connectors at the opposite end (not shown) could be positioned two horizontal positions lower than the male connector shown on the left side in FIG. 6B. In this arrangement, two panels could be aligned in a common plane using female-receiving openings notated as "O." If both male connectors on each side were positioned just one more position further position down vertically, then the male connectors could be positioned in the female-receiving openings notated as "H," and could likewise be vertically aligned similar to that shown in FIG. 10. These arrangements, of course, assume that the evaporation panels being joined together are all resting on a common horizontal surface. Similar accommodations or repositioning of the male connectors vertically (on both sides) could likewise be made to align with the female receiving openings shown in FIG. 6C. The positioning could also determine whether the male connectors would align more properly at female receiving openings notated as openings "O" or "H." In either case, with the staggered arrangements generally, the male connectors can be vertically positioned (and in some examples vertically offset on each opposing side relative to one another) in a manner that is suitable for joining with a vertical alignment of female-receiving openings. Or, if vertical alignment is not a priority, such as when forming evaporation panel assemblies such as those shown in FIGS. 12B, 12C, and 12E, then vertically offset male connectors may not be present. In further detail, by staggering the female-receiving openings, alternative spatial relationships between orthogonally joined evaporation panels can be generated, such as at positions starting at position one and one-half (1½) from the left end of the evaporation panel, or any position thereinafter where male connectors can be joined therewith. These "half" positions can be noted by an "H," as shown in the FIGS. Thus, when using the female receiving openings at an H position, other available positions for a similarly configured evaporation panel can be joined at any other "half" position, e.g., 1½, 2½, 3½, etc. These as well as the "O" positions (based on whole number increments) are notated in the FIGS. for further clarity, from left to right, as position 1, 1½, 2, 2½, 3, etc. Again, depending on which female-receiving openings that are intended to be used, appropriately positioned male connectors on orthogonally oriented evaporation panels can be corresponding integrated therewith.

As a note, with respect to the support columns as described and defined herein, the support column is typically described as spanning the height of the evaporation panel, and thus, portions of the support columns between adjacent evaporation shelves are often referred to herein as support column sections. With the staggered support columns of FIGS. 6B and 6C, the support columns may not vertically span the height of the evaporation panel, but can span various evaporation shelves less than the vertical height of the evaporation panel as a whole. Thus, for purposes of consistency, staggered support column sections that define full open spaces (not including horizontal rows with open positions at the relative "half" positions) can be used to determine the "number" of full support columns (that functionally span rather than literally span the height of the evaporation panel). For example, in FIG. 6B, if there are nine (9) support columns that define eight (8) open spaces notated as "O" type openings (and not "H" type openings), then this evaporation panel can be described generally as having nine (9) support columns, even though there are many more support column sections staggered throughout the body of the evaporation panel. In other words, staggered support column sections that define the "H" positions that are beneath and near the support column sections that define the "O" positions can be considered to be constructively part of the support columns nearby and thereabove and/or thereebeneath, as these half-position support columns do functionally provide support to the support column sections which define the "O" positions.

In accordance with more specific examples, certain wastewater flow paths can be generated using the evaporation panels described herein. In one example, when wastewater is loaded at an upper surface of an evaporation shelf, the wastewater can be transferred to its lower surface (around a tapered or beveled edge in one example) and to additional "upper surfaces" on evaporation shelves positioned therebeneath. Some of the wastewater can also be transferred to the evaporation fins, for example, and then passed down to the next evaporation shelf. Thus, as water is evaporated from the wastewater at various upper surfaces and evaporation fins, a more concentrated wastewater can move downward along the evaporation panel. This can lead to a cascading of wastewater in a generally downward direction where the evaporation removes or reduces water content and the contaminants or other material in the wastewater become more concentrated. The evaporation shelves can be stacked in any number within a single evaporation panel, e.g., from 2 to 200 evaporation shelves, from 4 to 50 evaporation shelves, from 8 to 24 shelves, etc. The evaporation shelves can thus be vertically stacked and spaced apart with horizontal evaporation fins positioned therebetween. In one example, the evaporation panel can include at least four evaporation shelves and at least four support columns between each pair of evaporation shelves, such as shown in any of FIGS. 1-6C, 17-20, 21A-24D, etc. This particular evaporation panel can also include at least nine open spaces, some of which can act as female-receiving openings for receiving one or more male connectors from an adjacently orthogonally positioned evaporation panel.

Figure 7:
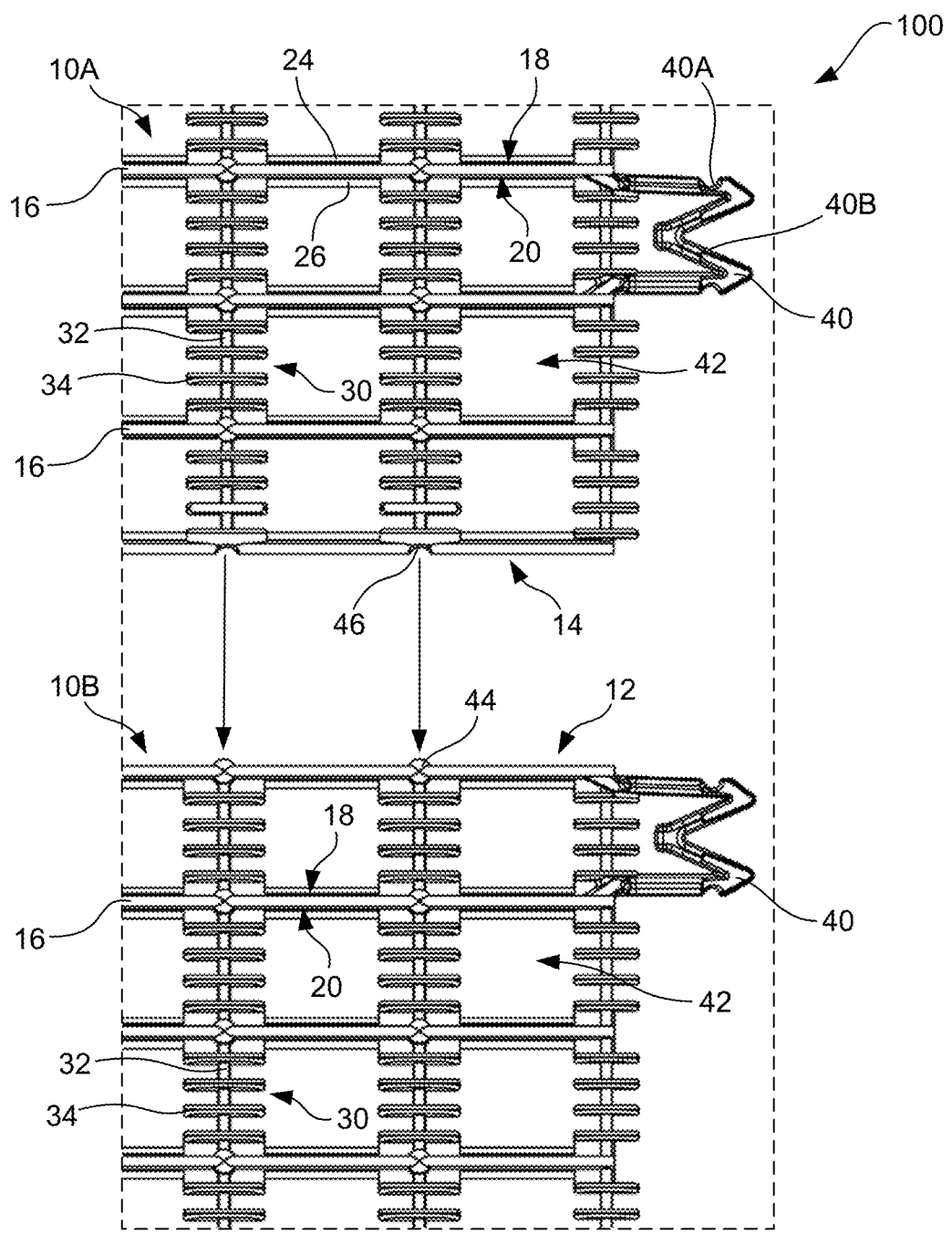
FIG. 7 is a close-up, front plan, partial view showing how two example evaporation panels of an evaporation panel system can be stacked vertically to form an example evaporation panel assembly in accordance with the present disclosure.
Figure 8:
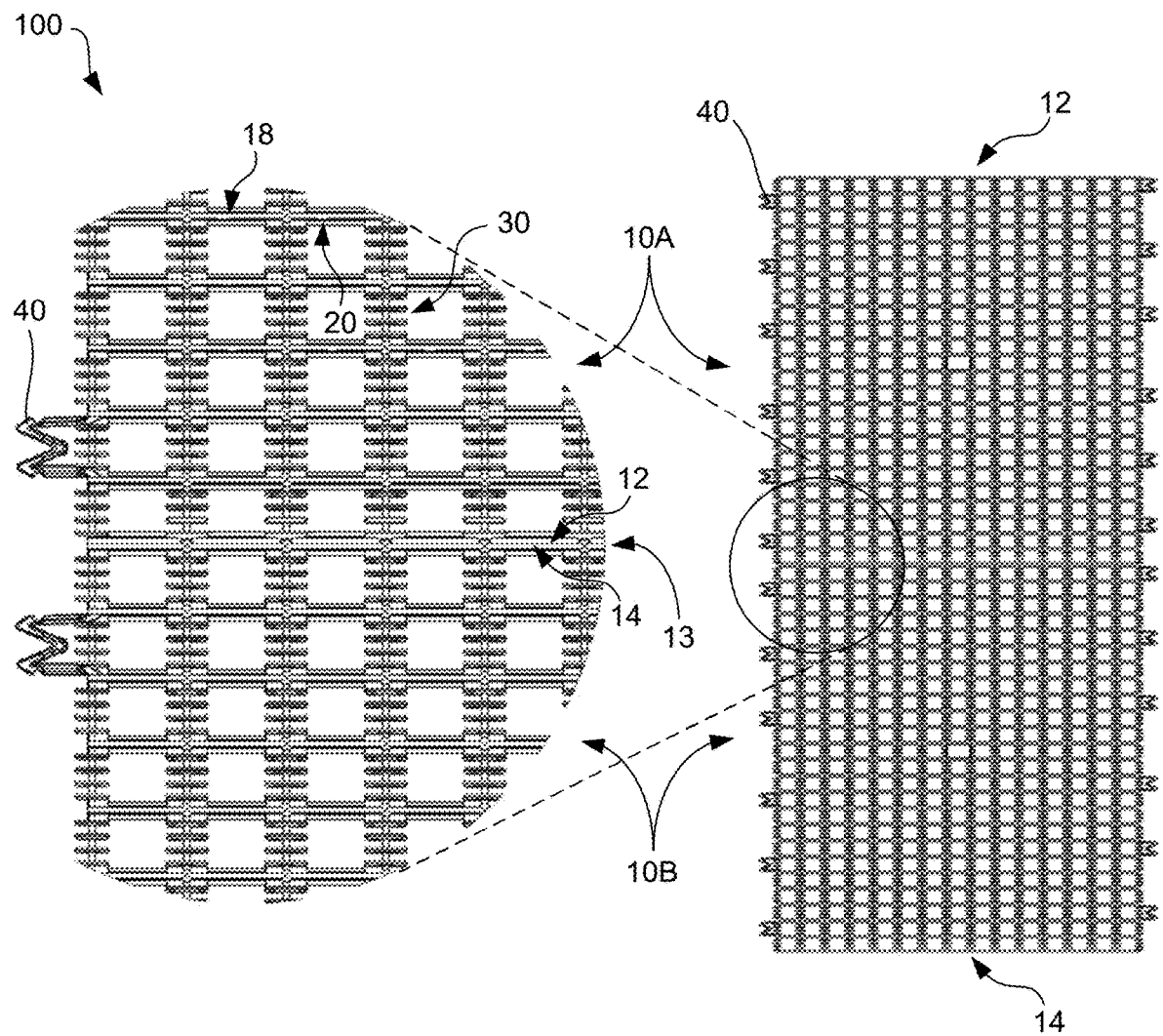
FIG. 8 is a front plan view of two example stacked evaporation panels of an evaporation panel system, including a close-up detailed portion thereof, illustrating an example evaporator panel assembly in accordance with the present disclosure.

FIGS. 7 and 8 depict an example of an evaporation panel system 100 (also referred to as an evaporation panel assembly once assembled), including a first (upper) evaporation panel 10A and a second (lower) evaporation panel 10B. In this example, both evaporation panels of the system can include many similar features as that described in FIGS. 1-6C. For example, the evaporation panels can include a top 12 (shown on evaporation panel 10B of FIG. 7) and a bottom 14 (shown on evaporation panel 10A of FIG. 7). Alternative relative "tops" and "bottoms" are also shown in FIG. 8 after being stacked as well as other relative "tops" and "bottoms" that are not stacked with other evaporation panels. The evaporation panels of FIG. 7 also include evaporation shelves 16, each with an upper surface 18 and a lower surface 20 in this example. The evaporation panels can also include upwardly extending ridges 24 and downwardly extending ridges 26, as well as male connectors 40 and open spaces which can be configured as female-receiving openings 42. With respect to the male connectors particularly shown in FIG. 7 in further detail, the male connectors can include male connector engagement grooves 40A on the top and bottom thereof (relative to the upright and standing operational position of the evaporation panel) for engaging with downwardly extending ridges and upwardly extending ridges, respectively, when joined orthogonally with female-receiving openings of adjacent evaporation panels. Also shown is a male connector locking channel 40B, which in one example can be used to form a locking engagement with a security clip (not shown here but shown in FIGS. 25A-32E hereinafter), thus converting the male connector and female-receiving opening connection from a releasably joined coupling to a locked coupling.

The evaporation panels (10A and 10B) can also include support columns 30 including support beams 32 and evaporation fins 34, as previously described. Notably, when the evaporation panels are joined together, the bottom of evaporation panel 10A can be placed or stacked on the top of evaporation panel 10B. To prevent movement or slippage when in place, the top of the second (lower) evaporation panel can include coupling ridges 44 and can be paired with the bottom of the first (upper) evaporation panel, which can include corresponding coupling grooves 46. When the first and second evaporation panels are joined at the bottom and top surfaces, respectively, the lowermost shelf of evaporation panel 10A and the uppermost shelf of evaporation panel 10B become unified to form a "single" evaporation shelf, shown generally at panel interface 13 in FIG. 8. In this configuration, the first evaporation panel can either rest on the second evaporation panel (as shown in FIG. 8), or the evaporation panels can be clipped together to prevent shifting movement using security clips (not shown here, but shown in detail in FIGS. 25A-32F). In accordance with a further detail, in this example, the evaporation fins that are shown at a lateral end or ends of the evaporation panel can be slightly smaller than the evaporation fins present elsewhere on the evaporation panel. In this example, this size difference is provided so the evaporation fins are small enough to fit within the female-receiving openings of an adjacent evaporation panel that may be joined laterally and orthogonally therewith. That being stated, in other examples, the evaporation fins can be the same, smaller size along the entire evaporation panel, or the evaporation panel can be configured so that there are no evaporation fins at lateral ends of the evaporation panel to avoid interference when orthogonally joining two evaporation panels.

Figure 9:
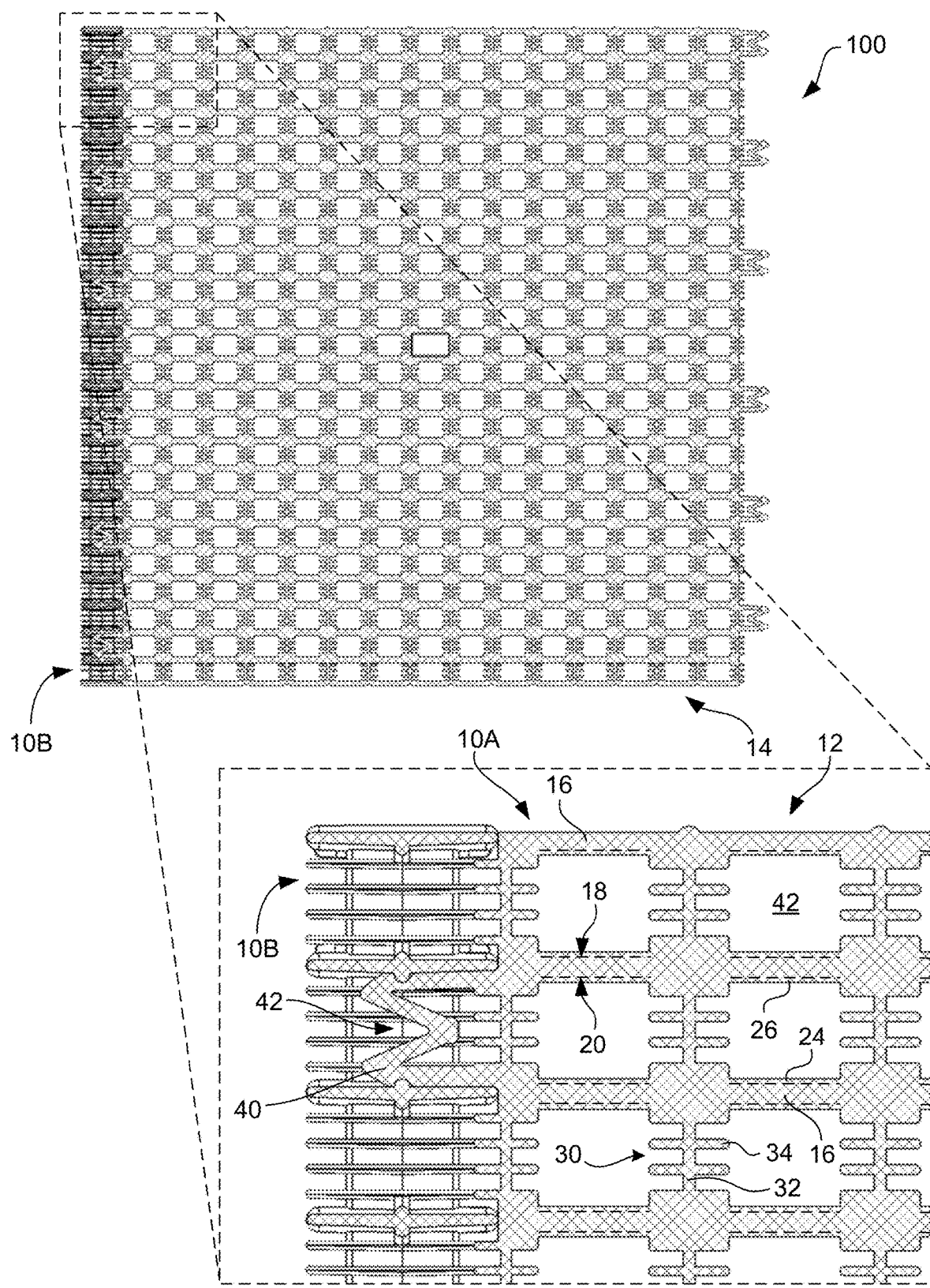
FIG. 9 is a cross-sectional views of two example evaporation panels of an evaporation panel system, including a close-up detailed portion thereof, joined together orthogonally to form an example evaporator panel assembly, more specifically an L-shaped sub-assembly, in accordance with the present disclosure.

FIG. 9 depicts another example of an evaporation panel system 100 (more specifically an evaporation panel sub-assembly as currently shown joined in an L-shaped configuration), including a first (front view) evaporation panel 10A and a second (side or end view) evaporation panel 10B, connected laterally together in an orthogonal orientation. In this example, both evaporation panels of the system can include similar features as that described in FIGS. 1-8. For example, the evaporation panels can include a top 12 and a bottom 14, as well as evaporation shelves 16, each of which include an upper surface 18 and a lower surface 20 in this example. The evaporation panels can also include upwardly extending ridges 24 and downwardly extending ridges 26, as well as support columns 30 including support beams 32 and evaporation fins 34, as previously described. In this example, a male connector 40 (or 6 vertically aligned male connectors) are shown clipped into a female-receiving opening 42 (or 6 corresponding vertically aligned female-receiving openings) so that the evaporation panels become releasably joined or joined together in an orthogonal orientation.

The evaporation panel system or assembly shown in FIGS. 7-8 show vertically stacked evaporation panels, and the evaporation panel system or assembly (which is an L-shaped sub-assembly) shown in FIG. 9 shows laterally joined orthogonally oriented evaporation panels. Thus, the evaporation panel system or assembly of FIGS. 7-8 and the evaporation panel system or assembly shown in FIG. 9 can be combined to form more complex evaporation panel assembly structures, e.g., laterally joined and vertically stacked. For example, a more complicated laterally joined evaporation panel system can be formed using many evaporation panels, and these more complicated laterally joined evaporation panel systems can be stacked vertically. As one might appreciate after considering the present disclosure, very complicated structures the size of large buildings with rooms, hallways, stairs, walls, open channels, etc., can be formed by laterally joining evaporation panels in an orthogonal orientation (in an X-Y direction or axes viewed from above) to form a level of joined evaporation panels, and evaporation panels (levels) can likewise be joined together and stacked as high as reasonable (in a Z direction or axis viewed from above). Thus, by adjoining evaporation panels laterally, and in many instances, stacking vertically, three-dimensional larger structures, including very complicated and or large structures, can be assembled. In one example, the assemblies can be put together without the need or use of special tools since the male connectors can be snapped into female-receiving openings, and further, because evaporation panels can likewise be stacked vertically by incrementally laterally building out additional levels on top of previously laterally joined levels, as shown and described herein. In some examples, however, when the use of tools would be advantageous, such as the use of a mallet to joint panels, or the use of a leveraging tool to disconnect evaporation panels (or security clips described hereinafter), such tool can be used.

Figure 10:
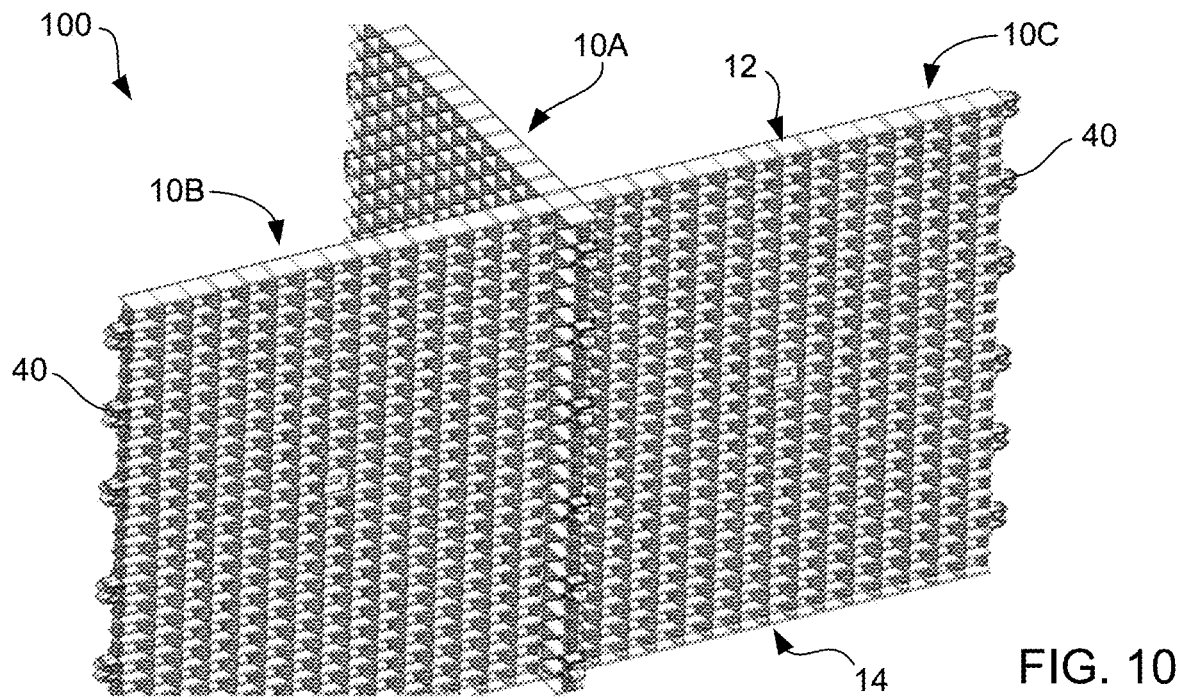
FIG. 10 is a perspective view of three example evaporation panels of an evaporation panel system joined together to form an example evaporator panel assembly in accordance with the present disclosure.
Figure 11:
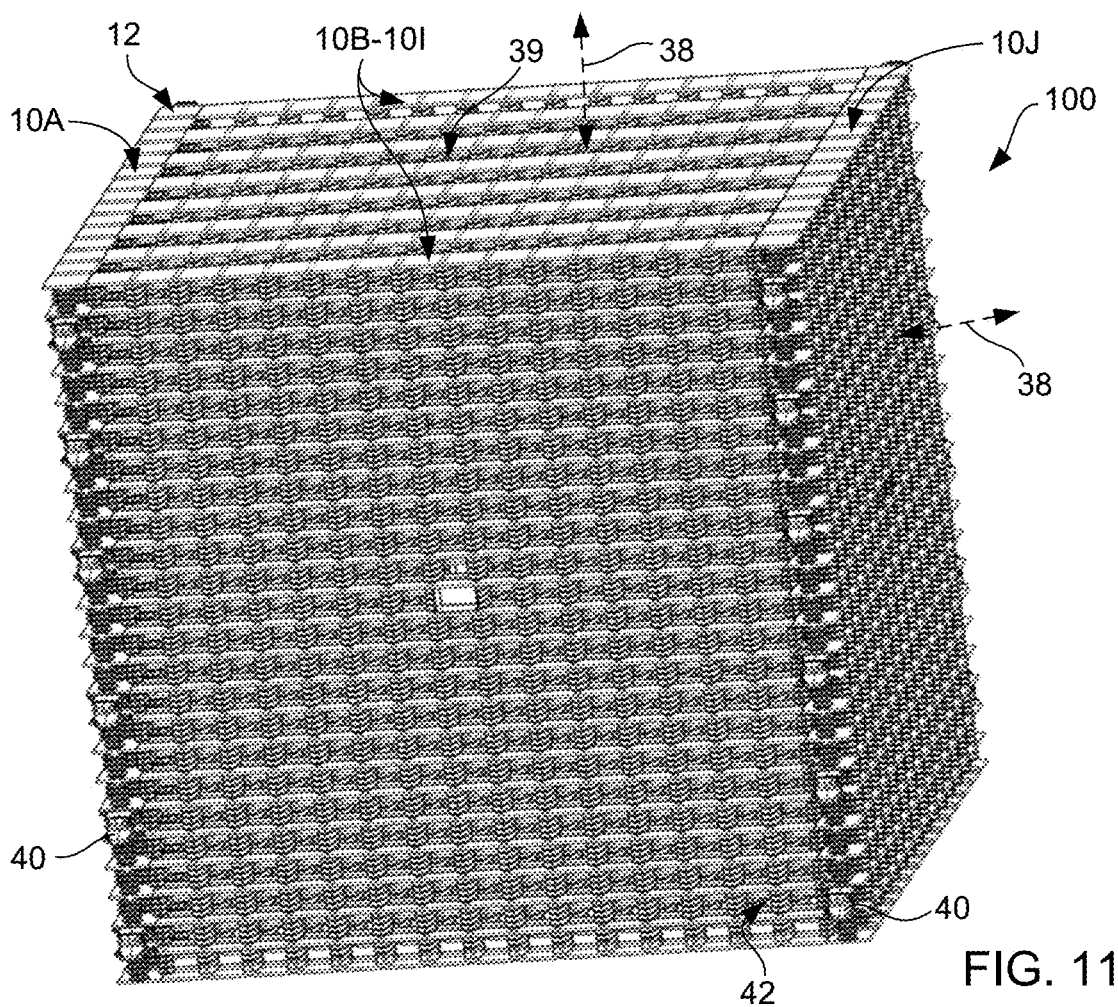
FIG. 11 is a perspective view of ten example evaporation panels of an evaporation panel system joined together to form an example evaporator panel assembly, more specifically a cube-shaped sub-assembly, in accordance with the present disclosure.

In accordance with this, three examples of more complicated (3 or more panels) laterally joined evaporation panels are shown generally in FIGS. 10-12, each of which could be further built out laterally and/or stacked vertically. FIG. 10, for example, provides a perspective view of three evaporation panels joined laterally together to form a T-shaped assembly. More specifically, this can be described as a two-panel T-shaped asymmetrical T-shaped sub-assembly (10A, 10B) with a third evaporation panel (10C) positioned in vertical and lateral alignment with evaporation panel 10B. In further detail, a first evaporation panel 10A, has a first orientation, and a second evaporation panel 10B and a third evaporation panel 100 are orthogonally orientated with respect to the first evaporation panel. As mentioned, the second and third evaporation panels are positioned in-line with respect to one another, sharing a common vertically aligned row of female-receiving openings found on evaporation panel 10A. This is made possible in this example because the male connectors 40 are vertically offset with respect to each side of each individual evaporation panel. Thus, the male connectors from evaporation panel 10B (on the right side) are not designed to be received by the same female-receiving openings 42 as the male connectors from evaporation panel 100 (on the left side). In other words, these male connectors are vertically offset on each side of the evaporation panels by a single position. In other designs, there may be advantages to offsetting male connectors on opposite lateral ends of an evaporation panel by two vertical positions, such as when joining panels with horizontally offset female receiving openings. See, for example, FIG. 6B.

FIG. 11, on the other hand, provides a perspective view of ten evaporation panels joined laterally to one another to form a cube-shaped configuration. Specifically, a first evaporation panel 10A has a first orientation, and a tenth evaporation panel 10J has a parallel orientation with respect to evaporation panel 10A. Evaporation panels 10B-10I are positioned between and orthogonally oriented with respect to evaporation panels 10A and 10J. A single panel space (or one position) is left between or remains unused between adjacent evaporation panels 10B-10I to allow for airflow 38 as well as allowing space for evaporative water vapor to become vented therefrom, such as through any of a number of inter-panel spaces 39. Airflow and evaporative venting can also be provided by female-receiving openings (or open spaces/voids) that are not otherwise occupied by a male connector. Assembly spacing between panels in conjunction with panel openings can drive airflow across surfaces using natural drafts induced by temperature differential (e.g., evaporation cooling inside vs. ambient temperature outside of the evaporation panel assembly) for enhanced evaporation speeds.

It is noteworthy that the "cube" configuration shown in FIG. 11 is one example of a basic unit structure or sub-assembly that can be used repeatedly to form much larger and more complex evaporation panel assembly structures. For example, many cubes can be formed which are laterally locked together and vertically stacked to form larger evaporation panel assemblies in the form of large structures, towers, etc., which can include stairs, walls, platforms, bridges, etc. formed using evaporation panels, such as that shown in FIGS. 34-36 hereinafter. As a further note, the cube-shaped configuration shown in FIG. 11 when used as a building block to laterally form larger structures can "share" common evaporation panels with adjacently positioned "cubes." For example, the first or tenth evaporation panel 10A or 10J of the cube in FIG. 11, or the second or ninth evaporation panel 10B or 10I of the cube of FIG. 11 may function as the first evaporation panel for an adjacent "cube" assembly (see FIG. 12D, for example). Thus, the term "cube" can be defined to include general cube-like structures (such as comb-shaped sub-assemblies), even if that structure shares one or more evaporation panel with an adjacently positioned "cube."

With this example in mind, the term "unit structure" or "sub-assembly" can be used to refer to any basic evaporation panel configuration that can be used repetitiously or semi-repetitiously to be joined together (sometimes with other types of sub-assembly shapes or other configurations of sub-assembly shapes of the same type) to laterally build out more complex evaporation panel assemblies. Sub-assemblies refer to laterally joined evaporation panels, and not vertically stacked evaporation panels. Furthermore, "sub-assemblies" are basic units of any number of orthogonally joined evaporation panels that can generally be about one panel wide by about one panel deep by one panel high, e.g., 1×1×1 panel dimension. Thus, any configuration that is the size of about 1×1×1 panel can be considered a "sub-assembly" in accordance with examples of the present disclosure. Notably, the dimensional relationship of 1×1×1 does not infer an absolute relational dimension, but rather, only relative dimensional ratios consistent with the manner in which the evaporation panels join together orthogonally. For example, evaporation panels that are two feet wide, two feet tall, and two inches deep can be used to form an essentially 2 cubic foot sub-assembly. That being stated, the exact relational dimension of each sub-assembly may not be an exact 1×1×1 dimension (or 1:1:1 size ratio), as when panels are joined orthogonally, the depth of one or two evaporation panels can add to the width of an orthogonally oriented evaporation panel. For example, if a panel is two feet wide by two feet tall by two inches deep, a 1×1×1 sub-assembly may be two feet four inches wide, two feet tall, and two feet deep (assuming two evaporation panels are oriented in parallel with one or more intervening evaporation panels orthogonally positioned therebetween); or the sub-assembly may be two feet two inches wide, two feet tall, and two feet deep (if there is only one evaporation panel in one "end" or "spine" evaporation panel in one of the two orthogonal orientations relative to parallel "teeth" evaporation panels). These configurations would still be considered to be a "sub-assembly" in accordance with examples of the present disclosure. Thus, for definitional purposes, a 1×1×1 evaporation panel sub-assembly, or a 1:1:1 evaporation panel sub-subassembly size ratio includes the addition of relative depths of "end" or "spine" evaporation panels, which will be defined in further detail hereafter.

Figure 12A:
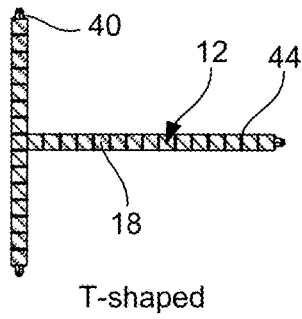
FIG. 12A is a top plan view of several different example sub-assemblies that can be formed to assemble larger and more complex evaporation panel assemblies in accordance with examples of the present disclosure.
Figure 12A:
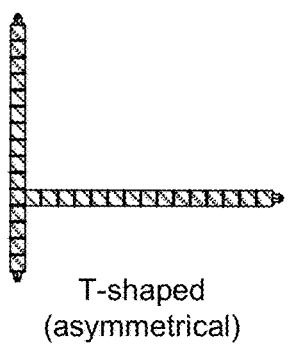
Figure 12A:
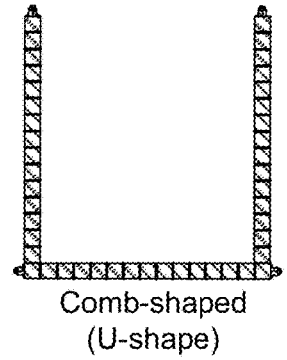
Figure 12A:
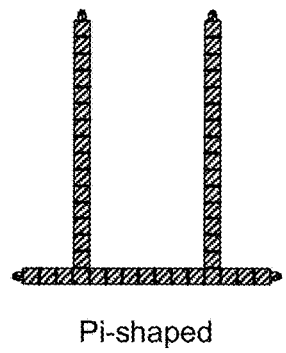
Figure 12A:
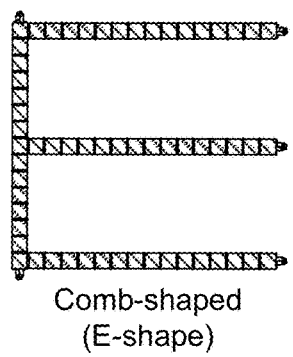
Figure 12A:
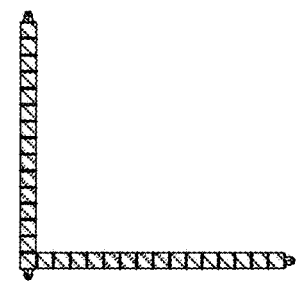
Figure 12A:
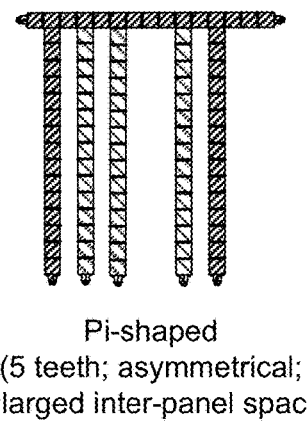
Figure 12A:
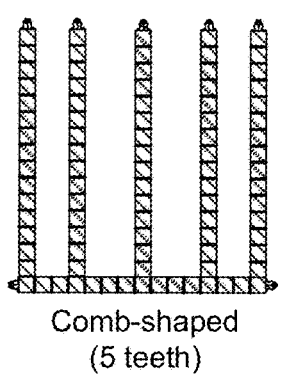
Figure 12A:
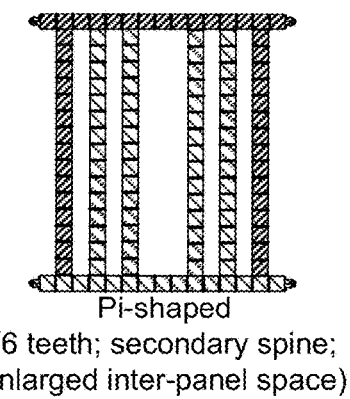

In some examples, there may be two or more types of sub-assemblies or unit structures that can be formed that may be used to build out more complex evaporation assemblies in a repetitive or semi-repetitive manner. Thus, a "cube" is but one example of such a unit structure or sub-assembly. A cube may, for example, be joined with (another) comb-shaped sub assembly to form two adjacent cubes which share a common joining evaporation panel, such as that shown by example in FIG. 12 D. Furthermore, other unit structures or sub-assemblies that can be joined with other sub-assemblies to build more complex evaporation panel assemblies, and such sub-assemblies can include the following: L-shaped, T-shaped, comb-shaped (e.g., U-shaped, E-shaped, cube-shaped, etc.), pi-shaped, asymmetrical shapes thereof, etc. Some of these example configurations are shown in FIG. 12A, each of which depicts a top 12 view of nine example sub-assemblies. There are, of course, other possible sub-assemblies that can be formed, but these nine embodiments illustrate various example configurations or shapes, including variants thereof, which are intended to help with understanding each type of sub-assembly. The sub-assemblies shown in FIG. 12A (and larger assemblies shown in FIGS. 12B-E) are illustrated from an upper or top plan view for clarity, as it is from this view that the shape of the sub-assembly can be best viewed. From this view, an upper surface, or top of an uppermost evaporation shelf is shown, which can include coupling ridges 44. The upper surface can be used for vertically stacking additional evaporation panels thereon, and the coupling ridges can be used to engage with coupling grooves (not shown) on a bottom (not shown) of the next level of evaporation panel sub-assemblies or assemblies. In these examples, though coupling ridges are not required, they are conveniently positioned so that from this upper plan view, an approximate location of vertical support columns (see FIG. 1) can be understood, e.g., directly beneath the coupling ridges. Likewise, vertically aligned female receiving openings can be understood and visualized as being vertically aligned generally below the areas between adjacent coupling ridges. That being mentioned, the support columns need not align with the coupling ridges, and any of a number of relative evaporation panel sizes, configurations, etc., can be used to form sub-assemblies as described herein. For purposes of the simplicity and clarity of discussion, however, the evaporation panels shown in FIGS. 12A-E generally have an example configuration similar to that shown in FIG. 1-5 or 21A-23, without any particular limitation implied thereby. Male connectors 40 are also shown and can be seen from these nine top plan sub-assembly views of FIG. 12A. Again, these structures are viewed from above, similar to that shown in FIG. 4. Female-receiving openings, evaporation shelves (other than the topmost shelf), support columns, evaporation fins, etc., are not shown, as they are obscured by the top of each evaporation panel.

The shapes described herein with respect to the various sub-assemblies are based on a top plan view of assembled evaporation panels. For brevity and to avoid overly complicated descriptions of the various sub-assemblies that can be used to form more complex evaporation panel assemblies, e.g., towers, in describing the various sub-assembly shapes below in further detail, the term "panel" may be used generally rather than the longer term "evaporation panel." Furthermore, for each of these sub-assemblies described herein, even spacing between parallel panels, variable spacing between panels, symmetrical spacing and/or positioning of panels, or asymmetrical spacing and/or positioning of panels can be used. In examples where female-receiving openings may be horizontally offset in the form of a horizontally offset grid-like structure, such as that shown in FIGS. 6B and 6C; or in examples which use non-periodic horizontally varied grid-like structures, such as that shown in FIGS. 17-20, alternative spatial relationships between orthogonally joined "teeth" panels along a "spine" panel of the sub-assembly can be present. These arrangements are not specifically discussed in the context of FIGS. 12A-E, but rather, these other types of grid-like evaporation panels can be similarly assembled to form similarly configured panel sub-assemblies with just a few minor panel configuration modifications in some instances.

Turning now to a more detailed description of the various sub-assemblies shown in FIG. 12A, the terms "L-shaped" and "T-shaped" are essentially self-explanatory. L-shaped refers to two panels orthogonally positioned where a male connector(s) at one end of a first panel is joined with one (or more) of the laterally outermost female-receiving openings (e.g., vertically aligned female-receiving openings). The general shape is shown in FIG. 12A and labeled "L-shaped." T-shaped refers to two panels orthogonally positioned where a male connector at one end of a first panel is joined with any vertically aligned female-receiving opening other than those present at the outermost position. Two examples are provided in FIG. 12A which are labeled "T-shaped" and "T-shaped (asymmetrical)." In these examples and others hereinafter, evaporation panels which use their male connector(s) to join with a female-receiving opening of another panel can be referred to, for convenience, as a "tooth" or in plural as "teeth." The evaporation panel which utilizes the female-receiving opening to receive a male connector can be referred to as a "spine," or if there are two (one at each end of the "tooth" or "teeth," then this second evaporation panel can be referred to as a "secondary spine" for convenience. These terms are used primarily for additional clarity in describing sub-assembly structures.

Another basic sub-assembly structure is referred to herein as "comb-shaped," which includes three or more panels, where a second and third panel are orthogonally positioned relative to a first panel, and the male connectors of the two panels are each individually joined with the laterally outermost female-receiving openings of the first panel. In other words, the two panels, or "teeth" attach to the first panel, or "spine," at opposite ends thereof within female-receiving openings of the first panel. Notably, additional comb teeth may also be positioned between the two outermost comb teeth. Specific examples of comb-shaped sub-assemblies are shown in FIG. 12A, and labeled "Comb-shaped (U-shaped)," "Comb-shaped (E-shaped)," and "Comb-shaped (5 teeth)." The more specific term "E-shaped" indicates that there is one panel between the two outermost panels, the term "5 teeth" indicates that there are three panels between the two outermost panels, and so forth. The U-shaped sub-assembly has no additional panels between the two outermost panels. In one example, a comb-shaped sub-assembly can alternatively be referred to as a "partial cube-shaped" as the teeth at a distal end with respect to the spine can be joined with a cube-shaped sub-assembly or another comb-shaped or a different type of sub-assembly to form a cube, or even to form a series of repetitive cubes with one or more shared common panel. Alternatively, a "cube-shaped" sub-assembly can likewise be referred to as a "comb-shaped" sub-assembly because it includes the spine and the two teeth positioned at both outermost positions. However, the cube-shaped sub-assembly also includes another panel that is joined to a distal end of the teeth as a secondary spine that has a parallel orientation with respect to the spine. An alternative example comb-shaped panel that can be used to form a cube-shaped sub-assembly is shown in FIG. 12A, and referred to as "Comb-shaped (5 teeth)." Unlike the cube-shaped sub-assembly shown in FIG. 11 with evenly spaced teeth, this sub-assembly structure has unevenly spaced evaporation panels or teeth leaving two vertically aligned open spaces with two open positions and two vertically aligned open spaces with three open positions. The inter-panel spaces with three open spaces can be referred to as "enlarged inter-panel spaces" relative to the other inter-panel spaces.

Another sub-assembly shape that can be particularly useful for building strong and potentially quite tall evaporation panel assemblies is the pi-shaped sub-assembly. The term "pi-shaped" can refer to shapes (when viewed from above) which include a first evaporation panel (spine), and a second panel and a third panel (teeth) that are positioned orthogonally with respect to a first panel, leaving at least the outermost female-receiving opening positions on the first panel or spine open. Thus, the shape approximates the general configuration of the Greek symbol for pi ($\pi$), e.g., at least one panel (the first panel) having the laterally outermost female-receiving openings remaining unused or open and including two (or more) orthogonal panels joined thereto. The pi-shaped sub-assembly can be symmetrical, with the same number of outermost female-receiving opening positions of the first panel or spine open (e.g., one vertically aligned female-receiving opening position on each side, two on each side, etc.), or can be asymmetrical, with a different number of open positions on each side of the first panel or spine open (e.g., one vertically aligned female-receiving opening position on one side, and three open positions on the other side, etc.). There are instances where asymmetrical pi-shaped sub-assemblies may be used with symmetrical pi-shaped sub-assemblies to achieve a more ordered evaporation panel assembly as a whole. See for examples FIGS. 12C and 12E, for example. For further clarity, as shown in FIG. 12A, several pi-shaped sub-assemblies are shown from a top plan view perspective and are more specifically labeled therein by example. Additionally, finer or closer cross-hatching is used on some of the pi-shaped sub-assemblies to clearly show which evaporation panels can be considered to be part of the "pi-shape." For example, one pi-shaped sub-assembly is labeled "Pi-shaped," and in this example, includes two open laterally outermost vertically aligned female-receiving opening columns on each side unused. This pi-shaped sub-assembly could likewise leave only one laterally outermost female-receiving opening column on each side unused (or three on each side unused, etc.). In further detail, similar terminology as used to describe the "comb-shaped" sub-assemblies can be used for the individual panels of the pi-shaped sub-assemblies, such as the term "teeth" and "spine." However, it is noted that a "comb-shaped" sub-assembly places the outermost "teeth" at the laterally outermost positions along the "spine," whereas, the "pi-shaped" sub-assembly leaves at least the laterally outermost positions along the "spine" open. As a second example, another pi-shaped sub-assembly is labeled "Pi-shaped (5 teeth; asymmetrical; enlarged inter-panel space)," which includes 5 teeth with the outermost teeth being asymmetrically positioned with respect to the unused outermost female-receiving opening vertically aligned positions (one column on one side left open and three columns on the other side left open). The enlarged inter-panel space can be useful for generating additional airflow and/or evaporation, particularly when using evaporation panels such as those shown in FIGS. 21A-24D, each of which includes one or more enlarged evaporation airflow channels, shown therein at 58A and 58B. These enlarged channels can be positioned and sized to align with the enlarged inter-panel space, which in this example are centrally located. The term "enlarged" is a relative term meaning that the space between the panels that define this space is larger than other spaces of the sub-assembly. Still another example is labeled "Pi-shaped (6 teeth; secondary spine; enlarged inter-panel space)," which includes three evenly spaced teeth toward one end of the spine, and three evenly spaced teeth toward another end of the spine, again leaving the laterally outermost (e.g., one on each side in this instance) vertically aligned female-receiving opening positions open. This arrangement, again, leaves an enlarged inter-panel space. A secondary spine panel is also included that is present at an opposite end of the teeth panels relative to the spine panel.

As a note, when joining multiple sub-assemblies together laterally or vertically to form a more complex evaporation panel assembly, the fact these structures are described as discrete "sub-assemblies" in no way infers that each sub-assembly must be first formed before any two sub-assemblies can be joined together laterally. On the contrary, when building an evaporation panel assembly, multiple panel sub-assemblies may be put together at the same time as one another, panel sub-assemblies can be partially assembled when joined with laterally adjacent panel sub-assemblies or adjacent partially assembled panel sub-assemblies or individual evaporation panels of an adjacent panel sub-assembly, larger evaporation panel assemblies can be formed one evaporation panel at a time without regard to the configuration of panel sub-assemblies incidentally formed during a build, or panel sub-assemblies may be fully joined or formed prior to assembling two or more sub-assemblies together to form a larger evaporation panel assembly. In other words, "sub-assemblies" are defined herein to describe portions of the evaporation panel assembly, once assembled, and does not infer that sub-assemblies must first be put together before joining respective panel sub-assemblies, unless the context dictates otherwise.

Figure 12B:
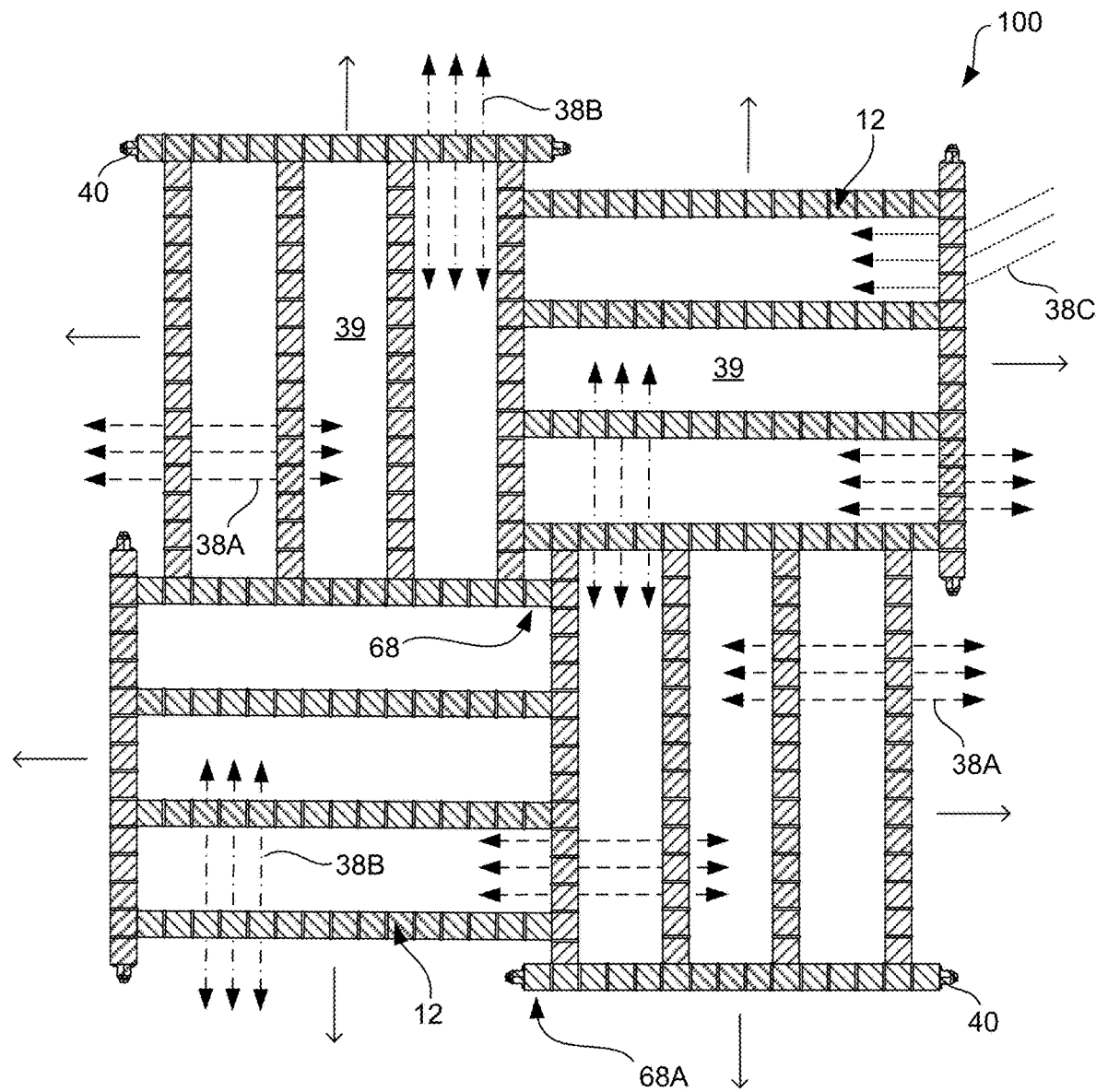
FIG. 12B is a top plan view of an arrangement of twenty example evaporation panels of an evaporation panel system joined together to form four pi-shaped sub-assemblies (4 teeth), which are also further joined together to form an example evaporation panel assembly in accordance with the present disclosure.

FIG. 12B shows a top 12 plan view of twenty (20) evaporation panels of an evaporation panel assembly 100, where the evaporation panels are joined laterally to one another to form a pinwheel-like configured evaporation panel assembly. Though obscured and thus not labeled or shown in detail, individual evaporation panels can include a plurality of stacked shelves, support columns, female-receiving openings, etc., as previously described. From this view, some of the uppermost and unconnected male connectors 40 remain visible, but can be used if the evaporation panel assembly is laterally built out further. Without naming each evaporation panel specifically, suffice it to say that there are ten evaporation panels that are oriented parallel to one another, and there are ten evaporation panels that are connected therewith in an orthogonal orientation therefrom. In further detail regarding the pinwheel-like configuration, in reality, this configuration can be viewed as a collection of four identical pi-shaped sub-assemblies, similar to those shown in FIG. 12A. The exact pi-shaped structure in FIG. 12B is not specifically shown in FIG. 12A, but could be labeled similarly as "Pi-shaped (4 teeth)." This particular arrangement is symmetrical with only one vertically aligned female-receiving opening left open on each end of the spine thereof.

There are several advantages to using one or more pi-shaped sub-assemblies in forming an evaporation panel assembly. For example, as shown in FIG. 12B, in its current form, this particular evaporation panel assembly is shown with twenty evaporation panels, where five evaporation panels are used to assemble each pi-shaped sub-assembly. However, this same type of sub-assembly can be used to build the evaporation panel assembly out laterally (as shown by the solid line arrows). Furthermore, as with other evaporation panel assemblies, this assembly pattern can also be built up vertically. This particular assembly pattern, however, provides added strength and more resistance to the potentially crushing forces of gravity when the evaporation panel assembly (which can already be relatively heavy unloaded, particularly when stacked 16 feet, 24 feet, 36 feet, or more in height) is fully loaded with wastewater. Essentially, in this configuration, where four evaporation panels come together in a tight pattern, a structural post or vertical support beam assembly 68 can be formed, which can provide a higher resistance to significant weight loads on the evaporation panel assembly, as well as provide rotational shear resistance in at least four lateral directions (at 90 degree intervals). Thus, essentially at one concentrated location, four evaporation panels, each at an end thereof due to the pi-shaped sub-assembly configuration, come together and contribute to the formation of a hollow vertical beam that is integrated into the evaporation panel assembly, and further, this integration of the support beam assemblies occurs incrementally as the evaporation panel assembly is being constructed. This can provide added safety to an assembly technician as vertical support beam assemblies are incrementally formed during the build, providing essentially real-time formation of vertical support beam assemblies for added vertical strength with respect to holding weight as well as rotational shear resistance. In short, there is no separate beam structure included or added to provide this extra level of support vertical support and shear resistance in this example. Furthermore, by using a pi-shaped type of sub-assembly configuration, vertical support (and shear resistance) beam assemblies can be present at essentially every interval equal to about the length of an individual evaporation panel in a grid-like formation. Thus, if the evaporation panel is two (2) feet in length, about every two feet (e.g., just under two feet), there may be a vertical support beam assembly formed, which can be characterized in some examples as forming an array of structural beams positioned in a grid-like formation in the x-y axes (as viewed from above). An example of a grid-like array of structural beams can be seen in FIG. 36, wherein one vertical support beam is identified at 68. That particular example also includes large vertical airshafts 108 (about the size of a single sub-assembly). However, the grid-like array of vertical support beam assemblies may be formed as part of an evaporation panel assembly that does not include these vertical airshafts. Returning to FIG. 12B, also as shown around a periphery of the evaporation panel assembly, there may be partial vertical support beam assemblies 68A that can provide some additional vertical support, but can also be used to generate more vertical support beam assemblies as the evaporation panels or evaporation panel sub-assemblies are used to build the evaporation panel assembly further out laterally.

Figure 12C:
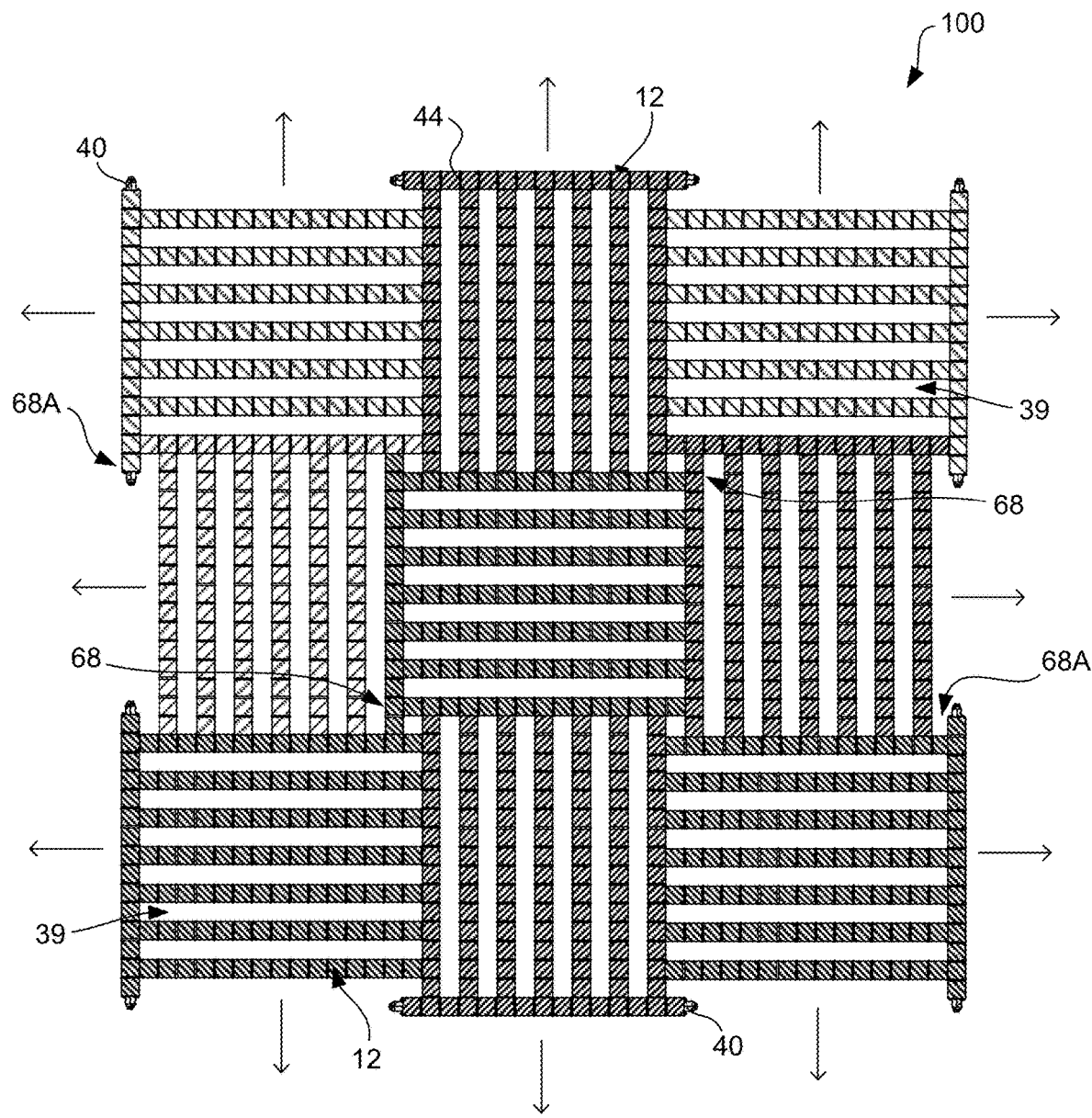
FIG. 12C is a top plan view of an arrangement of sixty-nine example evaporation panels of an evaporation panel system joined together to form nine pi-shaped sub-assemblies (some symmetrical and some asymmetrical), which are also further joined together to form an example evaporation panel assembly in accordance with the present disclosure.

As shown in FIG. 12B, inter-panel spaces 39 can be relatively wide, e.g., three vertically aligned female-receiving opening spaces between each panel, or the inter-panel spaces can be narrower, such as shown in FIG. 12C. For example, inter-panel spaces can be provided by omitting two panel spaces, three panel spaces, four panel spaces, etc., between parallel evaporation panel teeth. FIG. 12B in particular shows three panel spaces omitted between parallel oriented and adjacent evaporation panels, providing even more evaporation and/or airflow 38A, 38B and 38C compared to the cube-shaped configuration of FIG. 11 (which could also include more spacing in other examples) where there was only one inter-panel space. In areas where the ambient conditions are very dry and hot, less space may be present and used for an efficient and compact design. However, when the ambient conditions are not as hot and/or more humid generally, evaporation panel assembly designs that allow for more open evaporation space may be beneficial, e.g., such as that shown in FIG. 12B. The inter-panel spaces can, for example, provide for vertical airflow and/or water vapor clearing initiated by airflow patterns shown in this FIG., for example. On the other hand, in some instances, small spaces for directing airflow may provide improved evaporation results, as narrower openings can lead to higher airflow velocity. Thus, each evaporation panel assembly can be designed taking into account such considerations and conditions. Thus, the evaporation panels and systems of the present disclosure can be customized not only with design practicality in mind, but also with ambient conditions considered. In further detail, the density and spacing of the evaporations panels of evaporation panel systems can be assembled in a manner that varies greatly both laterally and in height. By varying the density of evaporation panels within an evaporation panel assembly, warm to cold air exchange within the evaporation panel assembly can be tuned to promote enhanced movement of air. Furthermore, in drier/less humid regions, one design may be effective, and in higher humidity regions, alternative designs and/or spacing profiles may be used for a more customized and efficient evaporation profile.

In further detail with respect to FIG. 12B, various possible airflow patterns are shown. Airflow pattern 38A shows airflow in the x axis direction (from a top view perspective) and airflow pattern 38B shows airflow in the y axis direction. However, due to the shape and configuration of the support columns (not shown in this FIG., but shown in greater detail by example in FIGS. 1-7, and 13-16), airflow can be directed into, through, and out of the evaporation panel assembly efficiently. In one example, airflow pattern 38C is shown where external airflow is provided from an oblique angle with respect to any of the evaporation panels, but can be efficiently brought into the evaporation panel assembly through open spaces or (unused) female-receiving openings to assist with evaporation.

FIG. 12C shows a top 12 plan view of sixty-nine (69) evaporation panels of an evaporation panel assembly 100, where the evaporation panels are joined laterally to one another to form an essentially cuboidal- or rectangular cube-like shape (with some recesses and protrusions around the periphery—not to be confused with the cube-shaped sub-assembly previously described). More specifically, this evaporation panel assembly can be viewed as multiple pi-shaped unit structures or sub-assemblies, each with one evaporation panel spine oriented orthogonally with respect to six (6) or seven (7) evenly spaced apart evaporation panels, e.g., teeth. Thus, this arrangement includes three asymmetrical pi-shaped sub-assemblies (shown for clarity using large cross-hatching) and six symmetrical pi-shaped sub-assemblies (shown for clarity using small cross-hatching). These sub-assemblies are thus identified in this FIG. by example only, as the same large assembly structure (including all 69 panels) can be formed using differently-defined sub-assemblies than those identified by the varied cross-hatching in this example. To illustrate, considering three of the nine sub-assemblies shown in FIG. 12C as an example, the upper right and upper left (as shown in this FIG., but again, as viewed from above) sub-assemblies could both be considered as seven (7) teeth, symmetrical, pi-shaped sub-assemblies, each with a secondary spine (see orthogonal, small cross-hatched evaporation panel at the end of the respective teeth of the upper right and upper left sub-assemblies, respectively). Under this alternative definition, the central sub-assembly at the top of the drawing sheet could then be considered a five (5) teeth, symmetrical, pi-shaped sub-assembly with three outermost female-receiving openings remaining open at each end of the spine. Regardless, by defining the various pi-shaped sub-assemblies in this way, the resulting large assembly (of 69 evaporation panels) would still be the same. However, in both examples, the respective sub-assemblies can each still be considered generally "pi-shaped." The pi-shaped sub-assembly configuration of really any type (e.g., symmetrical, asymmetrical, 2 to 7 or more teeth, with or without a secondary spine, with or without central inter-panel space, with or without a vertical airshaft, etc.) can thus provide the ability to generate large evaporation panel assemblies or towers with enhanced vertical compression strength, rotational shear resistance, and highly stable orthogonal joints junctions. It is worth noting that some of these ranges, such as "2 to 7" teeth, etc., in this and other examples are provided by example only, as these ranges may be more aptly based on the number of total vertically aligned open space positions that may be present on the evaporation panels of the evaporation panel system or assembly.

With respect to enhanced vertical compression strength (e.g., the ability to build the structure higher without crushing the bottom or lower levels) and enhanced rotational shear strength (e.g., the ability to resist shear forces strength) mentioned in FIG. 12B, in this particular example as well, the pi-shaped sub-assemblies can be likewise joined to form vertical support beam assemblies 68 positioned in a grid-like formation. In this example, the grid-like formation includes four vertical support beam assemblies and eight partial vertical support beam assemblies 68A. The vertical support beam assemblies, in particular, can structurally provide a similar type of support that a vertical post or beam would provide to support an upper floors or a multi-level building in engineered construction, with the added benefit of providing rotational shear resistance because of the assembly construction. Furthermore, as with design shown in FIG. 12B, the evaporation panel assembly configuration shown in FIG. 12C can be further built out laterally (as indicated by the solid arrows pointing outward or laterally from the basic sub-assembly shapes shown) in a repetitive or semi-repetitive manner.

Though not labeled or shown in close detail, the individual evaporation panels can include a plurality of stacked shelves, support columns, female-receiving openings, etc., as previously described. From this view, some of the uppermost and unused male connectors 40 are visible. Without naming each evaporation panel specifically, suffice it to say that there are thirty-two (32) evaporation panels that are oriented parallel to one another, and there are thirty-seven (37) evaporation panels that are connected therewith in an orthogonal orientation therefrom. In this configuration, similar to the example cube configuration shown in FIG. 11, there is one panel space, or inter-panel space 39, left between parallel and adjacent evaporation panels. This configuration allows for a more densely packed arrangement of panels (compared to FIG. 12B) while still allowing for often adequate evaporation space to exist between evaporation panels, particularly in drier conditions or when the evaporation panel assembly is not laterally built out with a large footprint. With larger footprint assemblies where inner areas of the evaporation panel assembly are a further distance from an outer surface of the assembly, extra vertical or horizontal airshafts can be assembled therein to compensate (not shown, but shown in FIGS. 12E and 36 by way of example), based in part on the ambient conditions. For example, this arrangement may be more useful when the conditions might be drier than other arrangements where more space remains between the panels, for example. As mentioned, other panel spacing can also be designed, e.g., 2 spaces, 3 spaces, 4 spaces, etc. Also, though airflow patterns are not shown in this example, they can be similar to that shown in FIG. 12B.

Figure 12D:
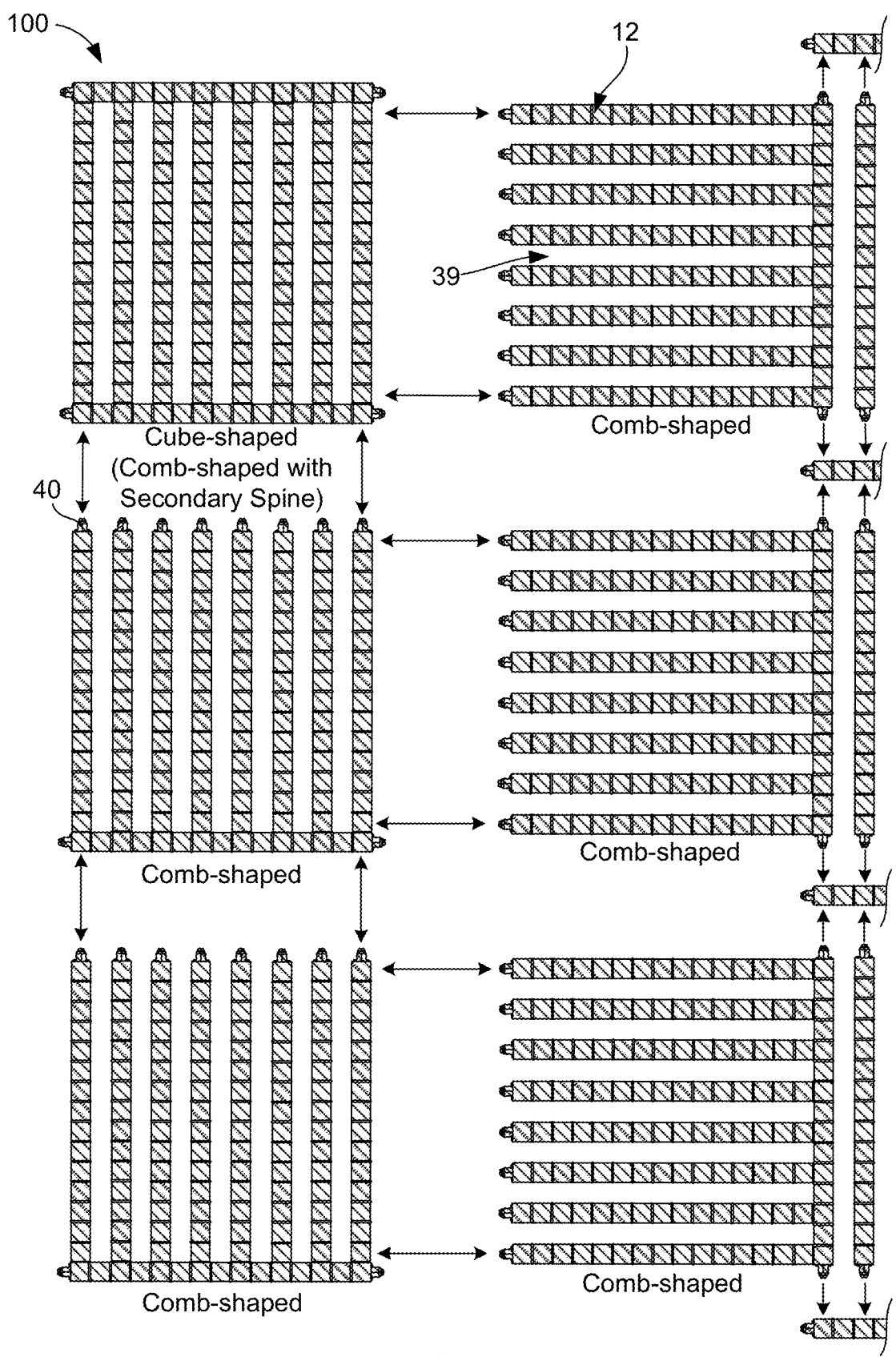
FIG. 12D is a top plan view depicting various types of comb-shaped sub-assemblies (comb-shaped and cube-shaped), which can be joined together to form a more complex evaporation panel assembly in accordance with the present disclosure.

FIG. 12D, on the other hand, shows a top 12 plan view of sixty (60) evaporation panels of an evaporation panel system 100 for assembly, where the evaporation panels are shown as various types of comb-shaped sub-assemblies, namely a cube-shaped sub-assembly and five comb-shaped sub-assemblies. A pi-shaped sub-assembly or another type of sub-assembly can be integrated therewith in some examples, depending on the desired evaporation panel assembly design. These various sub-assemblies can be joined laterally to one another to form a more complex and large cuboidal- or rectangular cube-like evaporation panel assembly shape (or even a cube-shaped assembly—not to be confused with the cube-shaped sub-assembly shown assembled in FIG. 12D). This general shape or pattern can be continued out laterally in repetitive or a semi-repetitive manner. Furthermore, this structure can be built up vertically as well.

Again, though not specifically labeled or shown in close detail, the individual evaporation panels can include a plurality of stacked shelves, support columns, female-receiving openings, etc., as previously described. From this view, some of the uppermost male connectors 40 are visible. In this configuration, similar to the cube configuration shown in FIG. 11, there is generally one panel space, or inter-panel space 39, left between parallel and adjacent evaporation panels or teeth. This configuration provides a more densely packed arrangement of panels (compared to FIG. 12B) while still often allowing adequate evaporation space to exist between evaporation panels, depending on evaporation panel assembly size (lateral footprint and height) and the ambient conditions. This arrangement may be more useful when the conditions might be drier than other arrangements where more space remains between the panels, for example. As mentioned, other panel spacing can also be designed, e.g., 2 spaces, 3 spaces, 4 spaces, etc. Though airflow patterns are not shown in this example, they can be similar to that shown in FIG. 12B.

Figure 12E:
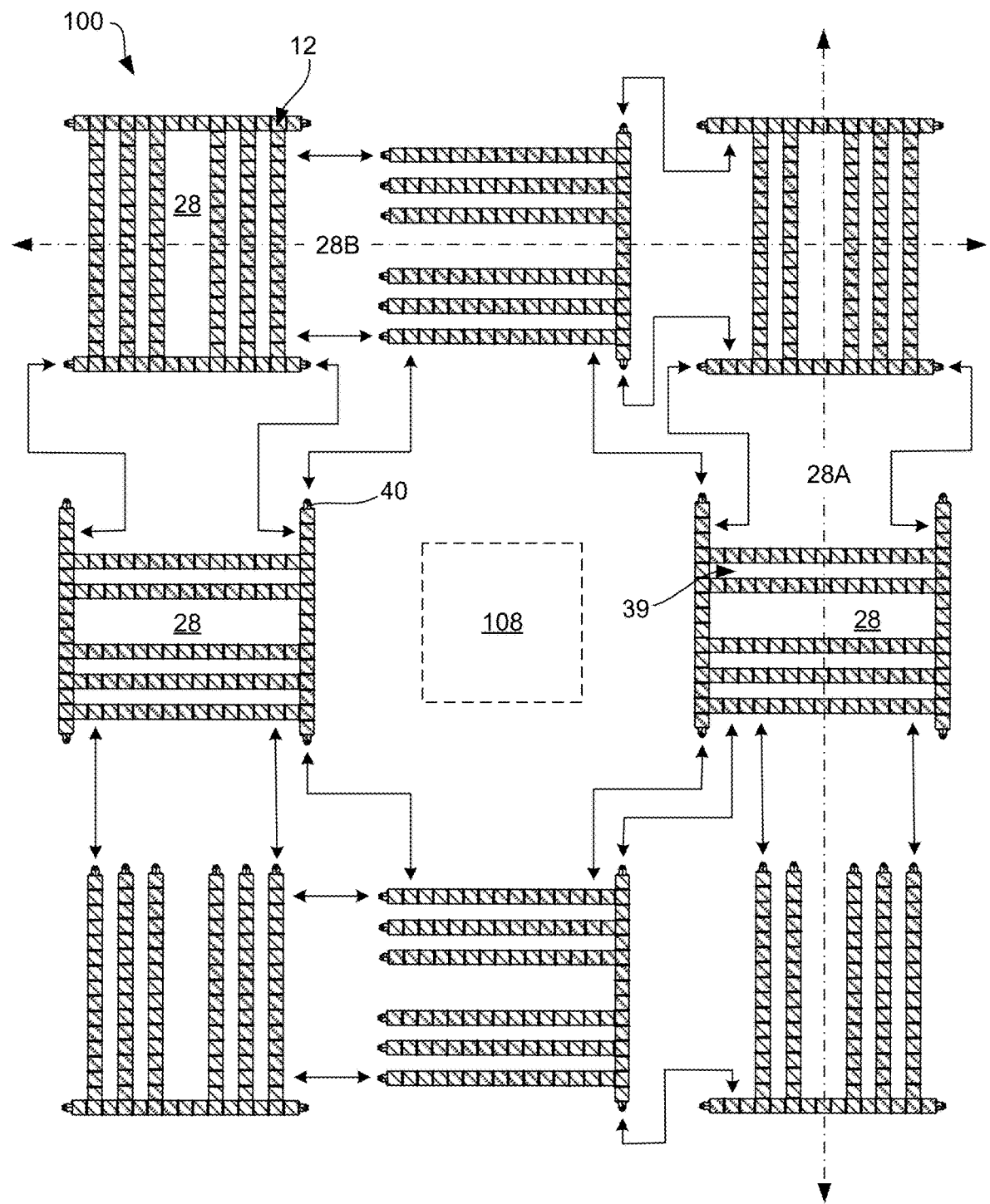
FIG. 12E is a top plan view depicting various pi-shaped sub-assemblies (some symmetrical and some asymmetrical), which can be joined together to form a more complex evaporation panel assembly including a vertical airshaft in accordance with the present disclosure.

FIG. 12E provides an evaporation panel system 100 for preparing an evaporation panel assembly which leaves a large vertical airshaft 108 for allowing additional airflow and/or water vapor clearing. As can be seen from this top 12 plan view, there are male connectors 40 which can be inserted into female-receiving openings (not shown in this FIG., but shown in detail at least in FIGS. 1-3, 7, 9, 13, 18, and 20-24) as indicated by a few exemplary bidirectional arrows. In addition to the vertical airshaft that is formed and defined by the sub-assemblies, within each sub-assembly, there are also inter-panel spaces 39, including a centrally located enlarged inter-panel space 29, both of which can provide an airflow and water vapor clearing function.

In more specific detail, this embodiment provides another unique example which utilizes multiple versions of the pi-shaped sub-assembly, including a sub-assembly with six (6) evaporation panels (one pi-shaped asymmetrical), sub-assemblies with seven (7) evaporation panels (three pi-shaped asymmetrical with secondary spine; and three pi-shaped symmetrical), and a sub-assembly with eight (8) evaporation panels (one pi-shaped symmetrical with secondary spine). Some of the pi-shaped sub-assemblies include five (5) teeth, and others include six (6) teeth. Some sub-assemblies include a single spine, others include two (2) spines, e.g., a spine and secondary spine. Furthermore, some sub-assemblies are symmetrical and others are asymmetrical. Once joined together, however, each sub-assembly can share an evaporation panel(s) with adjacent sub-assemblies, thus providing a more uniform evaporation panel assembly structure that can form a repeatable pattern. Furthermore, in this particular configuration, though evaporation panels including those shown in FIGS. 1-6C or others can be used, in one specific example, evaporation panels shown in FIGS. 21A to 24D can alternatively or additionally be used because of enlarged inter-panel space 28 (which is centrally located in this example) of each sub-assembly is wide enough to accommodate the size (horizontal) of an enlarged evaporative airflow channel(s) present in those particular evaporation panels (see 58A and 58B of FIGS. 21A-24D, for example). Thus, example airflow patterns 38A and 38B are shown as they may pass through the enlarged evaporative airflow channels (not shown in this FIG.) and further between the enlarged inter-panel spaces 28 that can correspond in width to the enlarged evaporative airflow channels. In further detail, it is noted that this particular evaporation panel assembly build is shown fully assembled on a larger scale in FIG. 36 as a top plan view, for example.

Turning now to some of the functional features of the evaporation panels described herein, for purposes of further showing and describing both the shape and configuration of a water column that can be formed, as well as airflow patterns that the water columns can influence, FIGS. 13-16 provide some detail of a portion of an evaporation panel 10 shaped and configured in accordance with examples of the present disclosure. FIG. 13 shows a similar structure to that shown as evaporation panel 10B in FIG. 7. For example, the evaporation panel can include a top 12 and bottom 14 (not shown), evaporation shelves 16, each with an upper surface 18 and a lower surface 20 in this example. The evaporation panels can also include upwardly extending ridges 24 and downwardly extending ridges 26, as well as male connectors 40 and female-receiving openings 42 (and open spaces that may not be used for joining, but which can provide airflow therethrough). The panels can also include support columns 30 including support beams 32 and evaporation fins 34, as previously described. These support columns and evaporation shelves are arranged as a grid-structure, but could be any other grid-like structure described herein.

In further detail, FIG. 14 depicts a top cross-sectional and partial plan view of section A-A of FIG. 13. Thus, FIG. 14 shows a cross-sectional view of the support beam 32, as well as an overhead top plan view of the evaporation fin 34, an upper surface 18 of an evaporation shelf, and upwardly extending ridge 24 of the evaporation shelf. In this example, the general lateral shape (when viewed from above) of a periphery of the evaporation fin can be similar to that of a perpendicular cross-sectional shape of an airfoil, which in this example, may be symmetrical laminar airfoil. By way of definitions, the "perpendicular cross-sectional" shape of an airfoil is generally taken vertically from front to back with respect to a horizontally positioned airfoil, e.g., a horizontal wing orientation. In other words, the perpendicular cross-sectional view refers to the general front to back (such as on an airplane) vertical cross-sectional shape of the airfoil, which would include the leading edge and the trailing edge taken perpendicularly with respect to the orientation of the horizontal airfoil wing. In further detail, this particular shape can provide certain advantages with respect to water evaporation and airflow in accordance with examples of the present disclosure. For example, this airfoil shape can enhance water retention, and can allow air to pass through the openings (past the evaporation fins and water retained thereon) like a vertically oriented wing, thereby improving evaporation because of enhanced airflow dynamics, as will be discussed in further detail hereinafter. There are various dimensions that can be used to form the airfoil shape (or any other generally elongated shape). For example, the depth of the evaporation fin can be approximately the same or the same as a depth of the evaporation shelf, e.g., 1.5 inch, 2 inches, 3 inches, etc. The width can be less than a length of the depth, thus providing an elongated shaped in the direction of its depth (front-to-back; or elongated in an orthogonal direction relative to the laterally elongated orientation of the evaporation shelves). Example ratios of depth (front-to-back dimension) to width (side-to-side dimension) can be, for example 6:1 to 8:5 or from 4:1 to 2:1.

Turning now to FIG. 15, a close-up view of a still smaller portion of an evaporation panel 10 is shown, and approximates the small section encompassed by dashed lines in FIG. 13. This view includes and shows wastewater 50 loaded on the evaporation panel. Also shown is an air/liquid interface 52, which in this instance is an interface where the air interfaces with wastewater, e.g., wastewater which includes water and secondary material to be separated from the water. Even though there is a great deal of wastewater surface area generated by the multiple evaporation shelves 16, still more wastewater surface area (at the air/liquid interface) can also be provided by the support columns 30 that are used to support and provide separation to the evaporation shelves. As previously mentioned, the support columns can include a support beam 32 and evaporation fins 34. Thus, for example, when the evaporation panel, including the evaporation shelves, are filled with wastewater, the support columns can also be loaded with wastewater, providing still more wastewater surface area suitable for evaporation. In one example, due to the spacing between the evaporation shelves and the evaporation fins, and/or due to the spacing between the evaporation fins to one another, the surface tension of the water can be used to form a vertical water column 54 along a length of various support column sections found between pairs of evaporation shelves. Example spacing can be from 0.3 cm to 0.7 cm, but this range is not intended to be limiting. The nature of the wastewater and the material (and surface treatment) used to form the evaporation fins can lead to modifying this range, such as to from 0.2 cm to 0.6 cm, or from 0.4 cm to 0.8 cm. More generally, from 0.2 cm to 1 cm provides a reasonable working range for evaporation fin spacing in some examples. Furthermore, the water column is shown generally in this FIG. as providing a straight columnar air/liquid interface. However, this is shown in this way for convenience and to clearly show how a water column is formed. Depending on the water content loaded thereon, as well as the respective surface tension and surface energy properties of the wastewater and panel surface, there may be more (bulging) or less (recessing) water relative to the evaporation fins at the air/liquid interface compared to that shown in FIG. 15. Additionally, at locations where the water column interfaces with the evaporation shelves (particularly the bottom), there may be some vertical to horizontal curving along the air/liquid interface that can occur that is not shown in a pronounced manner in this FIG. Suffice it to say, the water column shown herein provides an example of wastewater loaded on or at evaporation fins of a support column.

In one example, as the wastewater cascades from an evaporation shelf upper surface 18, around an edge 22 (such as a beveled edge) and onto a lower (downward facing) surface 20 thereof, a portion of the wastewater can be passed directly from the lower surface to the next evaporation shelf (therebeneath), and another portion can be passed to the vertical water column supported by the presence and configuration of the evaporation fins of the support column, and so forth. An upwardly extending ridge 24 can be present on the upper surface to prevent pooling at a center of the evaporation shelf and to guide the wastewater toward the edge rather than toward the end. This ridge can also provide wind resistance, preventing wastewater from being blown from the upper surface as well as holding wastewater in place in situations where the panel may be slightly tilted due to wind, for example. The downwardly extending ridge 26 can be present to facilitate downwardly cascading wastewater from one evaporation shelf to the next, either directly or as a guide toward the support column.

In further detail, to form the vertical water column 54, spacing between the evaporation fins 34 as well as material choice can be considered in order to take advantage of the surface tension of wastewater. For example, the evaporation fins can be spaced apart at from 0.2 cm to 1 cm, but more typically from 0.3 cm to 0.7 cm, or from 0.4 cm to 0.6 cm. Likewise, the uppermost evaporation fin can be similarly spaced from a lower surface 20 of the evaporation shelf that is positioned thereabove. The lowermost evaporation fin can be likewise similarly spaced from an upper surface 18 of the evaporation shelf that is positioned therebeneath. In further detail, the support column 30 can include a support beam 32, such as a centrally positioned support beam, and the evaporation fins can extend outward from the support beam (on average) at from 0.2 cm to 1 cm, but more typically from 0.3 cm to 0.7 cm, or from 0.4 cm to 0.8 cm. These dimensions are provided by way of example only, and other dimensions can be selected based on the material choice, the type of wastewater, the desired flow rate of the wastewater, etc.

As shown in FIG. 16, a top cross-sectional and plan view taken along section B-B of FIG. 15 is shown. The structures shown in this FIG. are similar to that show in FIG. 14, but in addition, details are provided related to the retention of wastewater 50 at the various surfaces, including along a vertical water column 54. Additional details regarding possible airflow 38 around the airfoil-shaped vertical water column that can be formed is also shown. Thus, FIG. 16 again includes a cross-sectional view of the support beam 32, and an overhead top plan view of the evaporation fin 34 as well as an upper surface 18 and upwardly extending ridge 24 of an evaporation shelf. As can be seen from this view, the wastewater is loaded on both the evaporation fin and the upper surface of an evaporation shelf. The upwardly extending ridge 24 is not loaded with wastewater in this example, and can act to guide the water away from the center of the evaporation shelf, prevent pooling, provide wastewater wind resistance, etc. Again, along an edge of the evaporation fin, a vertical water column (in cross-section) is shown which comprises a portion of the wastewater.

In further detail, FIG. 16 also shows the general shape of an evaporation fin 34, which in this example, has the cross-sectional shape of a symmetrical laminar flow airfoil taken vertically from leading edge to trailing edge based on a horizontally oriented airfoil. Thus, the evaporation fins are shaped and spaced apart as a guide so that when wastewater is loaded thereon, the evaporation fins provide a framework to form the vertical water column 54 having the shape of an airfoil, and in this particular instance, a symmetrical laminar flow airfoil. Other shapes can be used, and in some examples, other airfoil shapes can be used, but the symmetrical laminar flow air foil shape provides acceptable bi-directional airflow properties. The airfoil shape in this example includes a leading edge 36 that directs airflow 38 around the vertical water column, once formed. Furthermore, because the vertical water column is shaped like a symmetrical laminar flow airfoil, if the airflow were to be in the opposite direction, then the leading edge would be found on the opposite side of the vertical water column. This allows for efficient airflow across the vertical water column in multiple directions, depending on the orientation of the evaporation panel and air currents that may be present. Stated another way, appropriately spaced and stacked evaporation fins can hold water vertically, and the vertical water column can act as an airfoil because of the guiding shape and spacing of the evaporation fins. For clarity, the evaporation fin is not the airfoil per se, but rather the evaporation fins are stacked and shaped to form a vertical water column that, when loaded with wastewater, becomes shaped like a symmetrical laminar flow airfoil that is vertically oriented in this particular example. In further detail, the airfoil shape can also assist in facilitating evaporation of the water by efficiently promoting airflow, like a wing, around the vertical water column during evaporation.

In further detail, during evaporation (particularly when a more complex evaporation panel assembly is formed such as that shown FIG. 11 or 12, or when the structure is much more complex), evaporation within the structure can promote cooling compared to higher temperatures that may be present outside of the structure. The differential in these temperatures (cooling during evaporation vs. hot and/or dry conditions outside of the evaporation panel assembly) can promote the generation of natural airflow patterns within the evaporation panel assembly. Thus, as shown in FIG. 13, female-receiving openings 42 (some of which can be used to connect with a male connector 40 as previously described in FIGS. 1-12 and some of which remain open spaces for facilitating airflow) can be defined laterally between adjacent support columns sections and vertically between adjacent evaporation shelves to provide openings for airflow and water vapor venting to occur around the airfoil shaped vertical water column. This configuration, along with the cooling associated with evaporation, can generate natural airflow across any of the respective water surfaces using natural drafts induced by temperature differential for enhanced evaporation speeds. In other words, the open spaces through each of the panels, the inter-panel spaces between parallel evaporation panels, and/or the vertical water columns (shaped like an airfoil in this example), along with the natural drafts induced by evaporation and temperature differentials, can generate enhanced evaporation speeds, even without an external forced airflow source, e.g., fans, natural wind, etc. The use of fans, heat, or other man-made evaporative conditions can be used, but in many instances, they are not needed because of the design features described herein. Thus, the evaporation panel systems and assemblies of the present disclosure can be used with or without external forced airflow sources, and/or with or without artificially elevated temperatures. Natural airflow currents induced by the temperature differentials and/or natural wind, for example, can be used to provide the airflow for the evaporative process to efficiently occur. Thus, the shape of the shelves and/or evaporation fins can be aerodynamically designed, including as designed in embodiments described herein, to allow enhanced airflow across the shelf. Thus, in some instances, the shape of these structures can cause the airflow to speed up as it moves through one evaporation panel to the next evaporation panel, rather than getting bogged down and becoming stagnant as a result of the effects of wall interference (wall effect). In other words, the aerodynamic shape of the evaporation fins as well as the evaporation shelves (when loaded with the wastewater) provides the benefit of moving air through the evaporation panel assembly more rapidly, and/or moving air generally from top to bottom in some instances.

Figure 17:
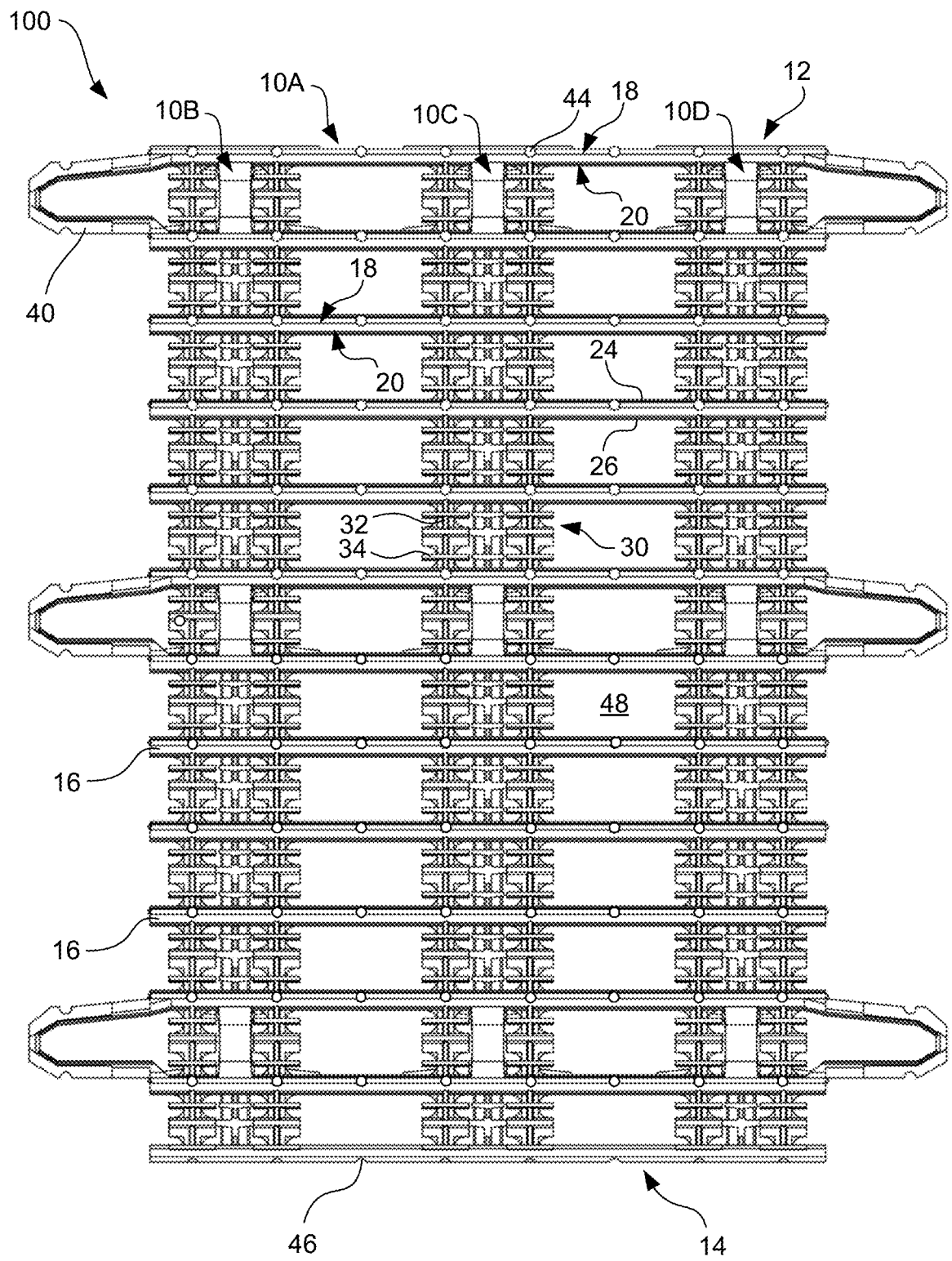
FIG. 17 depicts an alternative example evaporation panel system, including a front plan view of an evaporation panel joined orthogonally with three additional evaporation panels (shown in side plan view), which together form an example evaporator panel sub-assembly (comb-shaped; E-shaped) in accordance with the present disclosure.

Turning now to an alternative embodiment, FIG. 17 is a front plan view of an evaporation panel system 100 (more specifically an evaporation panel sub-assembly) where individual evaporation panels 10A-10D have a different general configuration compared to that described in FIGS. 1-16. In this example, a front plan view of a first evaporation panel 10A is shown, which is orthogonally connected to a second evaporation panel 10B, a third evaporation panel 100, and a fourth evaporation panel 10D in comb-shaped, or more specifically, an E-shaped sub-assembly configuration. The respective evaporation panels include a top 12 and a bottom 14, as well as evaporation shelves 16 with upper surfaces 18 and lower surfaces 20. Again, support columns 30 are there to support and provide separation to the evaporation shelves, and can include support beams 32 and evaporation fins 34. Furthermore, the evaporation panels also include male connectors 40 which can be adapted to attach an adjacently positioned and orthogonally oriented evaporation panel using its female-receiving openings 42, which in this example are between two closely spaced columns. Thus, there are areas of larger open spaces 48 which are different than the female-receiving openings, whereas with the prior example (FIGS. 1-16), the open spaces were provided by unused female-receiving openings relative to male connectors joined therein. Furthermore, vertical stacking can also occur with this example. In one embodiment, the top can include coupling ridges 44 and the bottom can include corresponding coupling grooves 46 for more secure stacking, as previously described. The female-receiving openings and the larger open spaces in this example are still generally rectangular in shape, and thus, this design can also be said to have a grid-like structure, and more specifically, a non-periodic horizontally varied grid-like structure.

In further detail, the evaporation fins 34 can extend horizontally from the support beam 32, as mentioned. These evaporation fins provide additional support surfaces for retaining or supporting the wastewater. Additionally, the evaporation fins in this example can act to slow the flow of the wastewater as it flows from the top 12 of the evaporation panels (10A-10D) downward. These evaporation fins have different sizes, and thus, may not form a completely vertical water column, but they may still retain wastewater as it cascades generally downward along the evaporation panel. In further detail, though multiple configurations of the evaporation fins have been described in the various examples, it is understood that in addition to the shapes shown and described, e.g., airfoil, square, rectangular, etc., other shapes could also be used, e.g., ridges, lobes, circles, triangles, pentagons, hexagons, shapes with parabolic curves, etc., or other similar features used to at least slow, and in some cases form a vertical wastewater column of the wastewater.

Figure 18:
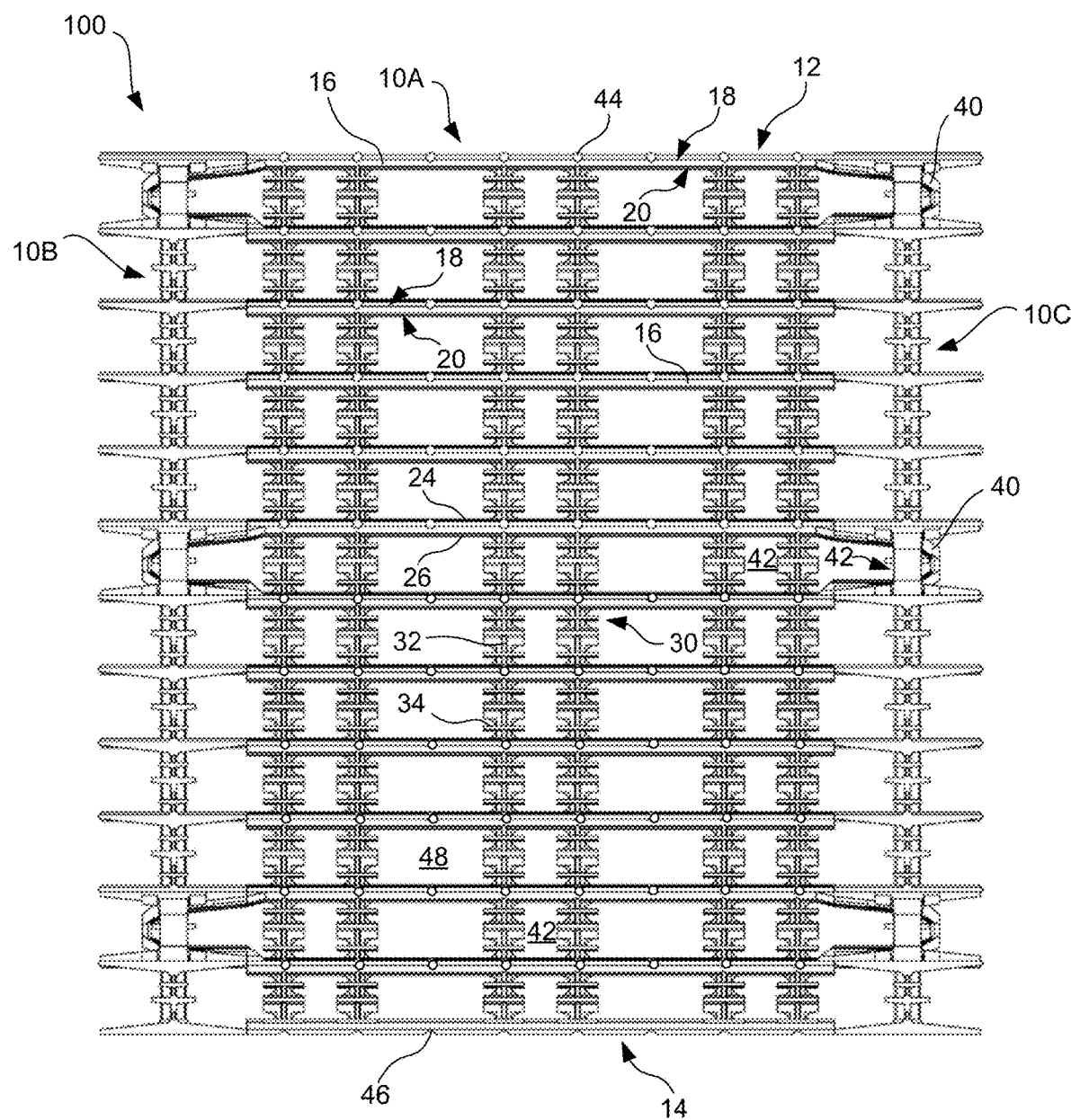
FIG. 18 depicts another alternative example evaporation panel system, including a front plan view of an evaporation panel joined orthogonally with two additional evaporation panels (shown in side plan view), which together form an example evaporator panel sub-assembly (L-shaped with secondary spine) in accordance with the present disclosure.

FIG. 18 is a front plan view of an alternative evaporation panel system 100 (more specifically an evaporation panel assembly once assembled) where the evaporation panels 10A-10C also have a different general configuration compared to that described in FIGS. 1-16. In this example, a front plan view of a first evaporation panel 10A is shown, which is orthogonally connected to a second evaporation panel 10B (to form an L-shaped sub-assembly) and a third evaporation panel 100 (as a secondary spine for the L-shaped sub-assembly). Each of these three evaporation panels includes a top 12 and a bottom 14, as well as evaporation shelves 16 with upper surfaces 18 and lower surfaces 20. Again, support column 30 is included which includes support beams 32 and evaporation fins 34. Furthermore, the evaporation panels also include male connectors 40 which are adapted to attach the panel to which it is integrated into an adjacently positioned and orthogonally oriented female-receiving opening 42. Thus, again, there are areas of larger open spaces 48 which are different than the female-receiving opening, whereas with the prior example (FIGS. 1-16), the open spaces can also be used as female-receiving openings for the male connectors. Furthermore, vertical stacking can also occur with this example as well. In one embodiment, the top can include coupling ridges 44 and the bottom can include corresponding coupling grooves 46 for more secure stacking, as previously described.

Figure 19:
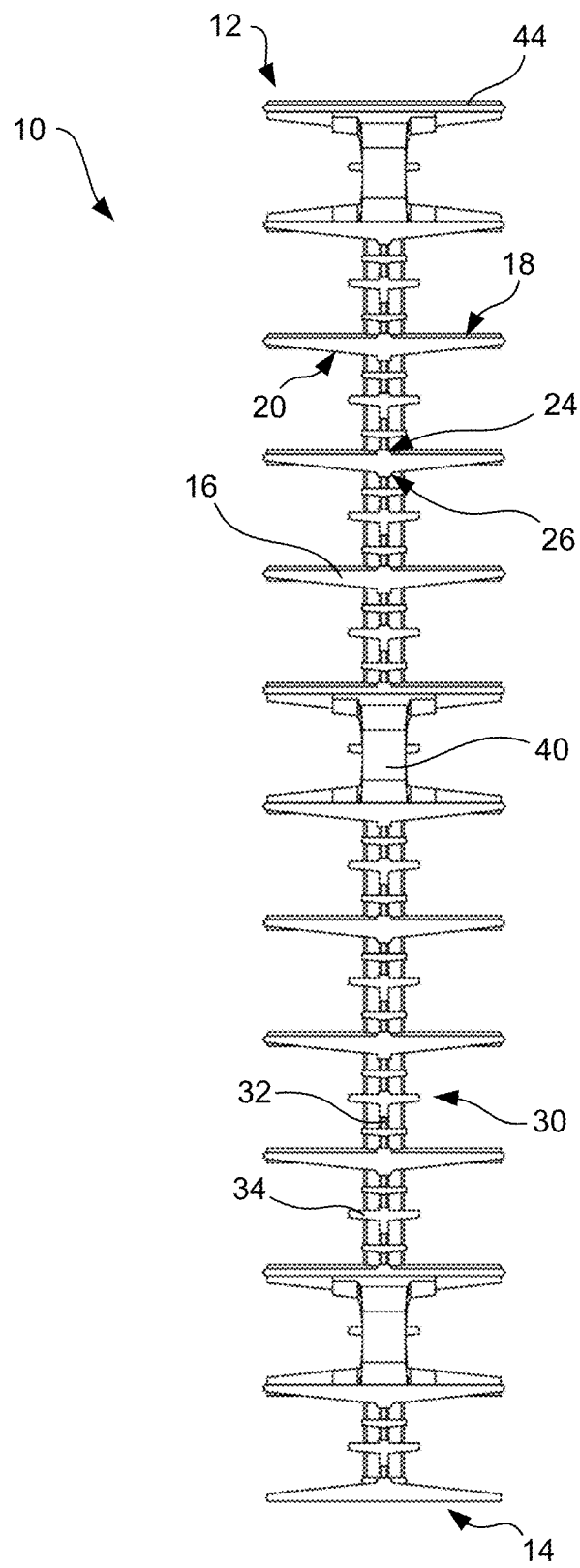
FIG. 19 is a side plan view further illustrating a single example evaporation panel, similar to that shown in FIGS. 17 and 18, in accordance with the present disclosure.

In further detail, FIG. 19 is a side plan view of a single evaporation panel 10 similar to that shown as one of the evaporation panels 10A-10D of FIG. 17, or as one of the evaporation panels 10A-10C of FIG. 18. The evaporation panel can include, as before, a top 12 and a bottom 14, male connectors 40, female-receiving openings (not shown in this FIG., but shown in more detail hereinafter in FIG. 20), a support column 30 with a support beam 32 and evaporation fins 34, and evaporation shelves 16 (flat or essentially flat horizontal upper surface 18 and a sloped lower surface 20 ranging from greater than 0° to 5°, from 1° to 5°, from 2° to 4°, or about 3° from horizontal). As with the other examples herein, the upper and/or lower surfaces of the evaporation shelves can be slightly sloped within these ranges or can be essentially horizontal. Typically, both surfaces can be generally flat, but a small curvature can also be used (convex or concave), provided the surface allows for both holding and releasing wastewater while allowing enough time for efficient surface evaporation and also allow for cascading the wastewater in a general downward direction, for example.

Figure 20:
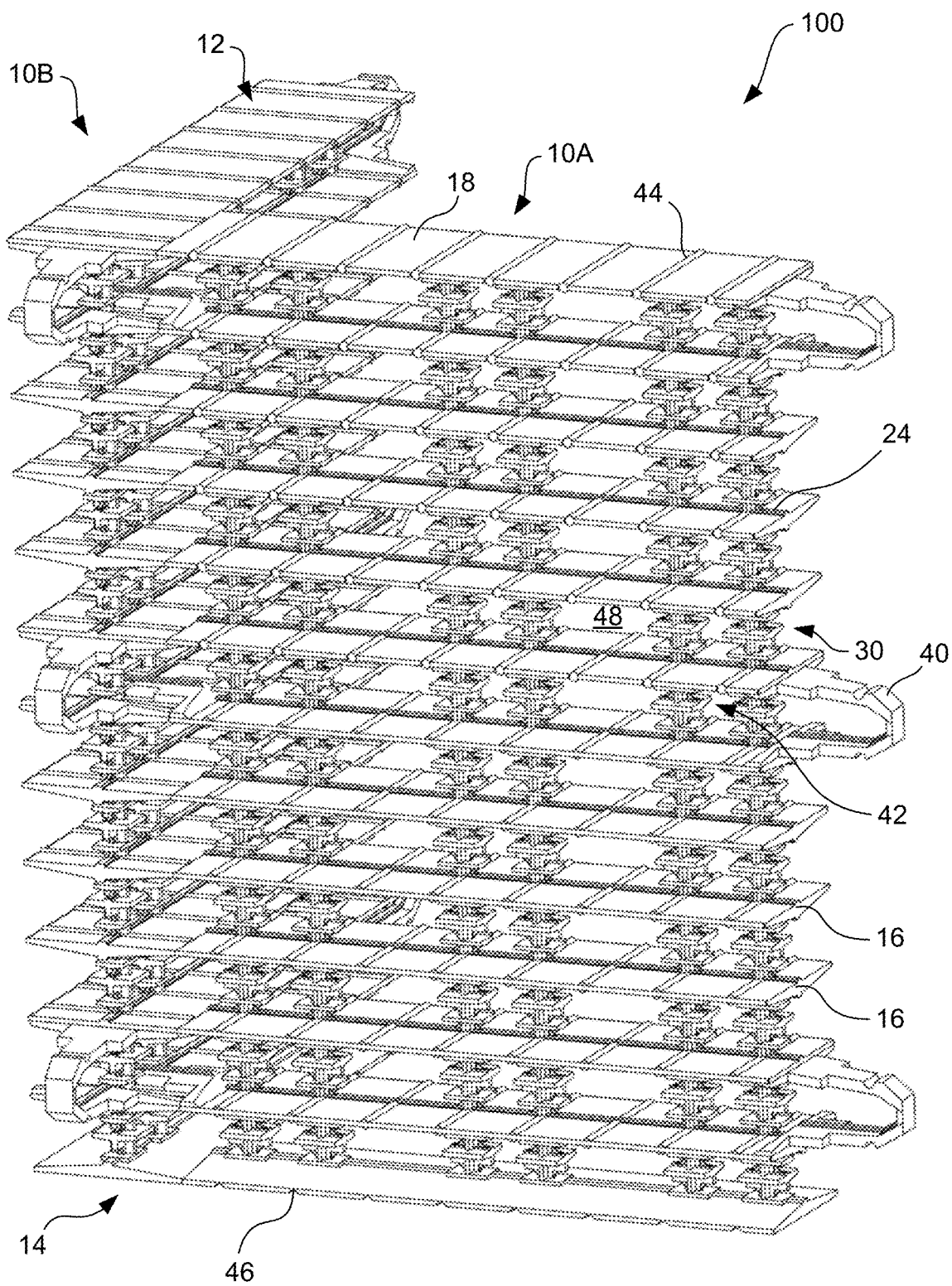
FIG. 20 is a perspective view illustrating another alternative example evaporation panel system where two evaporation panels are joined orthogonally together to form an evaporation panel sub-assembly (L-shaped) in accordance with the present disclosure.

FIG. 20 depicts yet another alternative evaporation panel system 100 (more specifically an evaporation panel assembly once assembled), but in this case, is shown in perspective with two evaporation panels 10A, 10B joined orthogonally in an L-shaped sub-assembly configuration. Notably, the L-shaped sub-assembly can be the start of a comb-shaped sub-assembly, a cube-shaped sub assembly, or any other sub-assembly described herein which uses an outermost female-receiving opening (along a vertical aligned column) to join with the respective male connectors of the other evaporation panel, e.g., shapes other than pi-shaped and T-shaped sub-assemblies. Again, the evaporation panels per se in this example have a slightly different configuration than the general configuration of FIGS. 1-16. Each of these two evaporation panels includes a top 12 and a bottom 14, as well as evaporation shelves 16 with upper surfaces 18 and lower surfaces (not shown). Again, support column 30 is included with similar features previously described. Furthermore, the evaporation panels also include male connectors 40 which are adapted to attach the panel to which it is integrated into an adjacently positioned and orthogonally oriented female-receiving opening 42. Thus, again, there are areas of larger open spaces 48 which are different than the female-receiving opening, whereas with the prior example (FIGS. 1-16), the open spaces were also used as female-receiving openings for the male connectors. Vertical stacking can also occur with this example. In one embodiment, the top can include coupling ridges 44 and the bottom can include corresponding coupling grooves 46 for more secure stacking, as previously described.

Figure 21A:
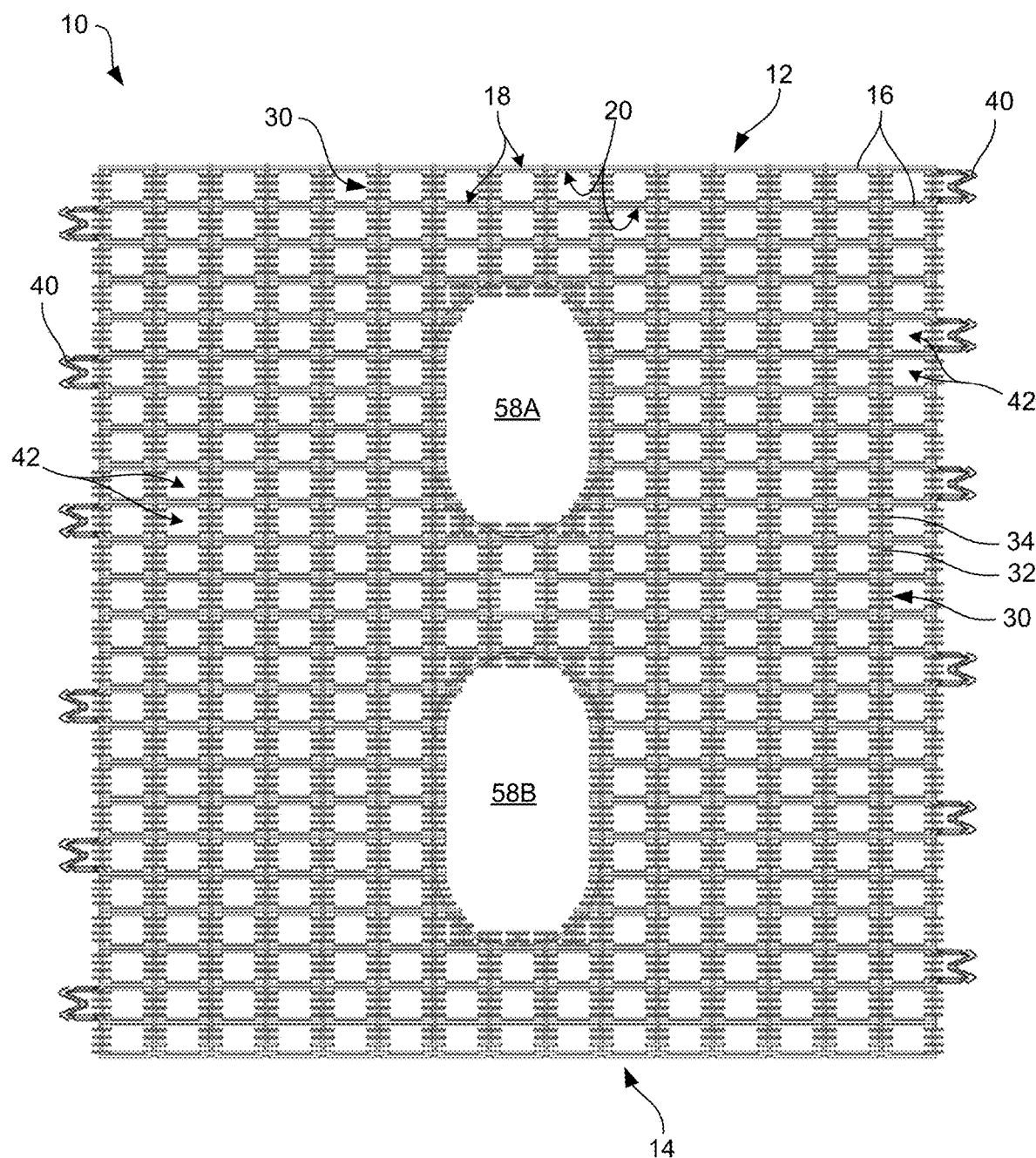
FIG. 21A is a front plan view of an example evaporation panel including enlarged evaporative airflow channels in accordance with the present disclosure.
Figure 21B:
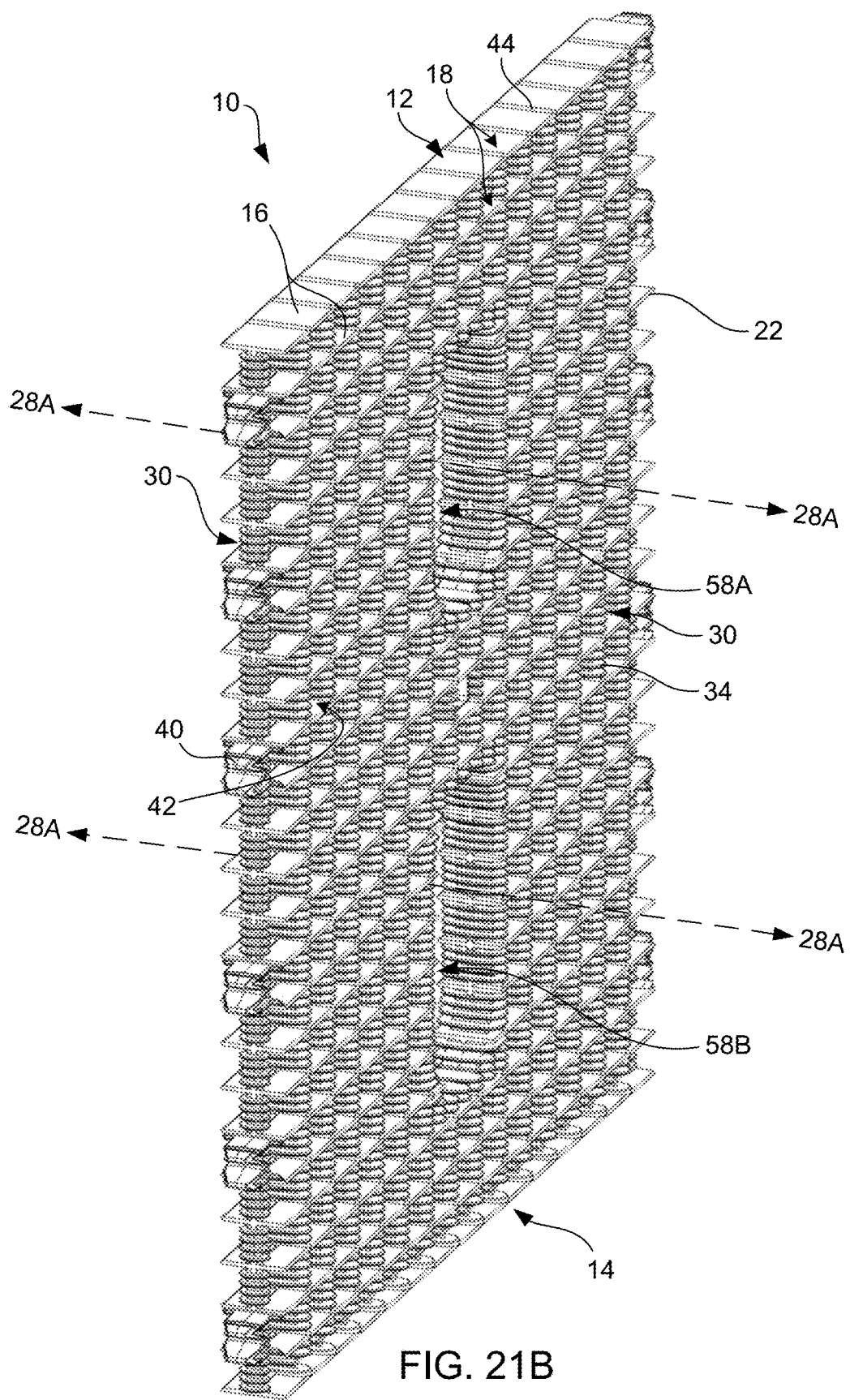
FIG. 21B is an upper left perspective view of the example evaporation panel of FIG. 21A.

Turning now to FIGS. 21A and 21B, a front plan view and an upper left perspective view, respectively, of an alternative example evaporation panel 10 is shown. The evaporation panel (or others) can include an enlarged evaporative airflow channel, and more specifically, this specific evaporation panel includes a first enlarged evaporative airflow channel 58A and a second enlarged evaporative airflow channel 58B. An example airflow pattern 28A is shown, which refers back to the airflow pattern shown by way of example in FIG. 12E, where an enlarged inter-panel space is left to accommodate the width of the enlarged evaporative airflow channels of this and other similar example evaporation panels. By using two enlarged evaporative airflow channels rather than one (even larger) evaporative airflow channel, a large volume of airflow and/or water vapor clearing from the assembly can occur without sacrificing significant weight bearing properties or weight compression resistance, e.g., strength of the evaporation panel assembly that prevents a wastewater-loaded evaporation panel assembly (or tower) from crushing lower levels due to the weight applied thereon. The enlarged evaporative airflow channels provide enlarged large horizontal flow paths that can assist in moving air in and out, and water vapor out of the evaporation panel assemblies, particularly when the evaporation panel assembly is large (e.g., in both footprint and height), and the center of the evaporation panel assembly has difficulty clearing moisture therefrom.

Figure 36:
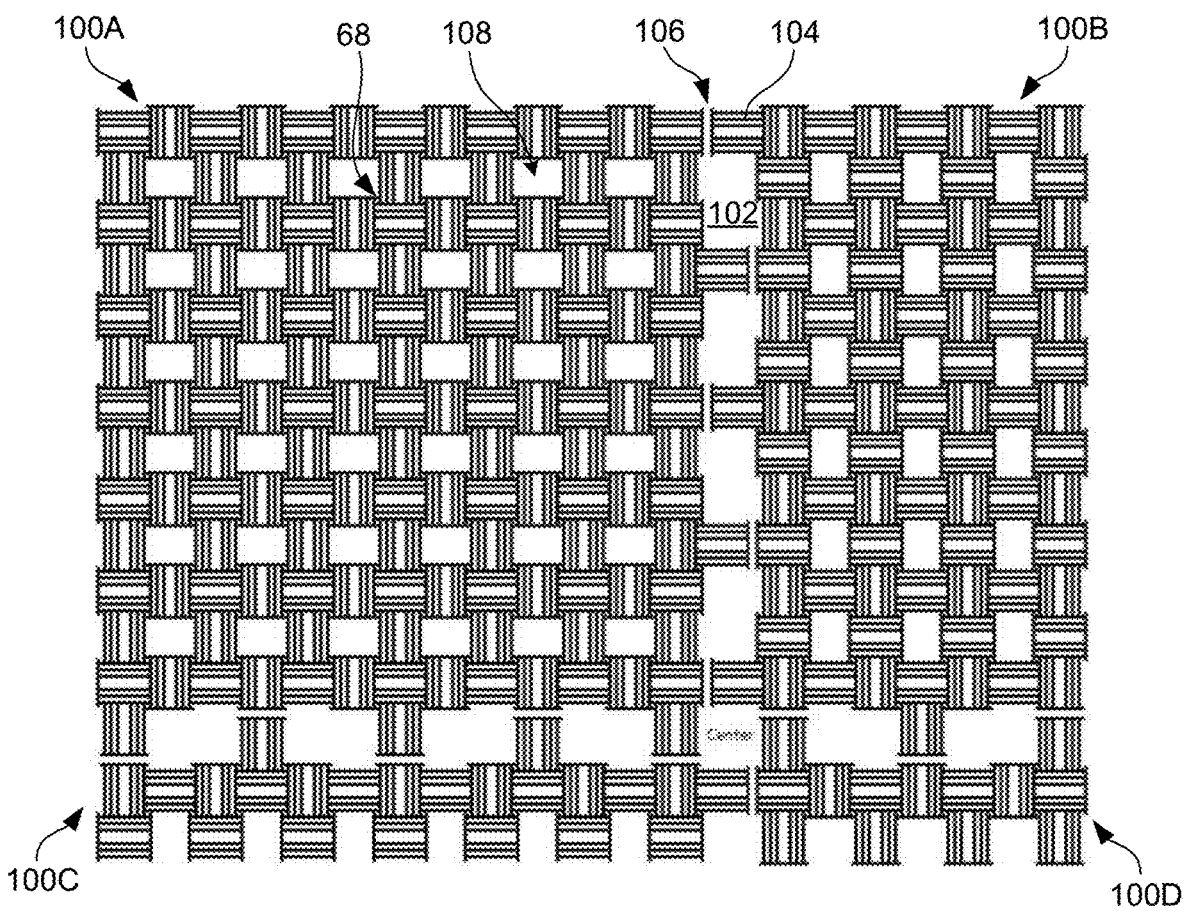
FIG. 36 is a top plan view illustrating four example evaporation panel assemblies for use as part of an example wastewater evaporative separation system, where the four individual evaporation panel assemblies are grouped together, but spaced apart from one another, by a small distance or gap in accordance with the present disclosure.

With these enlarged evaporative airflow channels 58A and 58B, when they are positioned in alignment with respect to horizontal airflow 28A, they can allow for airflow/evaporation to and from evaporation panel to evaporation panel, from outside of the evaporation panel assembly to within the evaporation panel assembly. These enlarged airflow patterns can also be extended by aligning the (already aligned) enlarged evaporative airflow channels coupled with enlarged inter-panel spaces (see 28 at FIG. 12E) kept open between parallel panels. In one example, when positioning panels orthogonally with respect to an evaporation panel that includes enlarged evaporative airflow channels, the orthogonally oriented evaporation panels can be positioned just laterally (one on each side) with respect to the enlarged evaporative airflow channels so as to not obscure the enlarged evaporative airflow channel opening. For example, FIG. 36 shows multiple evaporation panel sub-assemblies joined together where a central portion of each sub-assembly is devoid of an evaporation panel which would otherwise have aligned with the enlarged evaporative airflow channel of an adjacent, orthogonally oriented evaporation panel sub-assembly.

With less bulk material used to form the evaporation panel shown in FIGS. 21A and 21B (and other evaporation panels with one or more enlarged evaporative airflow channel) due to the presence of the enlarged evaporative airflow channels, added strength can be provided by generally adding bulk to some or all of the features, such as the support beam of the support column, the thickness or depth of the evaporation shelves, etc. In some instances, if the desire to keep the evaporation panels within a relatively small size range, e.g., less than 3 feet by 3 feet by 4 inches, 2 feet by 2 feet by 2 inches, etc., providing more relative bulk material per feature with fewer openings can be a reasonable design choice, such as that shown in FIGS. 24A-24D, for example. By balancing bulk material content with evaporation panel strength, and considering evaporative efficiency, a good compromise between evaporation panel strength, versatility, build flexibility, and evaporative efficiency can be achieved.

Figure 21C:
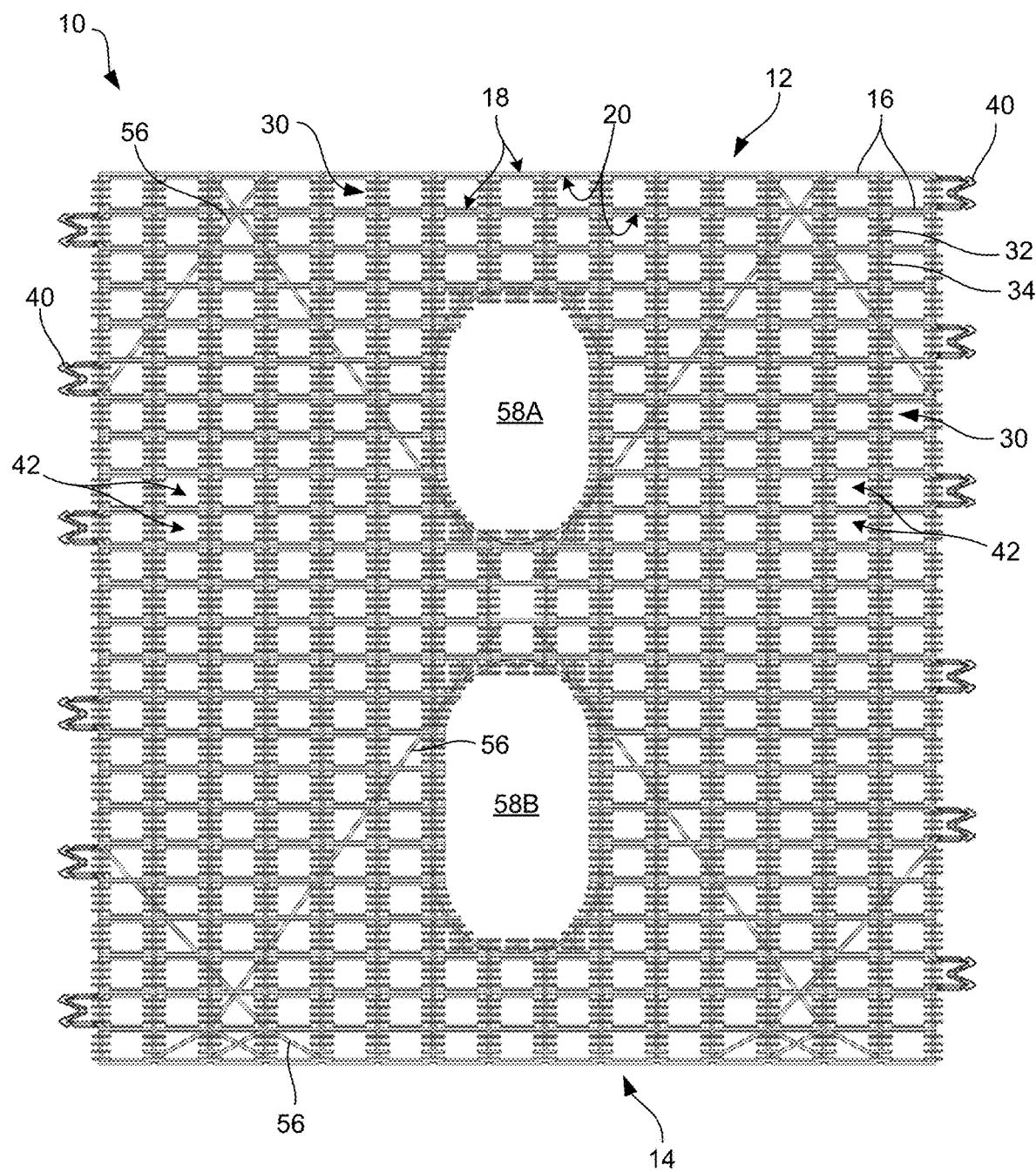
FIG. 21C is a front plan view of an example evaporation panel including enlarged evaporative airflow channels and cross-supports in accordance with the present disclosure.
Figure 21D:
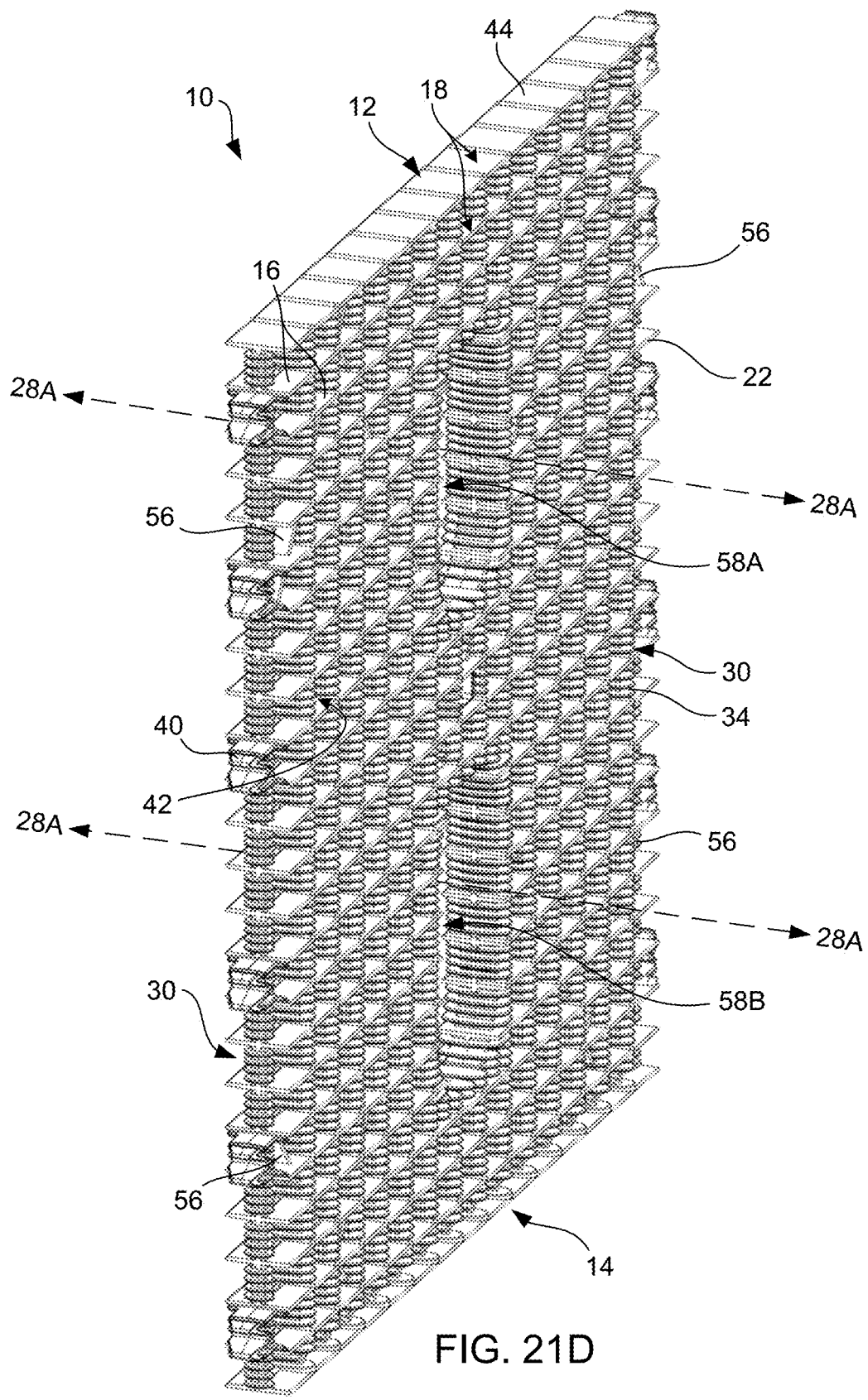
FIG. 21D is an upper left perspective view of the example evaporation panel of FIG. 21C.

FIGS. 21C and 21D depict a front plan view and an upper left perspective view, respectively, of yet another alternative example evaporation panel 10. In further detail, however, the evaporation panel can include an enlarged evaporative airflow channel, and more specifically, this specific evaporation panel can include a first enlarged evaporative airflow channel 58A and a second enlarged evaporative airflow channel 58B. This particular evaporation panel includes cross-supports 56, which can be angular structural cross-supports, for example, and can add strength (such as compression strength due to the weight of upper levels, particularly when loaded with wastewater) to the evaporation panel. The presence of the enlarged evaporation airflow channel(s) can in some cases, weaken the compression strength provided by the evaporation panel due to the presence of fewer support columns and less bulk material used to form the evaporation panel, assuming the dimensions stay the same. However, more bulk material can be added per relative feature to compensate, for example. In still further detail, by adding these or other types of cross-supports, which can act as truss- or bridge-like support to the evaporation panels, the strength of these evaporation panels can be made to be approximately as strong as the evaporation panels shown and described in FIGS. 1-5, and some case, can be even stronger by virtue of the presence of the added cross-supports. Cross-supports can be added to any of the evaporation panels described herein, including evaporation panels that do not include enlarged evaporation airflow channel(s), but are shown and described in this specific example because of the desire to add compensating strength due to the presence of the enlarged evaporative airflow channels. In still further detail, with this or any other example, bulk material can be added to the evaporation panel as a whole, or can be added to certain features to improve strength, as described with respect to FIGS. 21A and 21B, etc.

In further detail with respect to FIGS. 21A-24D, many of the same structures shown and described using reference numerals with respect to FIGS. 1-16 are relevant to the alternative embodiments shown in these FIGS. For example, these evaporation panels 10 are shown oriented in an upright position with a top 12 and a bottom 14. The evaporation panel receives wastewater (not shown) generally at or towards the top thereof, but can also be filled from the sides as well in some examples. Thus, wastewater can thinly fill a series of evaporation shelves 16 by receiving the wastewater toward the top and cascading the wastewater in a downward direction, filling other evaporation shelves positioned therebeneath. Essentially, a plurality of evaporation shelves can include an upper surface 18 and a lower surface 20 for receiving, holding, and distributing the wastewater in a generally downward direction, while exposing a large surface area (air/liquid interface) of the wastewater to the natural forces of evaporation, for example. In one specific example, the evaporation shelves can have a flat or essentially flat upper surface with a slight taper over an edge 22 (such as a beveled edge) thereof and a minor slope at the lower surface underneath, e.g., from >0° to 5°, 1° to 4°, 2° to 4°, or about 3° from horizontal, or can alternatively be essentially horizontal. Additional features that can be present include support columns 30 which support the evaporation shelves. The number of support columns and evaporation shelves is somewhat arbitrary, as any number of support columns and evaporation shelves can be present, as previously described. In this example, support columns can include a support beam 32, which in this instance is a center positioned support beam, and evaporation fins 34. The support beam can be positioned elsewhere, but when in the center, water can fill around the support beam on the evaporation fins. In this example, the evaporation fins are positioned around the enlarged evaporative airflow channels 58A and 58B in order to provide increased surface area to wastewater loaded on those particular evaporation fins. However, in other examples, the evaporation fins might not be present around the enlarged evaporation airflow channels.

The evaporation panels 10 can also include structures that are suitable for joining (releasably joining) adjacent evaporation panels from a common evaporation panel system to form an evaporation panel assembly. This particular evaporation panel includes a series of male connectors 40 at sides or ends (positioned laterally at ends when viewing the evaporation panel from the front) of the evaporation panel. The male connectors can be joined orthogonally with other adjacent evaporation panels in any of the many female-receiving openings 42 that may be available. In this example, the female-receiving openings can also act as open spaces (most of which being available for airflow as many may not specifically be associated with a corresponding male connector) to facilitate airflow through the evaporation panel. As with the evaporation panels previously shown, the male connectors on the right side can be vertically offset with respect to the male connectors on the left side. This is so that two evaporation panels can be joined in a common line (with an orthogonally positioned third evaporation panel positioned therebetween as shown for example in FIG. 10). If these male connectors were not vertically offset along the lateral sides or ends of the evaporation panel, they would not be able to align in this particular configuration, e.g., the male connectors would occupy the same female-receiving opening. That being stated, as with any of the other examples, if the male connectors were shorter so that they did not interfere with one another, or if the male connectors were otherwise offset with respect to one another, but were not necessarily positionally offset in separate female-receiving opening, they could be configured to occupy the common female-receiving opening (e.g., two male connectors that would "face" one another or pass along-side of one another for positioning within a common female-receiving opening could be offset within the female-receiving opening or could be otherwise shaped to not interfere with one another). In further detail, the evaporation fins 34 found at the lateral ends or sides of the evaporation panel (at the support column(s) immediately adjacent to the vertically aligned male connectors) can be smaller in size than other evaporation fins. This is so that the evaporation fins could still provide some wastewater-holding and evaporative function, while still being able to fit within a female-receiving opening of an orthogonally adjacent evaporation panel when two evaporation panels are releasably joined or locked together.

In further detail, to facilitate evaporation, adjacent evaporation shelves can vertically define and border a plurality of open spaces within the evaporation panel, and adjacent support columns can horizontally define and border the plurality of open spaces as well. Thus, to promote evaporation of the wastewater from the waste material contained therein, airflow through these open spaces can occur, as previously described, e.g., including generic open spaces 48 (see FIGS. 17-20) or female-receiving openings 42 that may not be used for receiving male connectors 40. In further detail, however, and in connection with the examples shown in FIGS. 21A-24D, a larger horizontal shaft of airflow can be allowed to flow through one or more enlarged evaporative airflow channel(s) 58A and 58B, as previously described. Thus, in one example, evaporative fins 34 of the vertical support column 30 (when loaded with a column of wastewater, for example) can generally define and border enlarged evaporative airflow channel 58A having a channel area that can be at least eight (8) times larger than an average area of the individual open spaces, e.g., 8 to 80 times larger, 10 to 60 times larger, 10 to 40 times larger, 20 to 40 times larger, etc. In one example, a second enlarged evaporative airflow channel 58B having a channel area at least eight (8) times larger than the average area of the open spaces can also be present, e.g., 8 to 80 times larger, 10 to 60 times larger, 10 to 40 times larger, 20 to 40 times larger, etc. In one example, one of the enlarged evaporative airflow channels can be larger than the other, or in still another example, the two airflow channels can be about the same size.

For further clarity with respect to the examples shown in FIGS. 21A-24D, when comparing the channel area size of a single enlarged evaporation airflow channel, 58A or 58B, to the area size of smaller "open spaces," the open space area size is based on an average area size, whereas the enlarged evaporation airflow channel 58A area size is based on an individual channel area size, not the collective area size of all enlarged evaporative airflow channels. Furthermore, the respective relative area sizes (for size comparison) can be measured essentially as a perpendicular plane relative to the generally horizontal airflow pattern, shown at 28A, that can occur directly into and out of the evaporation panel's various types of airflow openings. In other words, the respective areas can be measured using the horizontal and vertical axes of the evaporation panel when viewed from a front plan perspective view, as shown in FIGS. 21A and 21C, 22, 23, and 24A. Additionally, the calculated respective area sizes do not include any of the small inter-fin spaces or gaps found vertically between the evaporation fins, as when loaded with wastewater, these gaps typically can be filled with water, as shown in FIG. 15. Thus, the area is based on the area when loaded with wastewater for simplicity. These calculations can also ignore any deminimis positive structure that may complicate the average area size calculation, such as the cross-supports 56 shown in FIGS. 21C-24D. Also, for further clarity, evaporation panel "depth" (front to back dimension as viewed from the front plan perspective) is not used when calculating the relative area sizes of the open spaces, as a volume measurement is not relevant to this particular ratio calculation. In still further detail, the term "enlarged" in the context of the enlarged evaporation airflow channel (as well as the enlarged inter-panel space) is a relative term, meaning that each evaporative airflow channel is enlarged relative to the average size of the open spaces (or relative to the other inter-panel spaces), which again can be an average area provided by both used and unused female-receiving openings 42, as well as any other open spaces that may be present. With further regard to some of these other types of open spaces that are not also female-receiving openings, such as the open spaces 48 shown in FIGS. 17-20, these open spaces are also to be considered as an "open space" for purposes of calculating the average area of the open spaces generally. That being mentioned, these and other types of open spaces should have an area size that is within the range of four times larger to four smaller than the female-receiving openings to be included in the open space average size calculation. If much larger than this, these other types of open spaces would begin to approach the size of an individual enlarged evaporation airflow channel.

As a specific example regarding the area size ratio of the average area size of the open spaces compared to the absolute area size of a single enlarged evaporative airflow channel, the evaporation panels shown in FIGS. 21A-23 can be considered (the ratios would be different for the evaporation panel shown in FIG. 24A-24D, which are not estimated in this example). In these examples, the ratio of the average area size of the open spaces (all of which are female-receiving openings in this example, ignoring gap spaces between evaporation fins, and ignoring the positive structure of the cross-supports that fall within the open spaces) to the average area size of enlarged evaporation airflow channel 58A is about 1:30 (e.g., just under 30 times larger). In further detail, the ratio of the average area size of the open spaces to the absolute area size of enlarged evaporation airflow channel 58B is about 1:35 (just under about 35 times larger). Thus, these enlarged evaporation airflow channels are both within the range of "at least eight (8) times larger" compared to the average area size of the open spaces. More specific suitable area size ratio ranges can be, for example, from 1:8 to 1:80, from 1:10 to 1:60, from 1:10 to 1:40, from 1:20 to 1:40, etc.

FIGS. 22-24D, on the other hand, depict four alternative examples with alternatively configured cross-supports 56 that are different than that described in FIGS. 21C and 21D. These specific cross-supports can also include angular structural cross-supports, such as X-shaped cross-supports shown in FIG. 22, as well as both X-shaped and diagonal cross-supports shown FIGS. 23-24D. In each of these examples, other cross-support configurations could alternatively or additionally used, including V-shaped cross-supports, I-shaped cross-supports (e.g., beams without evaporation fins, which are not considered to be angular structural cross-supports, but can still be used in some examples), etc. Comparing the evaporation panel shown specifically at 24A-24B to the evaporation panel shown at FIGS. 24C and 24D, with the latter, similar to the examples shown in FIGS. 21A-23, there are evaporation fins 34 positioned essentially entirely around the respective enlarged evaporative channel openings 58A and 58B. However, in the former example, shown in FIGS. 24A and 24B, the evaporation fins are positioned primarily laterally (with a few above and a few below as well) with respect to the enlarged evaporative channel openings. Rather, a portion of the enlarged evaporative channel openings can be defined by cross-supports 56, rather than completely by evaporation fins carried by support beams (which can themselves be supported by support beam, cross-supports, and evaporation shelves). In other words, the enlarged evaporative channels openings can be structurally provided in this and other examples by vertical support beams 32, cross-supports 56, and evaporation shelves 16, but in some examples, some of these structures or all of these structures can also carry evaporation fins to provide additional evaporative surface area.

As another note, the evaporation panels shown in FIGS. 24A-24D include fewer evaporation shelves 16 and fewer support columns 30 relative to the examples shown in FIGS. 21A-23, though dimensionally, this evaporation panel can be made to be about the same size (width by height), or alternatively, can be a different size (as is the case with any of the evaporation panels described elsewhere herein). If this particular evaporation panel were fabricated to be about the same dimensions as the evaporation panels shown in FIGS. 21A to 23, for example, the fewer number of evaporation shelves and support columns could result in larger female-receiving opening sizes, and thus, the male connectors could also be larger to be engageable with the respective female-receiving openings to be joined therewith from another orthogonally adjacent evaporation panel that may likewise be similarly configured.

Figure 22:
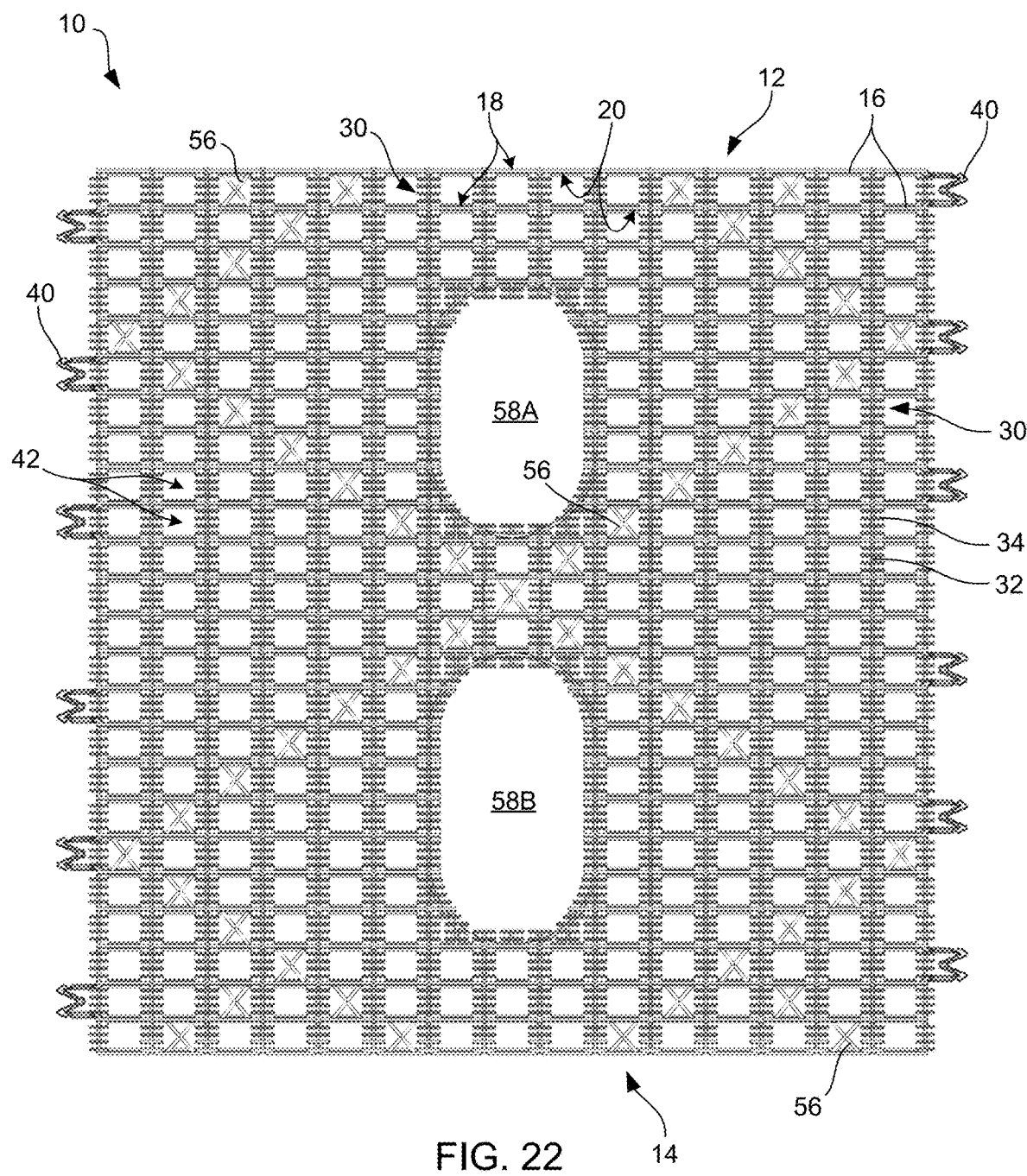
FIG. 22 is a front plan view of an example evaporation panel including enlarged evaporative airflow channels and cross-supports in accordance with the present disclosure.
Figure 23:
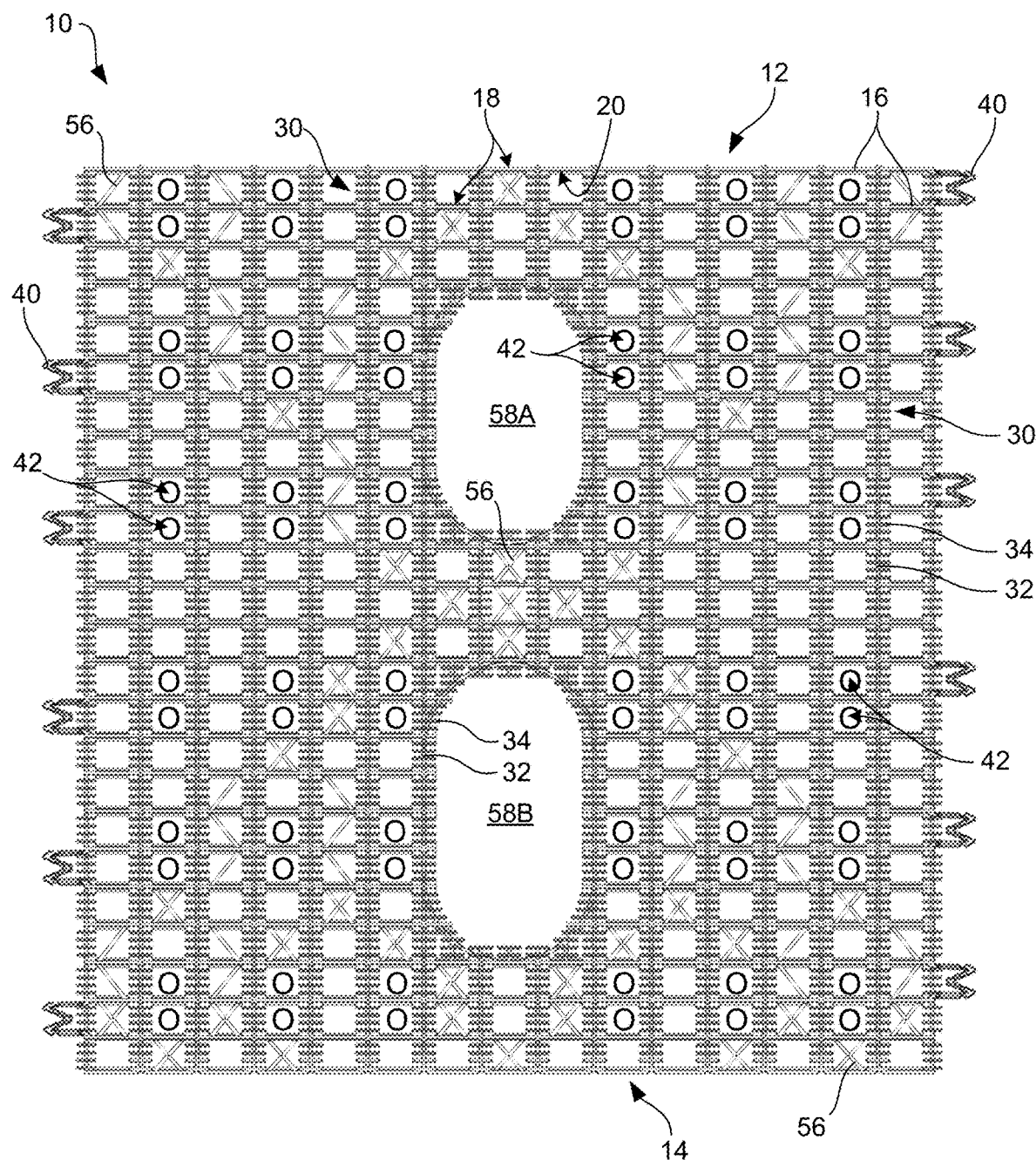
FIG. 23 is a front plan view of another example evaporation panel including enlarged evaporative airflow channels and cross-supports in accordance with the present disclosure.
Figure 24A:
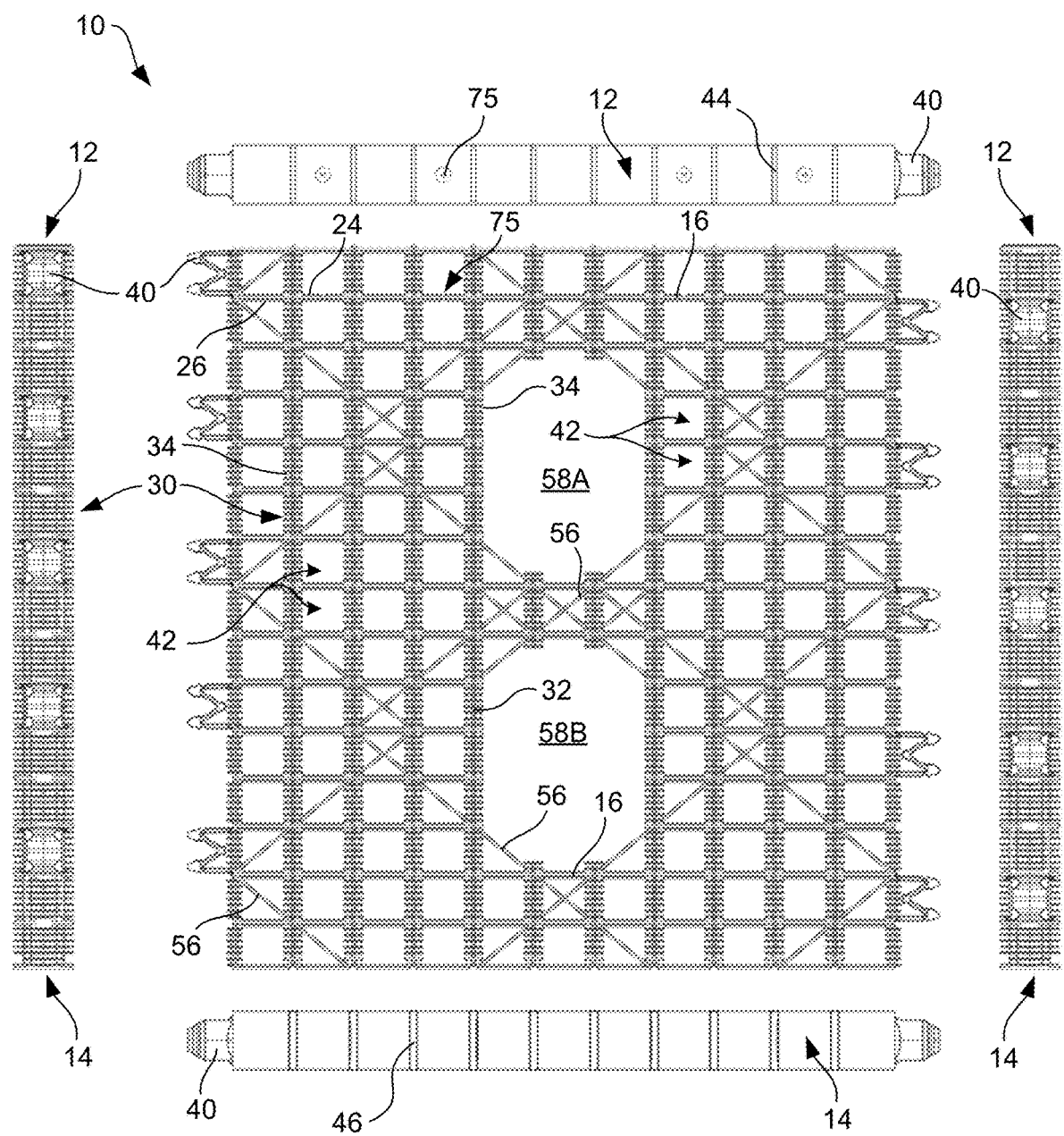
FIG. 24A provides a front plan view, left and right side or end plan views, a top plan view, and a bottom plan view of another example evaporation panel with enlarged evaporative airflow channels and cross-supports in accordance with the present disclosure.
Figure 24B:
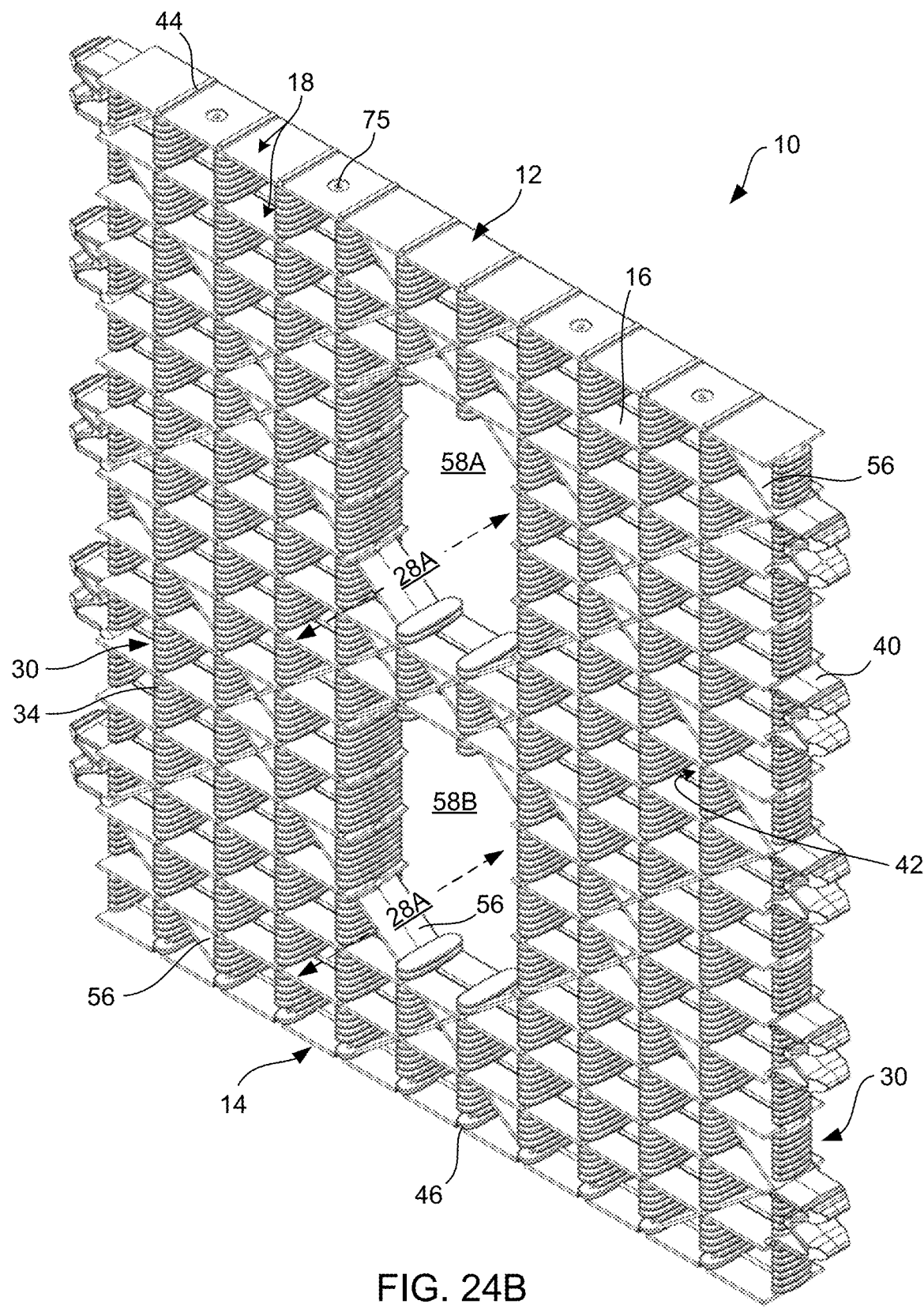
FIG. 24B is an upper left perspective view of the example evaporation panel of FIG. 24A.
Figure 24C:
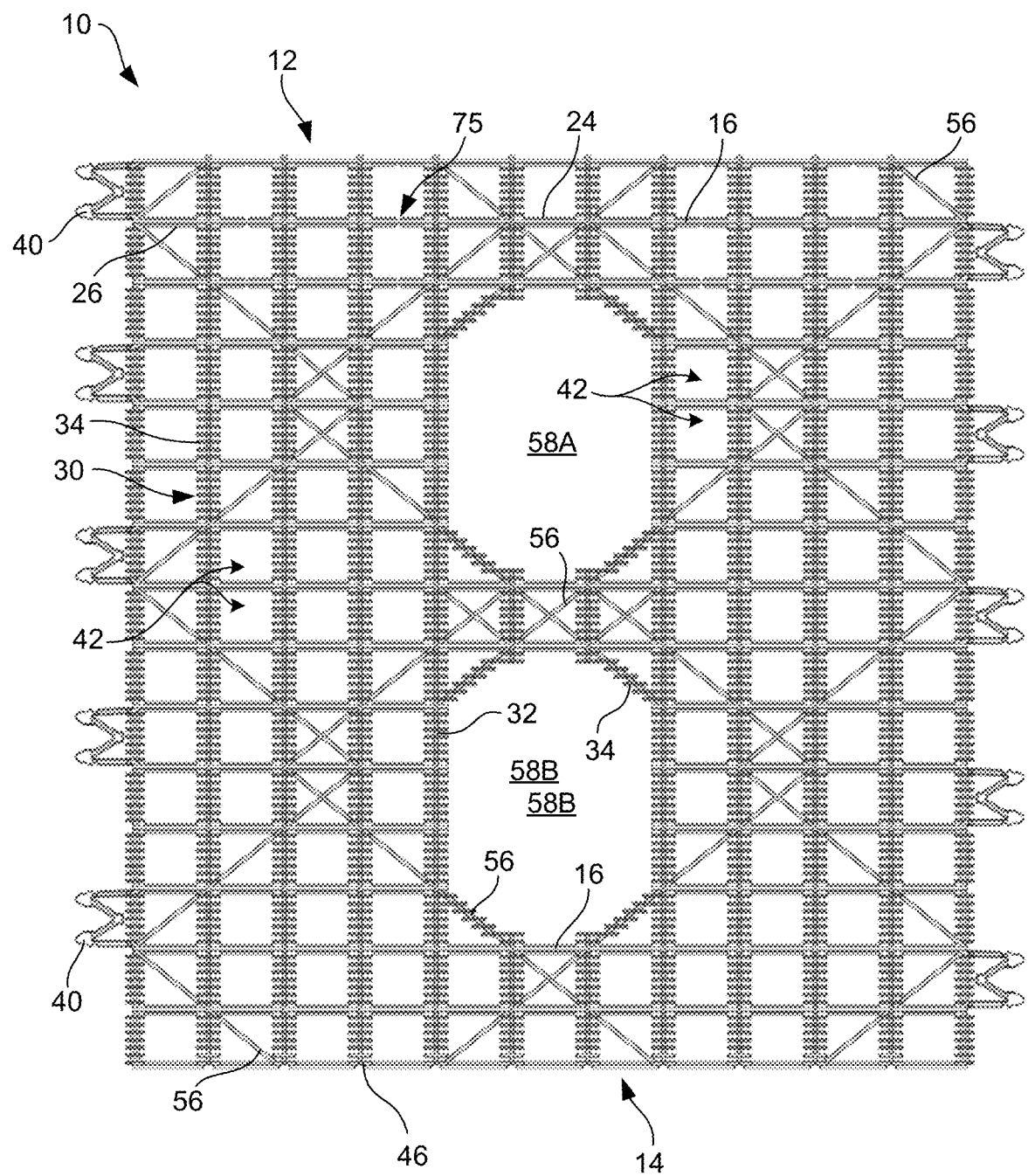
FIG. 24C is a front plan view of another example evaporation panel with enlarged evaporative airflow channels and cross-supports in accordance with the present disclosure.
Figure 24D:
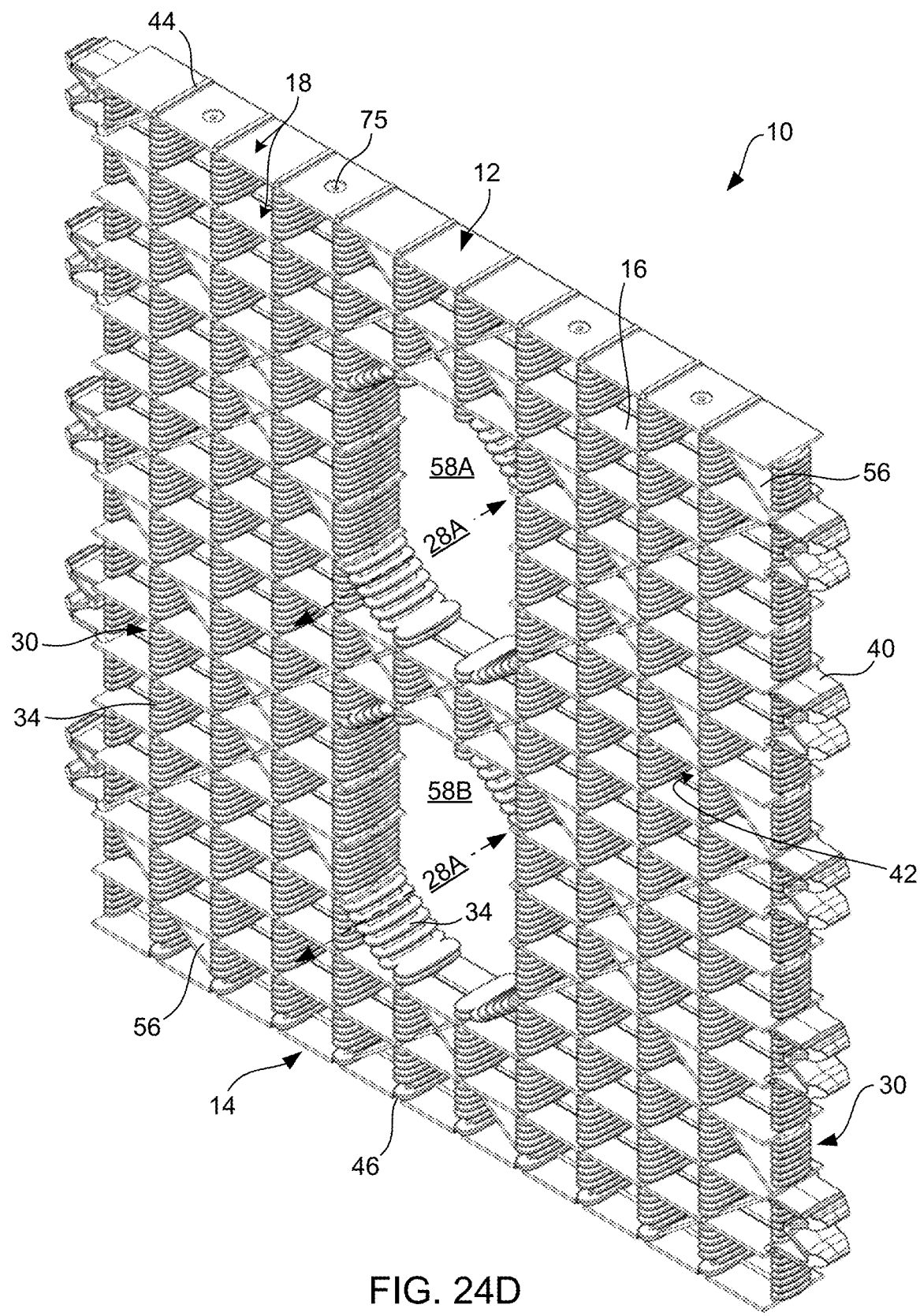
FIG. 24D is an upper left perspective view of the example evaporation panel of FIG. 24C.

In further detail in these specific examples, the cross-supports 56 can be configured differently in those shown in FIGS. 21C and 21D, in that the cross-supports can be positioned so that they do not come into contact with the water column that may be formed at or about the evaporation fins, such as that shown in FIG. 15. Examples of this are shown in FIGS. 22 and 23. Alternatively, if there is some contact between the cross-supports and the water column (once formed), then the contact may be minor at a top and/or bottom of the support column. An example of this is shown in FIGS. 24A and 24D. Either of these types of configuration can minimize any draining effect that can occur when (downwardly) angled cross-supports may come into contact with vertically suspended water columns at a center portion thereof. With the cross-supports shown in FIGS. 22-24D, the evaporative fins can retain more wastewater along the bulk of the water column without interference or significant inference from any draining effect that may occur due to surface tension interruption between the evaporative fins and the wastewater. That being stated, all of the other features can be the same as previously described, including in FIGS. 1-21D generally, and thus need not be re-described.

As a further note regarding the placement of the cross-supports 56, if there is a predetermined evaporation panel sub-assembly or assembly pattern that is to be used that is known in advance, such as one or more of the evaporation panel sub-assembly patterns shown in shown in FIGS. 11-12E and/or or evaporation panel assemblies shown in FIGS. 33-36, for example, then the cross-supports can be strategically positioned to not interfere with female-receiving openings that may be used (or are intended to be used). As an example, if a pi-shaped sub-assembly is to be used to form a larger evaporation panel assembly, such as that shown in FIG. 12E, to build an evaporation panel assembly similar to that shown in FIG. 34 or 36 (with or without vertical airshafts), then certain female-receiving opening 42 positions can be reserved to facilitate the assembly of the pi-shaped sub-assembly. For example, female-receiving openings can be left available to accommodate six "teeth" joined into one or two "spines," also potentially considering leaving an enlarged inter-panel space between parallel teeth panels, e.g., centrally located. An example of female-receiving opening locations that can remain for accommodating these sub-assembly and assembly configurations are shown by way of example in FIG. 23, where available female-receiving openings are noted as "O" positions.

Returning to a more general discussion regarding evaporation panel dimensions, materials, surface treatments, etc., the evaporation panels described herein can generally be of any size and configuration suitable for generating evaporation and separation of water from waste or contaminant material. In one example, however, the evaporation panels can be made of a material that is not susceptible to rust or other similar damage that may occur when exposed to water and waste/contaminant material over a long period of time. Thus, there are many plastic or other materials that can be used. Additionally, in one example, the evaporation panels can be made from a single material that is molded or otherwise formed as a unitary structure. In still further detail, because the evaporation panels can be used to connect and form complex and large structures, in one example, the evaporation panels can be of a size and weight suitable for any applicable use, but in one example, the size and weight can be suitable for a single individual or two individuals to safely handle and attach to other evaporation panels. In one example, the general size of an evaporation panel (width by height) can be, for example, from 1 foot by 1 foot to 10 feet by 10 feet, or anything in between. The shapes can be generally rectangular, and in one example, generally square, with relatively shallow depth compared to the width and height. For example, a panel can be (width by height, or height by width) 1 foot by 10 feet, 1 foot by 8 feet, 1 foot by 5 feet, 1 foot by 4 feet, 1 foot by 3 feet, 1 foot by 2 feet, 1 foot by 1 foot, 2 feet by 10 feet, 2 feet by 8 feet, 2 feet by 5 feet, 2 feet by 4 feet, 2 feet by 3 feet, 2 feet by 2 feet, 3 feet by 10 feet, 3 feet by 8 feet, 3 feet by 6 feet, 3 feet by 5 feet, 3 feet by 4 feet, 3 feet by 3 feet, 4 feet by 10 feet, 4 feet by 8 feet, 4 feet by 5 feet, 4 feet by 4 feet, 5 feet by 10 feet, 5 feet by 8 feet, 5 feet by 5 feet, and so forth. Other dimensions are also possible and useable, without limitation, e.g., 18 inches by 18 inches, 30 inches by 30 inches, 42 inches by 42 inches, 18 inches by 3 feet, 2 feet by 42 inches, etc. The dimensions can also be based on the metric system, e.g., 0.5 meter by 0.5 meter, 0.75 meter by 0.75 meter, 1 meter by 1 meter, 1.5 meter by 1.5 meter, etc. The depth of the evaporation shelf (or general depth of the evaporation panel can be relatively thin by comparison, e.g., from 1 inch to 6 inches, from 1 inch to 4 inches, from 1 inch to 3 inches, from 1 inch to 2 inches, from 2 inches to 4 inches, from 2 inches to 3 inches, from 3 inches to 4 inches, from 1.5 inches to 3 inches, from 1.5 inches to 2.5 inches, about 2 inches, etc. Larger (or wider) shelves may be used (with more material) when higher evaporation panel assemblies may be contemplated. For example, changing the depth of the evaporation panel depth from 1½ inch to 2 inches may provide enough added bulk material to build up an additional several evaporation panel assembly levels, e.g., from 28 feet to 40 feet, for example, depending on the configuration, material choice, etc.

Regardless of the dimensions, these panels can be snapped together in virtually any orthogonal orientation and stacked vertically with respect to one another to form any of a number of complex structures. As a result, because very large and complex structures can be formed, a very large amount of surface area (for wastewater loading) can be generated with a relatively small footprint. The flexibility of design choice is vast. For example, a small 1 foot by 1 foot by 1 foot cube, or a 2 foot by 2 foot by 2 foot cube, etc., similar to that shown in FIG. 11 can be built out to a lateral dimension of 400 feet by 400 feet, and at a height of 40 feet, for example, to form a complex structure that can be assembled with built in doorways, stairways (as the evaporation panel assembly can be highly weight bearing), and open rooms inside, for example. Compared to an evaporation pond where there is a single air/liquid interface at a surface of the pond, because of the large amount of wastewater surface area that can be generated using such a relatively small footprint, faster wastewater processing can be carried out. In other words, the evaporation panel assemblies of the present disclosure can allow for a very large volume of water to be separated from waste, e.g., debris, other liquids, salts, etc., in a relatively small land area.

In accordance with examples of the present disclosure, when the wastewater is fully loaded on an evaporation panel, the wastewater can be held on the structure at a weight ratio of wastewater to evaporation panel bulk material of at least 1:2, or at least 2:3, or at least 1:1, or more in some instances. Thus, when the evaporation panel is formed of plastic, such as HDPE for example, the weight of the wastewater being held by the evaporation panel can weigh, for example, at least as much, and often, more than the weight of the evaporation panel. In another example, the weight ratio can be at least 1.2 to 1, or at least 1.5 to 1, depending on the design and bulk material of the evaporation panel. In still another example, the surface area of exposed wastewater on a fully loaded evaporation panel can be from about 2 to about 8 square inches ($in^2$) per cubic inch (1 $in^3$) of evaporation panel volume, or from about 2.3 to about 6 $in^2$ of the evaporation panel. This can be calculated by measuring the surface area of wastewater that is formed on a loaded evaporation panel (e.g. surface area at the upper surfaces, the lower surfaces, and the surface area of the water columns), and by measuring the panel volume which is defined by the width by height by depth of the evaporation panel (including all openings). Thus, the volume is based on the simple dimension of the width by height by depth, not the volume of the material per se. In one example, the surface area of exposed wastewater on a fully loaded evaporation panel can be from 3 to about 6 $in^2$ per 1 $in^3$ of evaporation panel volume. In another example, the surface area of exposed wastewater on a fully loaded evaporation panel can be from 3.3 to about 4.6 $in^2$ per 1 $in^3$ of evaporation panel volume. In another example, the surface area of exposed wastewater on a fully loaded evaporation panel can be from 3 to about 5 $in^2$ per 1 $in^3$ of evaporation panel volume. When the evaporation panel includes one or more enlarged evaporative airflow channels, such as shown in FIGS. 21A-24D, the ratio may be on the lower end of some of these ranges. Of course, surface area to volume ratios can thus be outside of these ranges. In a more specific example, a 24 inch by 24 inch by 1.5 inch evaporation panel can be said to have a volume of 864 cubic inches. Thus, the evaporation panel wastewater surface area for this particular evaporation panel may be measured to be about 2,000 square inches to about 5,000 square inches, e.g., about 2,000 square inches, about 3,000 square inches, about 4,000 square inches, about 5,000 square inches. In one example, the evaporation panel wastewater surface area for this particular evaporation panel (24 by 24 by 1.5 inches) may be measured to be about 2,500 square inches to about 4,000 square inches, depending on the number of shelves, etc.

With respect to water retention on the evaporation panel, generally flat (or even subtly or slight convex or concave) evaporation shelves tend to work well with materials that have some polar surface properties suitable to hold water in place long enough for evaporation to occur while being weak enough to allow water to pass from evaporation shelf to evaporation shelf, or from evaporation shelf to evaporation fin, etc., when loading wastewater. Certain plastic materials, for example, can be too hydrophobic to be particularly efficient at holding water (though they can still be used with some success), but these same materials can be surface treated to generate more hydrophilic surface properties that can be effective when using certain materials. For example, high density polyethylene that has been surface treated with a flame, chemical, or the like, works well with essentially flat surfaces. That is not to say that other materials cannot be used. For example, some plastics can work well without surface treatment, and others can work well with surface treatment. Alternatively, other rigid or semi rigid material can be used as well, on their own or combined with plastics, e.g., metals, alloys, woods such as varnished woods, glass, fiberglass, composites, or combinations of any of these, etc.

In an example of the present disclosure and as briefly mentioned, each of the evaporation panels and evaporation panel systems/assemblies shown herein can be of a common material and prepared as a unitary structure. For example, a common material that can be used to mold the evaporation panel described herein can be any suitable form of plastic. Examples include polyethylene, e.g., HDPE (high density polyethylene with a density of 0.93 g/cm$^3$ to 0.97 g/cm$^3$) or LDPE (low density polyethylene with a density of 0.91 g/cm$^3$ to 0.93 g/cm$^3$) or XLPE (cross-linked polyethylene), polypropylene, polyethylene terephthalate, etc. Other materials can also be used as previously described. However, in one example, because certain plastics can be hydrophobic in nature with relatively or highly non-polar surfaces, in order to improve their adhesion with water, the surface of the evaporation panel can be treated to provide a more polar surface for the wastewater to adhere. Treatments can include flame treatment, plasma treatment (atmospheric or vacuum), corona treatment, chemical treatment such as contact with an acid or other surface modifying chemical (dipping, brushing, fogging, etc.), or priming (applying primer to enhance water adhesion).

With specific reference to flame treatment, a hot flame can be briefly applied to the various surfaces of the evaporation panel, which changes the surface chemistry of the plastic. Surfaces can be converted from highly non-polar to a more polar surface that attracts (rather than repels) water. Indeed, though the body of the plastic, such as HDPE, may remain non-polar and hydrophobic, the surface becomes more reliably polar, enough so that water can fill the various evaporation surfaces and still cascade downward as evaporation occurs and more wastewater is added to the top of the evaporation panel. By way of example, two monolithic HDPE evaporation panels having a configuration of FIGS. 1-5 were molded and snapped together in an L-shaped configuration, similar to that shown in FIGS. 9 and 20. A blow torch was used to treat (contact) every surface of one of the two evaporation panels at side-to-side moving rate of about a half foot per second, e.g., the blow torch was moved relatively quickly along each evaporation shelf. Water was then loaded on the L-shaped evaporation panel assembly. The evaporation panel that was not flame treated caused the water to form multiple water beads on the surface and the water did not adhere to the lower surface of the evaporation shelves very effectively. Water also did not completely wick into spaces between the evaporation fins. Thus, the evaporation panel was functional, but was not fully loaded with water as it could be, not fully taking advantage of all of the surfaces available. Conversely, the water loaded on the torch-treated evaporation panel was uniformly and evenly distributed along the entire upper surface, and the water also adhered to the lower surface due to the surface tension of the water and the flame-generated polar properties now present on the surface of the HDPE material.

In another example, with specific reference to chemical treatment or coating, in one example, an evaporation panel which includes polymeric evaporation surfaces, e.g., polyethylene, polypropylene, polyethylene terephthalate, etc., can be treated with fluorine gas to modify the surface thereof. Fluorine can be highly oxidizing and the electronegativity of the fluorine ion (F$^-$) can facilitate various chemical reactions to certain polymeric surfaces. Fluorine may also be combined with other gases to modify the surface chemistry, including modification by adding various concentrations of oxygen, nitrogen, and/or carbon dioxide. Gas mixture, relative concentrations admixed with the fluorine, processing temperatures, times, etc., can be used to modify the surface properties. In accordance with the present disclosure, surface modifications that can be helpful relate to the hydrophilicity and/or wettability of the surface. The fluorine can interact with the surface through fluorine substitution of hydrogen, forming multiple C—F bonds, for example. Fluorine treatments utilizing high-energy processes can generate some surface cross-linking in certain embodiments, which can enhance the permanence of the modified surface properties. In other examples, the surface energy of the evaporation panel surface can also be increased, which can be related to an increase in the surface polarity, e.g., the surface becomes less non-polar or more polar, and thus, more hydrophilic. These surface modifications can be primarily at the surface, but in some examples can extend down into the surface up to several microns, e.g., from 10 nm to 20 μm, from 50 nm to 10 μm, from 100 nm to 8 μm, or from 1 μm to 6 μm. The depth of surface treatment into the surface of the evaporation part is not necessarily limited by these ranges, but they are provided by example to indicate that deeper surface treatments may have a longer lasting effect. Furthermore, regardless of the depth of the surface treatment, surface energies can obtained that are acceptable for holding and cascading wastewater on the various surfaces of the evaporation panels described herein. For example, surface energies for polyethylene, polypropylene, or polyethylene terephthalate can be modified from a relative low range of about 28 dynes/cm to about 40 dynes/cm to a higher surface energy (more polar and more hydrophilic) from about 60 dynes/cm to about 75 dynes/cm, or from about 62 dynes/cm to 72 dynes. In one example, HDPE can be modified at a surface thereof at any depth up to about 10 μm at a surface tension of about 68 dyes/cm to about 72 dynes/cm.

Specific examples of processes that can be used to "fluorinate" the surfaces of the evaporation panels of the present disclosure in accordance with that described herein include the Fluoro-Seal® process, the Reactive Gas Technology™ process (RGT), or the DuraBlock™ process, each available from Inhance Technologies (Houston, Tex.). By way of a specific example, an HDPE evaporation panel having a configuration as shown in FIGS. 1-5 was treated using an RGT process, and the surface energy of the polyethylene was raised to about 70 dynes/cm, which was highly functional for holding and cascading water from one evaporation shelf to the next (via the edge 22, lower surface 20, evaporation fins 34, and other structures as described elsewhere herein). For example, the wastewater loaded on the fluorine-treated evaporation panel uniformly and evenly distributed the water along the entire upper surface and wicked easily into spaces between the evaporation fins, and the water also reasonably adhered to the lower surface, due to the surface energy of the evaporation panel and the surface tension of the water. Conversely, an evaporation panel that was not treated caused the water to form multiple water beads on the surface thereof, and the water did not adhere to the lower surface of the evaporation shelves, nor did it completely wick into spaces between the evaporation fins. Thus, the untreated evaporation panel was functional, but was not fully tuned for receiving wastewater at all of the available surfaces.

In further detail, with more specific reference to the RGT process, in some examples, the process carried out can be a fluoro-oxidation process, where a heterogeneous reaction of fluorine and oxygen gases can occur at a polymer surface. Thus, the surface can be modified, e.g., at from 10 nm to 10 μm, but the bulk of the material remains unmodified. The activation of the surface can occur very rapidly in some systems, e.g., as low as a fraction of a second, or can be carried out in a somewhat longer process, depending on the bulk material, desired coating, depth of surface modification, etc. The process can be a batch process or a continuous process carried out at controlled pressures, which provides the ability to modulate or adjust the degree of functionalization and distribution of the fluorine and/or oxygen modification process distribution of the treatment. In accordance with examples of the present disclosure, the fluoro-oxidation treatment, or any of the other fluorine treatments described herein or which are similar, can be used to essentially uniformly treat all of the surfaces of the evaporation panel, including sides, deep reliefs, curves, edges, etc., including structures such as even the gaps present between evaporation fins on the support column, various surfaces of the evaporation shelf that may be otherwise difficult to reach with flame treatment, etc. In certain examples, there may be applications where some surfaces would benefit from the treatment while other surface may remain untreated. Examples may include treating the upper surface of the evaporation shelf while not treating the lower surface thereof, or treating the evaporation fins while not treating the lower surface of the evaporation shelf, or treating the upper surface of the evaporation panel while not treating the upwardly extending ridge (or the downwardly extending ridge) to facilitate a desirable wastewater cascading flow. In such cases, selective surface functionalization can be achieved through orientation, masking, or partitioning the evaporation panel.

An example surface reaction scheme for polyethylene treatment is shown at Formula I, as follows:

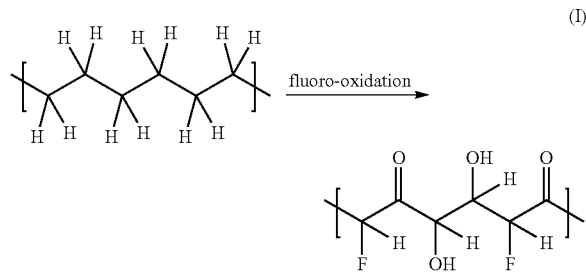

(I)

In Formula I, these structures are shown in brackets, but this is not intended to mean that these are necessarily repeating units, but rather the structure shown (after fluoro-oxidation) provides an example portion of possible surface chemistry that may result at a surface of the polyethylene evaporation panel, e.g., down to as much as about 10 μm. In some other examples, there may be more fluorine groups, more oxygen groups, less modification (e.g., more hydrogen atoms remaining), more modification (fewer hydrogen atoms remaining), alternative gases used other than oxygen (e.g., nitrogen, carbon dioxide, etc.), more carbonyl groups, fewer carbonyl groups, more alcohol groups, fewer alcohol groups, a different ratio of carbonyl groups to alcohol groups, no carbonyl groups, no alcohol groups, etc. This particular structure shown in Formula I has a molar ratio of fluorine to oxygen (substitution) of about 1:2, but the substitution molar ratio range can be 1:5 to 5:1 or from 1:2 to 2:1, or from 1:3 to 1:1, for example. Thus, each of these modifications can generate a different result at a surface of the evaporation panel, resulting in a different surface energy, polarity, hydrophilicity, etc. With this in mind, this particular structure shown in Formula I is merely meant to provide one specific example, on average, of a modified evaporation panel surface that may be generated in accordance with examples of the present disclosure.

In further detail, in one example, the surface of the evaporation panels can be essentially porous or non-porous. Thus, natural attraction of the surface of the material with the water can provide the adhesion and cohesiveness used to essentially completely fill the evaporation panels. Generally, the more wastewater that can be filled on the evaporation panels (while remaining thin enough to evaporate efficiently), the greater the volume of wastewater that can be treated. For example, the evaporation panel can be designed so that the wastewater is no more than about 7 mm thick, e.g., from 1 mm to 7 mm, from 2 mm to 5 cm, from 2 mm to 4 mm, etc. These thicknesses can remain relatively constant, keeping in mind that the wastewater is systematically in motion, filling shelves and cascading downward as evaporation occurs, remaining stagnant momentarily until additional wastewater is loaded thereabove, e.g., wastewater moves vertically and horizontally based on fluid dynamic principles, hydroponic principles, evaporation physics, etc. This movement can be assisted as the spacing, sizing, and configuration of the evaporation shelves, evaporation fins (particularly shown in FIGS. 1-16), and other structures enhance, and in some instances, maximize water tension at the shelving and other water holding structures.

Figure 25A:
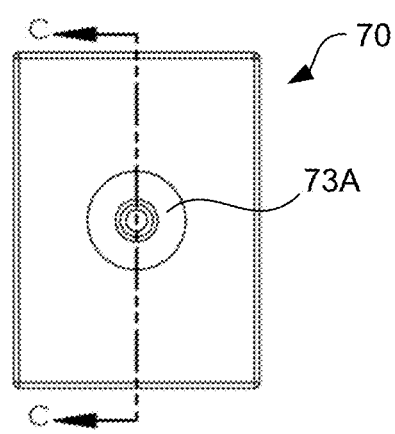
FIGS. 25A-25D provide various plan or cross-sectional views of an example security clip in accordance with the present disclosure.
Figure 25B:
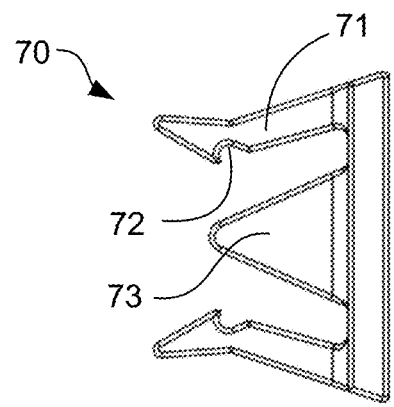
Figure 25C:
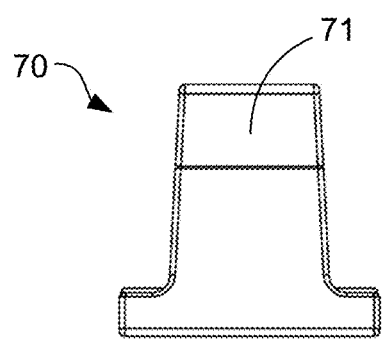
Figure 25D:
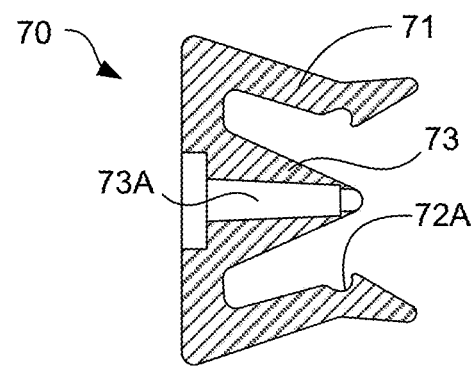

Turning now to evaporation panel securing systems, which include examples where evaporation panel assemblies can be further secured together, FIGS. 25A-25D depict various views of security clip 70 that can also be used in accordance with examples of the present disclosure. The security clip can include, for example a pair of flexible arms 71, each with a security clip engagement groove 72 facing inward near a distal end thereof. The security clip can also include a male locking member 73. In some examples, a horizontal channel 73A can be present as well. FIG. 25A depicts a plan back view of the security clip, FIG. 25B is a plan side view of the security clip, and FIG. 25C is a top plan view (or bottom view) of the security clip. FIG. 25D is a cross-sectional view of the security clip taken along section C-C of FIG. 25A. The security clip can be used as a seismic clip or locking mechanism for the evaporation panel securing systems or assemblies of the present disclosure. For example, the security clip can be used to prevent stacked evaporation panel assemblies from shifting laterally or otherwise, or from rolling during a seismic event. Thus, the security clip can be used to secure vertically stacked panels together. Furthermore, the same security clip can be used to lock evaporation panels that are joined laterally together an interface between the male connector and the female-receiving opening. In one example, the security clip can be so designed as to both secure vertically stacked panels as well as lock laterally joined evaporation panels together simultaneously.

Figure 26:
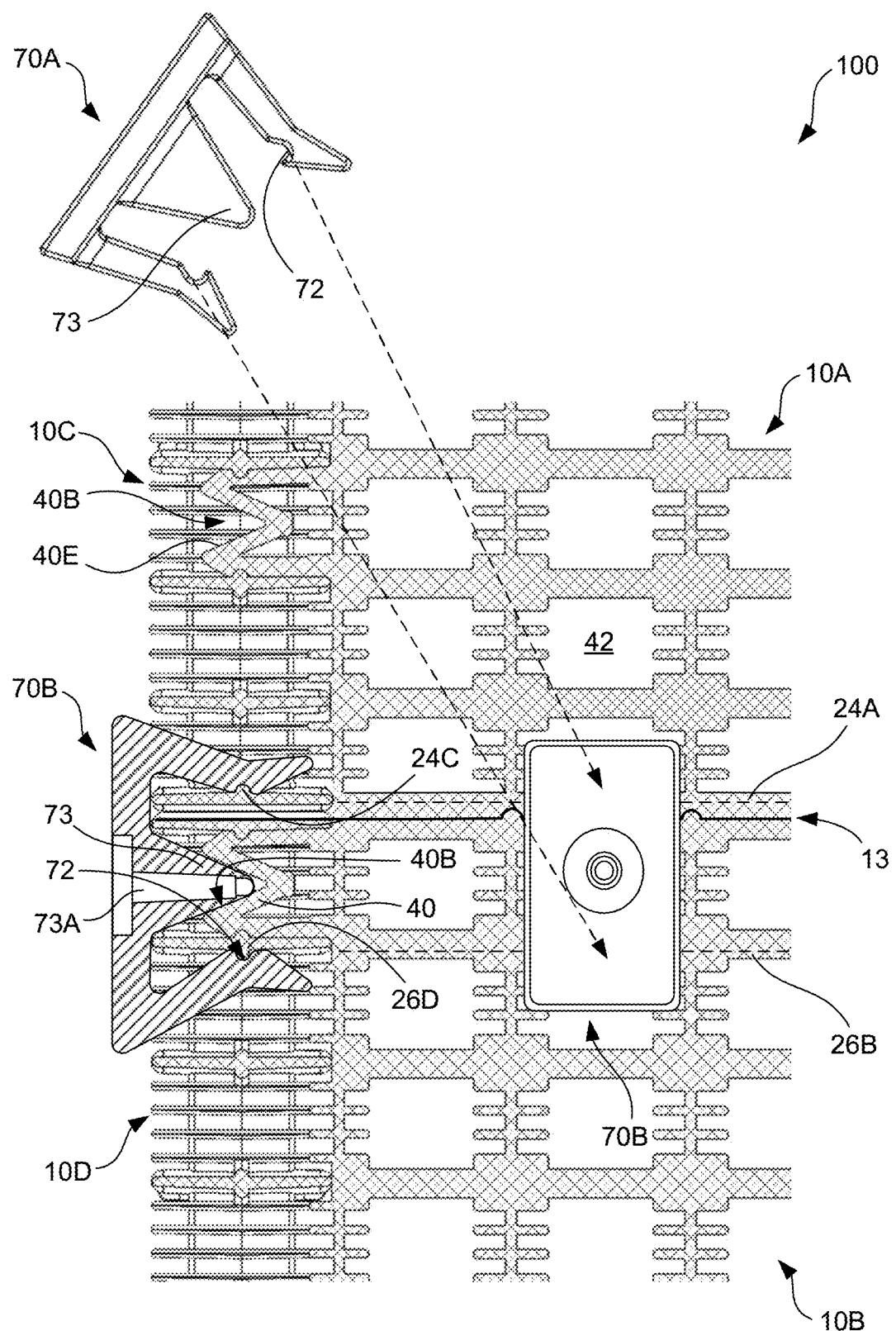
FIG. 26 depicts a cross-sectional view of four example evaporation panels of an evaporation panel securing system joined together as an example evaporation panel assembly, with two example operational assembly configurations shown for one or more security clip in accordance with the present disclosure.

FIG. 26 depicts further detail regarding the security clip and how it can mechanically interact with an evaporation panel system or assembly 100 to further stabilize or secure vertically stacked evaporation panels 10A and 10B (e.g., security clip shown at 70A) and/or more lock laterally joined evaporation panels 100 and 10D together (e.g., security clip shown at 70B). In other words, the security clip can function in two ways. First, the security clip shown at 70A can engage two vertically stacked evaporation panels, essentially preventing or ameliorating lateral or other movement at a vertically stacked panel interface 13. One flexible arm 71 can be positioned over an upper surface of an evaporation shelf present on evaporation panel 10A, and another flexible arm can be positioned under a lower surface of an evaporation shelf present on evaporation panel 10B. There, security clip engagement grooves 72 can become engaged with an upwardly extending ridge 24A and a downwardly extending ridge 26B, thereby securing evaporation panel 10A to evaporation panel 10B vertically. This can prevent movement during a seismic event, for example, where a stacked evaporation panel assembly may otherwise bounce or laterally move, or it can provide additional safety if an operator were to grab or push a panel to prevent a fall or otherwise inadvertently shift or move a panel, or if equipment were to strike an evaporation panel assembly.

Alternatively, the same security clip shown in cross-section at 70B can similarly engage two vertically stacked evaporation panels, but in this case, the security clip engagement grooves 72 become engaged with upwardly extending ridge 24C and downwardly extending ridge 26D, thereby locking evaporation panel 100 to evaporation panel 10D vertically (which are orthogonally oriented with respect to evaporation panels 10A and 10B). However, also in this particular example, a male locking member 73 is also used to engage with male connector 40 found on evaporation panel 10B. By inserting the male locking member into a male connector locking channel 40B, which in this example shaped as a recessed V-channel 40F, the male connector can be prevented from compressing, thereby converting the male connector from a compressible and releasable locking structure to a non-compressible and locked structure that cannot be removed from its corresponding female-receiving opening (without first removal of the security clip or otherwise potentially damaging the evaporation panel). Notably, the female-receiving opening shown specifically at 42 in this FIG. is not the female-receiving opening currently being used by the above-described male connector, but rather is shown by way of example to illustrate an unobscured female-receiving opening configuration. In further detail, horizontal channel 73A can be included to reduce material, or to provide an opening to insert a security screw or other fastener (not shown), which may further couple (by an additional mechanism) the security clip to the adjacently coupled male connector, if desired. This extra fastener is not needed, as the shape of the male locking member relative to the position of the security clip engagement grooves can provide adequate security to both vertically stabilize the stacked evaporation panels (10C and 10D), as well as laterally lock the engagement between the male connector of evaporation panel 10B and the associated female-receiving opening found in evaporation panel 10D. Furthermore, the horizontal channel of the security clip can also provide a location to insert a leveraging tool for removal of the security clip from the evaporation panel, as will be shown in greater detail hereinafter. Though the security clip is shown in both cases at the panel interface in this example, in this example, it is noted that the security clip can also be used to lock any male connector within an associated orthogonally oriented female-receiving opening, whether or not positioned at or near the vertical stacking panel interface (see, for example, FIG. 28).

FIGS. 27A-27F depict various views of an alternative security clip, also referred to as security clip 70, that can also be used in accordance with examples of the present disclosure. Again, this security clip can be used as a seismic clip or locking mechanism for the evaporation panel securing systems or assemblies of the present disclosure. For example, the security clip can be used to prevent stacked evaporation panel assemblies from shifting laterally (or otherwise) or rolling during a seismic event. Thus, the security clip can be used to further secure vertically stacked panels together, or to lock evaporation panels that are joined laterally together an interface between the male connector and the female-receiving opening, or both functions simultaneously.

Figure 27A:
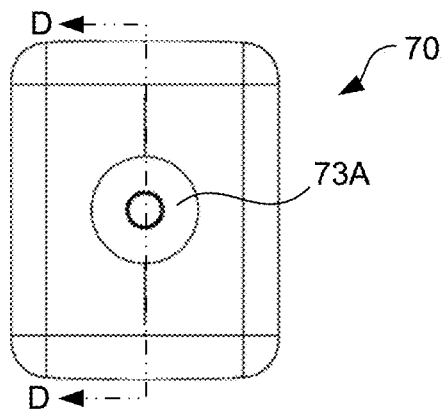
FIGS. 27A-27F provide various plan, perspective, or cross-sectional views of an alternative example security clip in accordance with the present disclosure.
Figure 27B:
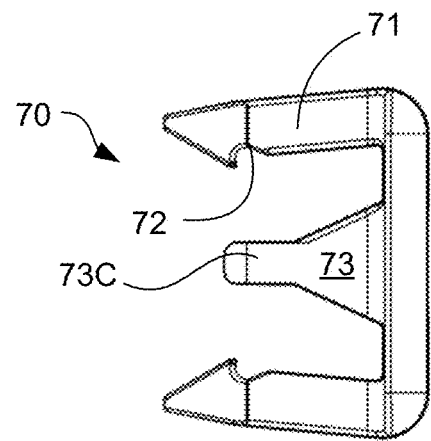
Figure 27C:
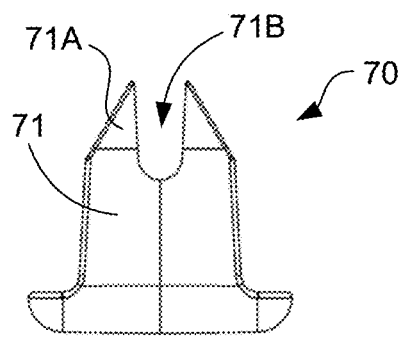
Figure 27D:
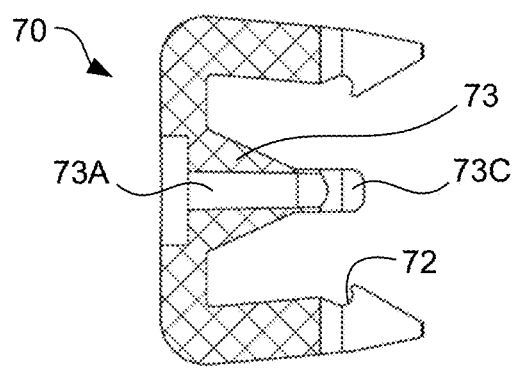
Figure 27E:
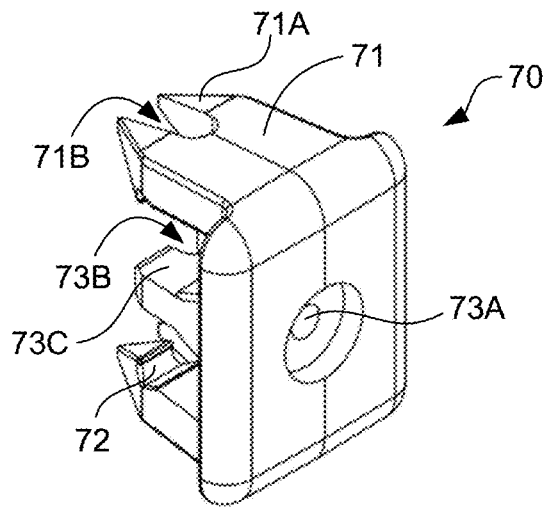
Figure 27F:
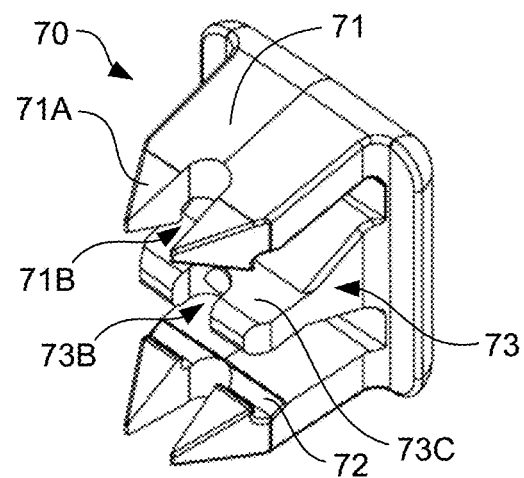

More specifically, FIG. 27A depicts a plan back view of the security clip 70, FIG. 27B is a plan side view of the security clip, and FIG. 25C is a top plan view (or bottom view) of the security clip. FIG. 25D is a cross-sectional view of the security clip taken along section D-D of FIG. 27A. FIGS. 27E and 27F provide different perspective views of the security clip. Thus, the security clip 70 in this example can include a pair of flexible arms 71, each arm with a security clip engagement groove 72 facing inward near a distal end thereof. The security clip can also include a male locking member 73. In some examples, a security clip channel 73A can be present as well. This particular security clip, by way of example, includes additional features compared to the security clip shown in FIGS. 25A-26. For example, the security clip shown in FIGS. 27A-27F also includes a pair of inwardly angled protrusions 71A positioned at a distal end of each flexible arm extending beyond the security clip engagement grooves. In still further detail, the male locking member can have a more complex shape than the generally triangular shape shown in FIGS. 25A-26. For example, as shown in FIGS. 27B and 27D-F, a distal tip locking portion 73C is shown that has a more horizontally linear (less angled) shape, which can have the advantage of locking with a male connector locking channel in a manner that does not generate as much separation or spring-like force as the more angular male locking member shape previously described in FIGS. 25A-26. In still further detail in this example, the pair of flexible arms also each includes a vertical channel 71B therein, which in this example is an open channel. The male locking member can also include a vertical channel 73B therein. The three respective vertical channels (one vertical channel in each flexible arm and one vertical channel in the male locking member) can be aligned to receive a security pin (not shown, but shown in FIGS. 28 and 31).

Figure 28:
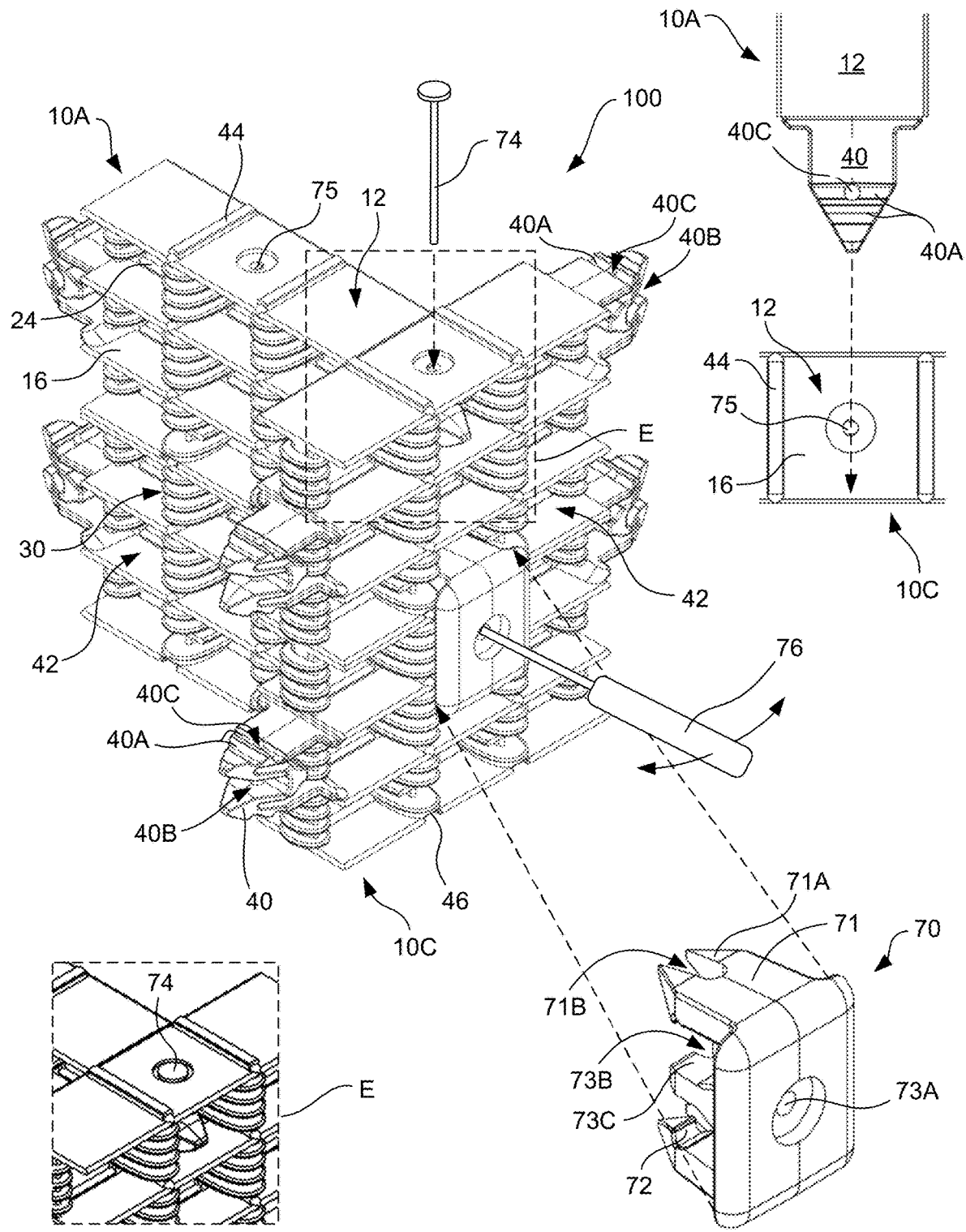
FIG. 28 depicts example operational assembly configurations for an example security clip and an example security pin associated with an evaporation panel securing system or assembly in accordance with the present disclosure.

Turning now to FIGS. 28-31, these FIGS. can be viewed together as there are several common features that are shown and described with various views. Thus, reference numerals for each of these FIGS. may or may not be present in each FIG., but will be available somewhere in this collection of FIGS. With this in mind, FIG. 28 shows a perspective view of an example evaporation panel assembly 100 configuration, which includes two relatively small evaporation panels 10A, 10C (each with seven evaporation shelves 16, four support columns 30, four male connectors 40, and eighteen female-receiving openings 42), a security clip 70, and a security pin 74. The security clip and the security pin can be referred to generally as "security fasteners." Also shown in the top right area of FIG. 28 is a top plan view of a male connector from evaporation panel 10A and a top 12 surface of evaporation panel 100. For clarity, this top plan view can be viewed simultaneously with the perspective view structure shown also in FIG. 28.

With these specific evaporation panels 10A and 100 shown in FIG. 28, a pin-receiving opening 75 is shown, which in this example provides not only a channel to receive a shaft of the pin, but also includes a shallow enlarged recess or opening at the top of the evaporation panel to provide a countersinking configuration for a head of the security pin to be received. A small detail shown at E shows the security pin 74 in place. Thus, when a male connector of evaporation panel 10A is inserted into a female-receiving opening of evaporation panel 100, the male connector can become releasably joined in place when an upward facing male connector engagement groove 40A becomes engaged with a downwardly extending ridge (not shown) and a downward facing male connector engagement groove (not shown) becomes engaged with an upwardly extending ridge 24. Then, when the pin is inserted through the pin-receiving opening of evaporation panel 10A, and a security pin engagement channel 40C found in the male connector 40 of evaporation panel 100, the engagement can become locked until the security pin is subsequently removed.

In further detail regarding the male connector engagement grooves 40A, in some examples, there can be a single male connector engagement groove on the top (upward facing) and another single male connector engagement groove on the bottom (downward facing) of the male connector 40 (as shown in detail, for example, in FIG. 7). However, in this specific example, there are multiple (e.g., two) male connector engagement grooves on the top of the male connector and multiple (e.g., 2) male connector engagement grooves bottom of the male connector. Even though in this particular example there is only one downwardly extending ridge (not shown) and one upwardly extending ridge 24 (found on a plurality of individual evaporation shelves) that is used to engage with the male connector engagement grooves, having two parallel male connector engagement grooves on both a top and a bottom of the male connector can provide a benefit during assembly. For example, in some instances, when orthogonally joining a male connector of a first evaporation panel (such as shown at 10A) with a second evaporation panel (such as shown at 100), a heavy object or tool (not shown), such as mallet, can be used to seat the male connector engagement grooves into the respective upwardly and downwardly extending ridges. With only one male connector engagement groove on the top and bottom of the male connector, the male connector of the first evaporation panel can be placed in the female-receiving opening of the second evaporation panel, and then one and/or the other of the two evaporation panels can be struck with the heavy tool to seat the grooves with the respective ridges. If the two panels are not properly aligned when struck, there can be some minor difficulty locking the two evaporation panels together. Again, this difficulty can be minor and can be avoided with some skill. However, to speed up assembly, the presence of two (or more) male connector engagement grooves on one or both of the top and/or the bottom of the male connector can be included. In these example, when assembling two evaporation panels together, the outermost grooves (most distal to the bulk of the evaporation panel on which it is integrated) on the male connector can be used to temporarily engage with the upwardly and/or downwardly extending ridges. This will help to provide that the two evaporation panels are properly aligned orthogonally (even though not completely joined together). Then, when striking one or both evaporation panels with the heavy tool or mallet, the innermost grooves (both top and bottom) on the male connector can then fully engage with the respective upwardly and downwardly extending ridges in place.

Figure 31:
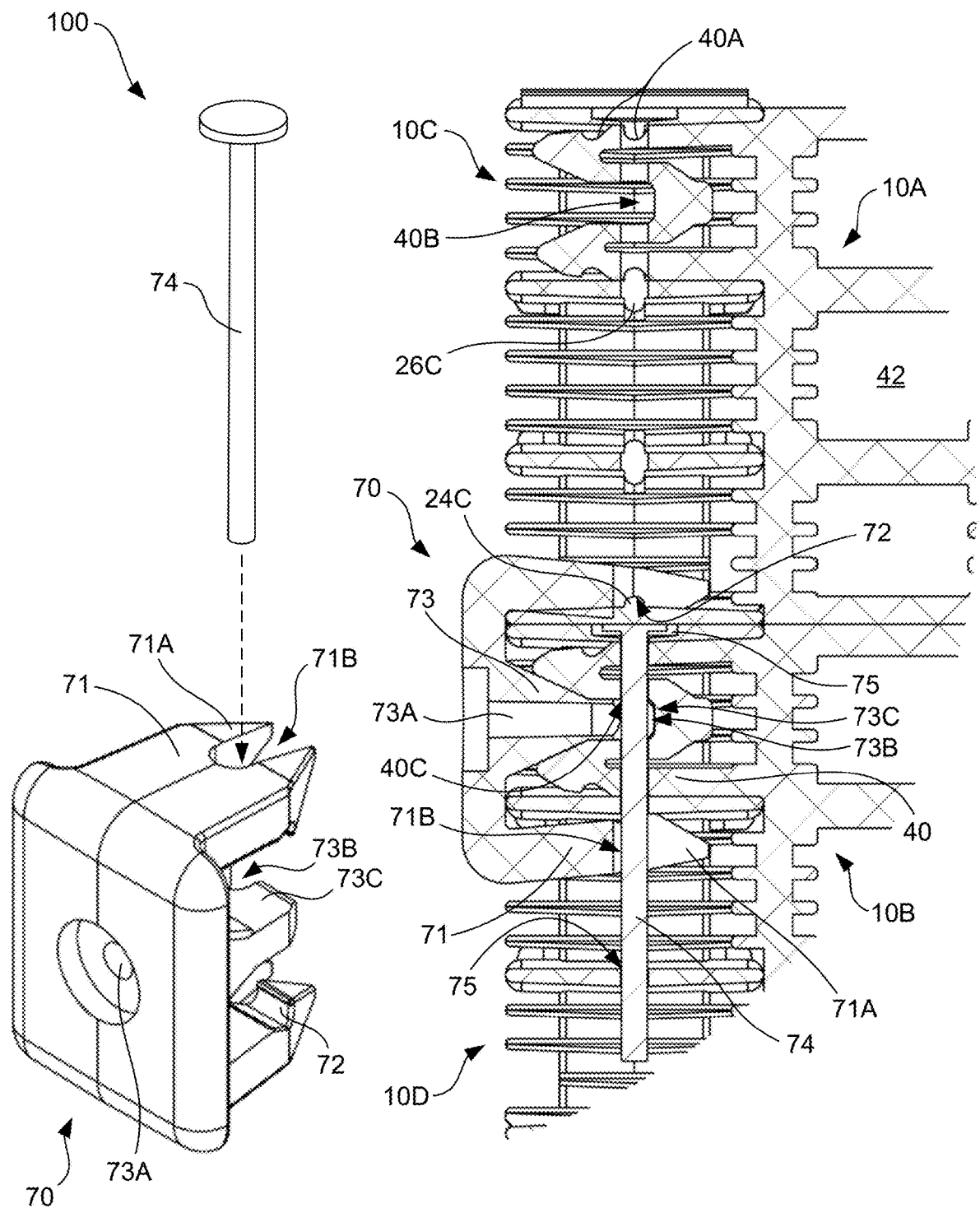
FIG. 31 depicts a cross-sectional view of four example evaporation panels of an example evaporation panel securing system joined together as an example evaporation panel assembly, and which also depicts an example operational assembly configuration for an example security clip and an example security pin in accordance with the present disclosure.

Once the two evaporation panels 10A and 10C are releasably joined or secured together, a security clip 70 and/or a security pin 74 can be used to further lock the two evaporation panels together, at least until the security clip and/or the security pin are first removed. Thus, FIG. 28 shows, for example, two evaporation panels that can be fully joined and releasably locked together, and also, subsequently locked together by attachment with one or both of the security fasteners, e.g., the security clip 70 and/or the security pin 74. The security clip, in particular, is shown inserted into (and around using the flexible arms 71 and engagement grooves 72) a female-receiving opening that it shares with a male connector (male connectors generally shown at 40 but the specific male connector joined with the security clip is obscured by the security clip). This particular security clip can interact with the evaporation panels in the same manner as that described with respect that shown in FIG. 26. However, this particular security clip has a few additional notable features. First, when the security clip is in place, there is a set of vertical channels (two shown generally at 71B and one shown generally at 73B) that align with the security pin when both the security clip and the security pin are engaged with the evaporation panel assembly. Thus, the security pin can be placed in the pin-receiving opening 75 at the top 12 of the evaporation panel. The security pin can then pass through a security pin engagement channel 40C of the male connector, and then through other openings in various evaporation panels that correspond with the length of the security pin, e.g., at least two evaporation shelves—one immediately above the male connector and one immediately beneath the male connector. If the security clip were positioned near enough to the top of the evaporation panel, then the security pin would also pass through the vertical channels of the security clip (as shown in FIG. 31 hereinafter). Thus, the security clip and the security pin can provide multiple levels of redundancy with respect to preventing adjacent and orthogonally joined evaporation panels from coming apart. Furthermore, a single security clip can also be positioned to secure an additional vertically stacked panel, even at the same time that it locks together two orthogonally positioned and joined evaporation panels (not shown in this FIG., but shown in FIGS. 26, 31, and 32D) to prevent multiple levels of evaporation panel assemblies from shifting. Likewise, the security clip can also join two vertically stacked panels without interface with an orthogonally oriented panel. Thus, this single security clip can have three configurations of use, namely i) to lock two orthogonally oriented and joined evaporation panels together; ii) to releasably secure (and in some cases lock) two vertically stacked evaporation panels together; and iii) to simultaneously lock two orthogonally oriented and joined evaporation panels together while at the same time releasably secure (and or some cases lock) two vertically stacked evaporation panels together. Thus, with the third configuration, three panels can be locked and/or secured together with a single security clip. See e.g., FIGS. 26, 31, and 32D.

In further detail, though the security clip 70 can provide a locking mechanism to prevent removal of a first evaporation panel 10A from a second orthogonally oriented second evaporation panel 100, it is notable that the security clip merely provides locking between the two evaporation panels, and not between itself and the respective evaporation panels (unless a screw is inserted through horizontal channel 73A and into a corresponding male connector 40). The security clip can thus be affirmatively removed, for example, using a leveraging tool 76, such as a screwdriver, to unlock the respective panels. More specifically, a distal end of the flexible arms 71 includes a pair of inwardly angled protrusions 71A. Thus, when a handle end of the leveraging tool is moved horizontally (as shown by curved arrows) about a pivot point (which in this example would be beyond the distal end of the flexible arms), the security clip can also rotate horizontally, allowing the security clip engagement grooves 72 to respectively release from the upwardly extending ridge 24 and downwardly extending ridge (not shown in this FIG.) which are positioned about the female-receiving opening (shown by example at 42, but obscured by the in-position security clip). The inwardly angled protrusions can be configured so that they allow for horizontal rotation of the security clip without becoming bound on the support columns 30 that are positioned immediately adjacent thereto. Notably, the inwardly angled protrusions are not present on the flexible arms shown in FIG. 25C, but those particular flexible arms are indeed tapered slightly inward which can provide some room to rotate and remove this clip as well using a leveraging tool.

FIG. 28 also depicts coupling ridges 44 on top surfaces and coupling grooves 46 on bottom surfaces of the two respective evaporation panels 10A and 10C. These coupling ridges and coupling grooves are configured slightly differently than the coupling grooves and ridges shown in the previous FIGS. This modification is shown in greater detail in the evaporation panel assembly 100 shown in FIG. 29, which depicts two evaporation panels 10A and 10B that are stacked vertically. Essentially, a bottom 14 surface of evaporation panel 10A is positioned on a top 12 surface of evaporation panel 10B to provide for the vertically stacking the evaporation panels in a manner that is properly aligned. For reference, support columns 30 are shown on both evaporation panels. Thus, when stacked, coupling ridge 44 of evaporation panel 10B is placed into coupling groove 46 of evaporation panel 10A to ameliorate or even prevent any substantial lateral movement. In this example, the respective shapes of the coupling ridge and coupling groove are not completely rounded, as previously shown in other example FIGS.; but rather, both the coupling ridge and the coupling groove include corresponding rounded convex and concave surfaces as well as flattened vertical portions on each side thereof. This can provide further protection against lateral shifting (such as during a seismic event or other accidental force that an evaporation panel assembly may encounter, e.g., operator grabbing an evaporation panel of an assembly to prevent falling, equipment accidents, etc.). For example, if a side-to-side lateral force (right to left or left to right in this FIG.) is applied to evaporation panel 10A relative to evaporation panel 10B, then the concave downward facing surface of the coupling groove that is stacked relative to the convex upward facing surface of the coupling ridge would force a slight lifting of evaporation panel 10B, which would be resisted by the weight of the evaporation panel assembly panels positioned thereabove (and wastewater loaded thereon). Furthermore, if the weight were not enough to prevent lateral shifting, then the flattened vertical portion (on one side or the other) of the coupling groove would become abutted against a corresponding adjacent flattened vertical portion of the coupling ridge, thus providing a second mechanism to potentially prevent further lateral shifting. Once this lateral force (or even a rolling event that may occur during seismic activity) is no longer present that may have elicited the start of the lateral shift, the relative convex and concave surfaces may then promote the respective evaporation panels to shift back to a more centered, if not centered, position. This, in combination with appropriately spaced security clips (not shown) which can be engaged to secure immediately adjacent and vertically stacked evaporation panels, can provide multiple mechanisms to prevent unwanted shifting of evaporation panels of an evaporation panel assembly. As a note, this particular detail also shows a recessed pin-receiving opening 75, which can receive a security pin (not shown) for connecting to a male connector (not shown) that may be included in the female-receiving opening 42 therebeneath.

FIGS. 30A and 30B are two different views of an example evaporation panel 10. FIG. 30A depicts a plan view of an upper right quadrant of the evaporation panel, and FIG. 30B depicts an upper left perspective view of an upper left quadrant of the evaporation panel. Note that the male connector 40 shown in the upper right quadrant is offset vertically from the relative position of the male connector shown in the upper left quadrant. As previously mentioned, this is so that two evaporation panels can be joined in alignment (end-to-end) with an orthogonally oriented evaporation panel positioned therebetween, such as that shown previously in FIG. 10. Furthermore, this FIG. detail is provided also to shown more detail with respect to this particular male connector example configuration. Specifically, the male connector, as shown, includes a male connector locking channel 40B, which includes an inverted partial-rectangular portion (essentially three sides of a rectangle or square) that inversely corresponds with the shape of the distal tip locking portion of the security clip (not shown in this FIG., but shown at 73C in FIGS. 27B, 27D, 27F). This partial-rectangular shape can provide some advantages because it does not generate separation forces between the male connector locking channel (of the male connector) and the male locking member (of the security clip) that would tend to push apart the security clip from the male connector. Also, in this configuration, when the distal tip locking portion is engaged therein, compression of the male connector is mechanically blocked, which otherwise would normally be used to remove the male connector from an associated female-receiving opening.

Additionally, this particular male connector 40 includes both upwardly facing and downwardly facing male connector engagement grooves 40A. As previously described, the two outermost (relative to the evaporation panel body) male connector engagement grooves (upward facing and downward facing) can be used to temporarily seat with the downwardly extending ridge and the upwardly extending ridge, respectively, of an orthogonally oriented evaporation panel. Note that the downwardly extending ridge and the upwardly extending ridge are not specifically shown, as the orthogonally oriented evaporation panel is not shown in this FIG. However, analogous structures are indeed shown on the evaporation panel shown, e.g., downwardly extending ridge is shown at 26 and upwardly extending ridge is shown at 24. Once the evaporation panel is properly aligned and the ridges of the orthogonally oriented panel are temporarily seated with the outermost engagement grooves (as may be confirmed by a clicking sound or by gently pulling on the evaporation panel to ensure temporary engagement and orthogonal alignment), the panels can be forced together further to cause the innermost male connector engagement grooves (upward facing and downward facing) to more affirmatively engage with the downwardly extending ridge and the upwardly extending ridge, respectively. As shown, the innermost engagement grooves are configured slightly differently to provide additional grabbing engagement compared to the outermost engagement grooves used for temporary seating and alignment. The subsequent force can be applied by pushing the two parts together more forcefully, or more typically (sometimes for safety reasons), a heavy object or tool (not shown) can be used to strike one or both of the evaporation panels to the innermost male connector engagement grooves to seat with the upwardly and downwardly extending ridges.

FIG. 31 depicts further detail regarding the security clip 70 previously shown in FIGS. 27A-28 as well as the security pin 74 previously shown in FIG. 28. This FIG. provides details regarding how the security clip can mechanically interact with an evaporation panel system or assembly 100 to lock and/or secure three individual evaporation panels 10B-D together at a location where the three (and typically a fourth, shown at 10A) individual evaporation panels are joined together. Additionally, further detail is provided which shows how the security pin can also be used to laterally join two adjacent and orthogonally positioned evaporation panels 10B and 10D together. Notably, the security clip can also be configured to be usable at other locations where only two evaporation panels are orthogonally joined or vertically stacked. For example, a male connector 40 that is not positioned adjacent to the top 12 of the evaporation panel can be locked in place with a security clip at corresponding female-receiving opening 42, and thus not interact at all with a vertically stacked evaporation panel, e.g., see security clip 70 of FIG. 28. Alternatively, two vertically stacked evaporation panels can be stabilized or secured together using the security clip at a location other than where there may also be a male connector associated therewith, e.g., see security clip 70A of FIG. 26.

With continued reference to FIG. 31, there are four evaporation panels shown, including evaporation panels 10A-10D, and the security clip 70 in this example is directly engaged with three of the four panels, namely evaporation panels 10B-10D. The security clip includes a pair of flexible arms 71 with engagement grooves 72 that can engage two vertically stacked evaporation panels 10C and 10D at their respective upwardly extending ridge 24C and downwardly extending ridge (obscured by the security pin 74, but shown by example on a different evaporation panel at 26C), thereby vertically securing evaporation panel 100 to evaporation panel 10D (which are both orthogonally oriented with respect to evaporation panels 10A and 10B). However, in this particular example, a male locking member 73, including a generally partial-rectangular shaped (in cross-section) distal tip locking portion 73C is also used to engage with the male connector 40 of evaporation panel 10B, which is coupled itself with upwardly and downwardly extending ridges (obscured by security pin 74 in this FIG.) of evaporation panel 10D using its respective innermost male connector engagement grooves (shown at a different male connector at 40A for clarity). By inserting the distal tip locking portion of the security clip into a male connector locking channel 40B (labeled at a different locking channel for clarity) of evaporation panel 10B, the male connector can be prevented from compressing, thereby converting the male connector from a compressible and releasable locking structure to a non-compressible and un-lockable or locked structure that cannot be removed from its corresponding female-receiving opening, which in this case is found in evaporation panel 10D. The female-receiving opening shown specifically at 42 in this FIG. is not the female-receiving opening currently being used by the above-described male connector, but rather is shown by way of example to illustrate an unobscured female-receiving opening configuration. In further detail, security clip channel 73A can be included to reduce material, or to provide an opening to insert a security screw or other fastener (not shown) to further couple (by a second mechanism) the security clip to the adjacent male connector, or to provide an opening for leveraging the removal of the security clip using a leveraging tool as shown at 76 in FIG. 28. This extra fastener or screw is not needed typically, as the shape of the male locking member relative to the position of the security clip engagement grooves can provide adequate security to both vertically stabilize the stacked evaporation panels (10C and 10D), as well as laterally further secure the engagement between the male connector of evaporation panel 10B and the associated female-receiving opening found in evaporation panel 10D. For example, rather than using a screw, as described, the evaporation panel securing system or assembly can alternatively or additionally include a security pin 74, which can seat within a recessed or counter-sunk pin-receiving opening 75 and can be positioned through the male connector at security pin engagement channels 40C, as well as through the vertical channels 71B positioned within the flexible arms 71 as well as the vertical channel 73B positioned within the male locking member 73 of the security clip. The vertical channels, notably, are open channels so that the security pin does not need to be removed in order to engage or remove the security clip. Typically, the security pin would be inserted first, followed by the security clip, in this example.

Turning now to FIGS. 32A-F, various plan, perspective, and cross-sectional views of another example security clip 70 is shown, including additional detail regarding engagement of the security clip with a male connector engagement groove 40 and an alternative location for a security pin 74 in accordance with the present disclosure. In more specific detail, this particular set of examples provide certain engagement feature differences compared to that shown in the previously described embodiments of FIGS. 25A-31. Thus, rather than re-describe each and every analogous feature, a few differences will be highlighted herein. For example, other than these differences that will be described, certain relevant discussion of analogous structural features can be found in the following descriptions: FIG. 30A includes several analogous features found in FIG. 32A; FIGS. 25B and 27B include several analogous features found in FIG. 32B; FIGS. 25C and 27C include several analogous features found in FIG. 32C; FIGS. 25D, 27D, and 31 include several analogous features found in FIG. 32D; FIG. 27E includes several analogous features found in FIG. 32E; and FIG. 27F includes several analogous features found in FIG. 32F. Thus, as with any other FIG. herein, reference numerals shown may or may not be specifically described, but adequate description of any of the reference numerals shown can be found in the description of other FIGS. with reference numeral-labeled analogous structures.

More specifically, as shown in FIG. 32A, a male connector 40 of evaporation panel 10 can include both upwardly facing and downwardly facing male connector engagement grooves 40A. The function and advantages of this arrangement were described in detail previously. The male connector can also include a male connector locking channel 40B, which is similar in configuration to the recessed V-channel shown in FIG. 26; but in this specific example, also includes a pair of opposing flattened portions 40D. Thus, the generally V-shape of the channel is essentially modified to include the two opposing flattened portions interposed between a pair of diverging angled portions 40E (in the joining direction) near an outermost tip of the male connector, and smaller V-channel 40F (relative to the size of the V-channel shown in FIG. 26). FIG. 32B-F each depict a security clip 70 that can include a pair of flexible arms 71, each arm with a security clip engagement groove 72 facing inward near a distal end thereof. The security clip can also include a male locking member 73. The pair of flexible arms in this example does not include the vertical channel (for receiving the security pin 74), so rather than a pair inwardly angle protrusions, in this example, at each distal end of the pair of flexible arms is a single inwardly angled protrusion 71A extending beyond the security clip engagement grooves. In still further detail, the male locking member can have a more complex shape than the generally triangular shape shown in FIGS. 25A-26, or the generally triangular and rectangular distal tip shape shown in FIGS. 27B, 27D-28 and 31. For example, as shown in FIGS. 32B and 32D-F, a distal tip locking portion 73C can be configured to essentially inversely match the shape or configuration of the male connector locking channel shown in FIG. 32A. Including short flattened sections on the security clip that match the opposing flattened portions of the male connector can provide the advantage of locking with a male connector locking channel in a manner that does not generate as much separation or spring-like force as the completely angular V-male locking member shape.

In any of the examples herein where a male locking member 73 of a security clip 70 is joined with a male locking member 73 of a male connector 40 (to engage with the male connector to provide a locking mechanism), the male locking member can thus be shaped to "key" with a shape of the male connector engagement groove. At an end of the male locking member, some examples include a differently shaped distal tip locking portion, such as shown in FIG. 27B (square or rectangular in cross-section) or as shown in FIG. 32B (modified V-shaped with parallel flattened portions interposed between two pairs of converging angled portions). These can more complex shapes can provide additional joining security, and in some cases, can reduce separation forces between male connector and the security clip.

With more specific reference to FIG. 32D, this cross-sectional view of four evaporation panels 10A-D shows two different security fasteners in place, namely a security pin 74 and a security clip 70. Unlike FIG. 31, in this example, the security pin and the security clip are at two different locations. The security pin, for example, inserted through a pin receiving opening 75 of a top 12 of an evaporation panel 100, through security pin engagement channels 40C of a male connector 40, and then through two additional pin receiving openings of lower evaporation shelves stacked beneath the top evaporation shelf. In one example, the security pin can be used to secure an uppermost level of assembled evaporation panels, e.g., the top level of an evaporation panel assembly or tower. This can be advantageous because at the uppermost level, the security clips may not have an upwardly extending ridge 24 to engage with, as the upwardly extending ridge can often be provided by the lowermost shelf of the next evaporation panel level. At the top of the assembly, when completed, there thus may not be another evaporation panel assembly level to connect with, and thus, there may not be an upwardly extending ridge at that location. The security pin can provide alternative fastening at the top of the evaporation panel assembly. That being stated, the top evaporation shelf could be adapted to also include an upwardly extending ridge so that the security clips could be used at the top. With this arrangement, an additional laterally oriented coupling groove could be included on a bottom of the panels to accommodate the extra upwardly extending ridge.

The security clip 70 in FIG. 32D, on the other hand, operates in much the same manner as described with respect to FIG. 31, and the reference numerals and description associated therewith are incorporate herein by reference. In further detail, however, notably the security clip does not include vertical channels for receiving the security pin, though they could be included. Also, as previously described, the shape of the male locking member 73 and the male connecting locking channel are also modified as previously described.

Figure 33:
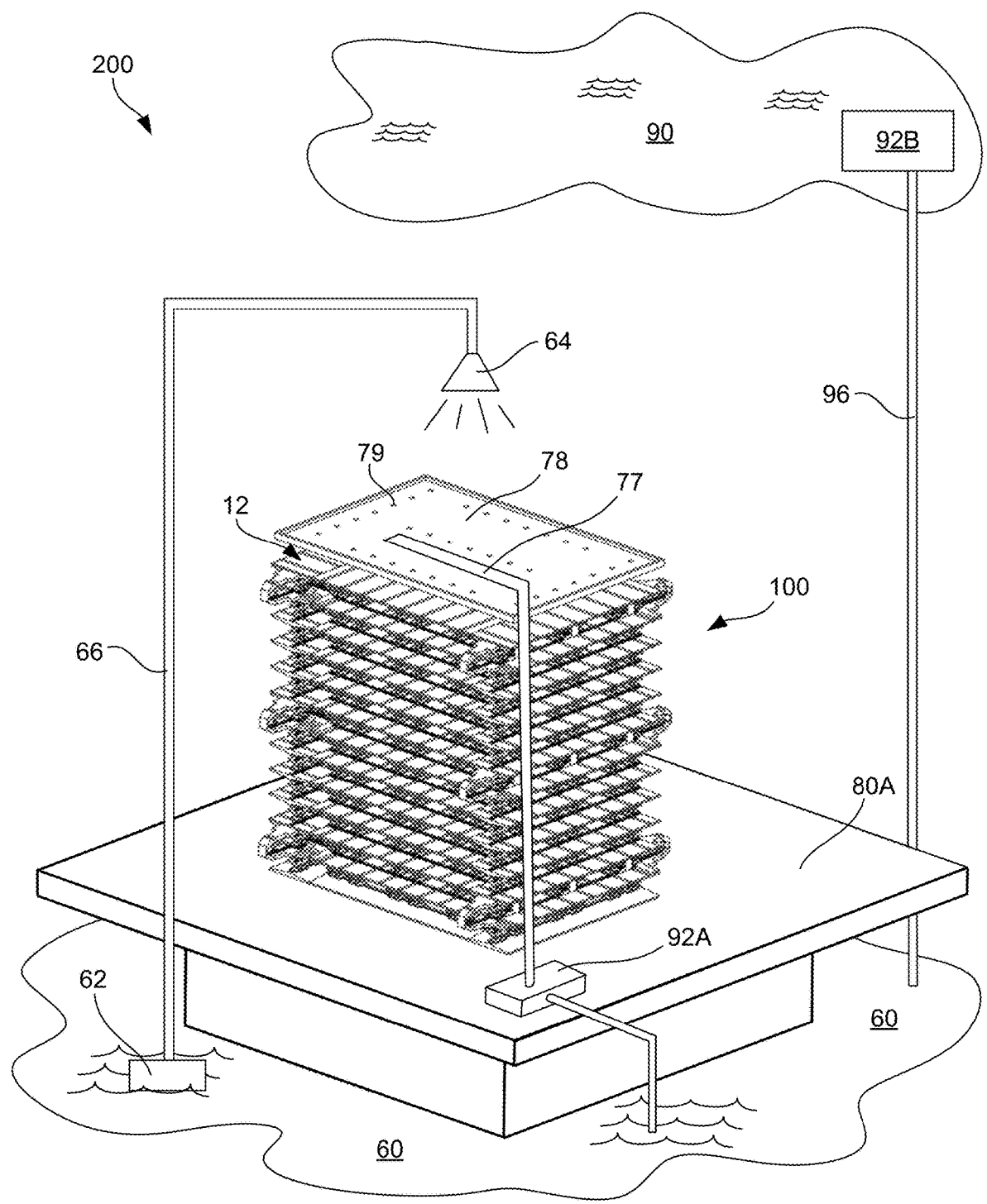
FIG. 33 is a perspective view illustrating an example wastewater delivery system including an example evaporator panel sub-assembly (cube-shaped) positioned over a body of wastewater on a platform with various example wastewater delivery systems in accordance with the present disclosure.

In another example, an example wastewater evaporative separation system 200 is shown in FIG. 33, and can include by way of example an evaporation panel sub-assembly or assembly 100 and a wastewater delivery system, which in this example includes any of a number of pumps, plumbing, and the like. In this example, there are multiple alternative delivery systems that are shown which can be used in any combination, but are shown together for explanatory purposes. For example, the wastewater evaporative separation system generally can include a wastewater delivery system receiving (e.g., pumping and/or gravity), directing (e.g., pipes, tubes, fluid channels, etc.), and delivering (sprayers, sprinkler heads, distribution pans, etc.) wastewater generally to a top portion of the evaporation panel assembly, e.g., a fluid pump 62 can deliver wastewater from a body of wastewater 60 via a delivery pipe or tube 66 to a sprayer nozzle(s) 64 above or beside the evaporation panel assembly. With larger evaporation panel assemblies, a series or sprayer nozzles or large scale fluid delivery apparatuses can be used that are suitable for delivering wastewater which can, in some cases, includes solids or other contaminants that are also deliverable within the wastewater to the top of the evaporation assembly. In another example, the delivery system can include fluid pump 92A and one or more delivery pipes or tubes 77 that can be used also to receive, direct, and ultimately deliver wastewater from the body of wastewater to a distribution pan 78 disposed above the evaporation panel assembly. The distribution pan can include a series of perforations or voids 79 through which the wastewater and any contaminants or other materials contained therein can be delivered without clogging the perforations, and/or so that the wastewater can be evenly distributed across a top of the evaporation panel assembly.

In a more specific example, the distribution pan 78 can be reconfigured to facilitate additional airflow by more closely matching the shape of the distribution pan (thereabove) to a shape of individual evaporation panels, individual evaporation panel sub-assemblies, or other smaller unit of top loading surface on the evaporation panel assembly. Thus, the smaller series of distribution pans can be configured to likewise leave openings between separate distribution pans, or even fluidly interconnected distribution pans, or larger groups of distribution pans thereof (further interconnector or separate). These distribution pans or groups of distribution pans can thus be configured like elongated troughs (e.g., having a rain gutter-like configuration) with openings along the bottom that can be aligned with a top surface of individual evaporation panels, which can be repeated across the top surface of the evaporation panel assembly (or a portion thereof) to more precisely load the assembly with the wastewater. Such a configuration would allow for more vertical airflow and water vapor venting to occur, as opposed to a large airflow blocking distribution pan that may leave little to no effective vertical airflow venting space, thus relying more so on venting elsewhere. In one example, the distribution pan in this configuration can be referred to more specifically as a series of distribution troughs, or even a series in interconnected distribution troughs. These troughs can be configured to attach directly to a top surface of an evaporation panel, in one example, potentially using some of the structural features previously described herein that may already be present at or near the top surface of evaporation panels described herein.

Though a distribution pan 78 (or even a system of distribution troughs) may be used to more precisely apply the wastewater to a top portion of the evaporation panel assembly, a sprayer nozzle or series of sprayer nozzles (without the distribution pan) can also provide an effective way to load the evaporation panel assembly, even if some of the wastewater is not as efficiently loaded thereon. This can be particularly the case when the evaporation panel assembly is positioned near or above the body of wastewater that is being treated. For example, when wastewater is applied at or near the top of the evaporation panel assembly and a portion of the wastewater does not become loaded during application, such as because one or more sprayer nozzles is used which may not be a particularly precise delivery fluid delivery system, the wastewater that is not loaded on the evaporation panel assembly during the fluid application process (e.g., that falls between the inter-panel spaces, falls through the vertical airshafts, spills from the evaporation panels due to overfilling, etc.) can be merely returned back to the body of wastewater by gravity. Then, at a later point in time, the wastewater can be re-pumped back to the top at a later delivery or loading event, or can be pumped back to the top at a later point in time during the continuous loading process, for example. Return of the wastewater that is not loaded on the evaporation panel assembly back to the body of wastewater can either be as a result of the evaporation panel assembly being positioned over the body of wastewater, or the evaporation panel assembly being located nearby the body of wastewater so that the wastewater that is to be returned to the body or wastewater can be returned via a water return channel, for example. Other methods of wastewater return can also be carried out, including through the use of pumps, etc.

In one example, the evaporation panel assembly 100 of the wastewater remediation or evaporative separation system 200 can be associated with a platform 80A configured to support the evaporation panel assembly (of any shape or configuration or size of appropriate size relative to the size of the platform). The platform can be, for example, a floating platform that floats on the surface of the body of wastewater or is otherwise suspended or partially suspended above the body of wastewater. The floating platform, for example, if used can be free floating on a wastewater pond, for example, or can be anchored to ground using a dock cable system (attached to the pond floor or to dry land). The platform can alternatively be in a fixed position (not floating), and the wastewater can be filled up or otherwise present around the platform, or partially around the platform. The platform can also be perforated or can include open spaces for allowing wastewater falling from or through evaporation panel assembly to pass through and in some examples, ultimately return to the wastewater body of water. Suitable configurations can include a grid which defines open rectangular or square channels, or other structure that defines open channels of any other shape in any suitable pattern to allow wastewater to pass efficiently therethrough. In still other examples, the wastewater can be loaded from a vessel (not shown), such as a tank, where the wastewater is either pumped up to load the wastewater at or near the top of the evaporation panel assembly, or where the wastewater is gravity fed from the vessel from a relative high location to a lower elevation (at a top portion of the evaporation panel assembly). Regardless of whether gravity fed, pumped, or both, the vessel can be either in close proximity or at a further distance relative to the evaporation panel assembly. In other words, the wastewater can be loaded onto an evaporation panel assembly by any method that is practical, e.g., with or without valves, pumping upward from a body of wastewater of lower elevation, gravity fed from a higher elevation body of wastewater, from a wastewater pond or other body of water, from an open or closed vessel, to sprayer(s), to sprinkler head(s), to distribution pan(s), etc.

The wastewater evaporative separation system 200, which can include the evaporation panel assembly and a wastewater delivery system, can be controlled by a variety of automated and/or manual systems. In one example, a computerized control system can be used to control any of the devices used in conjunction with the wastewater evaporative separation system. For example, the computerized control can control valves, rotational nozzles, fixed nozzles, rotational platforms, timers, sensors, etc. For example, sensing or receiving weather conditions, sensing relative humidity within an interior opening of the evaporation panel, using timers, providing automated wastewater loading based on timing or sensor-driven analytics, or the like, can be used to automatically determine when the system should run, should be loaded with wastewater, and can actually control the actual running profile and/or wastewater loading fluidics, etc. In one example, an environmental sensor or a weather forecast can be used to provide shutdown information to avoid freezing, for example, or to rotate a platform based on wind conditions, or shut down when it is too windy to effectively maintain wastewater on the evaporation panel surfaces, etc.

A computerized console can also be used to measure and store data related to water volume pumped per unit of time, e.g., per minute, per hour, per day, per month, etc., and/or can also measure water depth of a pond or ponds serviced by an evaporation panel assembly. The computerized console can be configured to be locked so that it is inaccessible without an access code, key, or both. Even with computer control and/or automated systems, the system can also be configured to include a manual valve management override system in case there is a computer console power loss or malfunction. There can also be an on-site camera system in place (digital photos or video, for example) for management and monitoring of pumps, valves, nozzles, platforms, timers, sensors, etc. The system can control and/or communicate remotely with a user at a computer interface, or automatically with a computer, using the internet and appropriate wireless communication protocols and/or Ethernet line communication. Data collected can be stored and/or analyzed continuously or at various intervals, including data such as ambient condition data points (general weather, temperature, humidity, precipitation, wind, water in, water out, humidity within the evaporation panel assembly compared to ambient humidity, etc.). Settings can be changed remotely using the computer system, for example.

Even though the evaporation panel assembly 100 per se does not require any power to operate (evaporates passively), the systems that are used to load the wastewater (pumps, computerized control and monitoring, etc.) can use power. Power sources that can be used include city power where available; generator power by natural gas, diesel, propane, etc.; solar power (which can be placed on or adjacent to the evaporation panel assembly); etc. Secondary backup power with automatic transfer or power backup battery bank for graceful shutdown purposes can also be implemented, or to maintain power until the regular power source is restored.

Wastewater evaporative separation systems 200 can also be set up in accordance with other examples of the present disclosure. For example, a fluid pump 92B (and console or control module) can be adapted to draw from a source body of wastewater 90 (not equipped with an evaporation panel assembly) via a delivery pipe or tubing 96 to a body of wastewater 60 proximate to an evaporation panel assembly 100, such as for example a large open vessel, a lined wastewater pond, or an already existing wastewater pond. The evaporation panel assembly can be positioned over (or proximate to) the body of wastewater that is remote from the source body of wastewater to be treated. Criteria for wastewater delivery from the source body of water to the evaporation panel assembly (or the second body associated therewith) can be based on various predetermined criteria. Examples of such criteria can include i) keeping the second body of water full (or at least at a certain predetermined minimum depth) for efficient use with the evaporation panel assemblies described herein; and/or ii) maintaining and/or monitoring the depth or other conditions of the source body of water so that the system can be shut down if conditions are not desirable. If conditions are not desirable in either the source body of water and/or the second body of water, alerts with manual shut down procedures or automatic shutdown procedures can be implemented. In further detail, similar systems can be in place so that multiple source bodies of water can feed wastewater to a single evaporation panel assembly and/or second body of water, or a single source body of water can feed wastewater to multiple evaporation panel assemblies and/or second bodies of water.

In conjunction with the example wastewater evaporative separation system components 200 shown in FIG. 33, various alternative configurations of evaporation panel assemblies 100, such as those shown in FIGS. 8-12E, 17, 18, 20, and 34-36, or others can be part of adjacently (laterally) locked and vertically stacked evaporation for use in these or other similar wastewater evaporative separation systems. It is notable, however, that evaporation panels can be assembled together in some of these types of configurations, but also in other configurations limited only by the creativity of the user, the dimensions of the evaporation panels, and the usable footprint. Thus, using these evaporation panels as basic building blocks, very complex structures can be formed, including large structures the size of rooms or buildings, with weight bearing structures such as stairways, platforms, etc., and with open spaces such as doorways, rooms, etc., and/or with safety features such as upper platform walls and bridges, or any other structural feature imaginable that can be built using essentially rectangular building blocks, for example. To illustrate, in one example, at least 10 discrete evaporation panels can be locked together. In another example, at least 50 (or at least 100) discrete evaporation panels can be assembled with a first portion being locked together and a second portion separately locked together and stacked on top of the first portion. In another example, at least 500 (or at least 1,000, at least 5,000, at least 10,000, at least 50,000, etc.) discrete evaporation panels can be assembled with a first portion locked together, a second portion separately locked together stacked on top of the first portion, and a third portion locked together and stacked on top of the second portion, and so forth. Stacking can occur incrementally by building a level on top of an existing level. Stacking can also allow for building very high evaporation panel assembly towers or other structures, limited only by the safety and weight bearing capacity of the evaporation panels that are locked together, e.g., 40 feet, 100 feet, etc. On the other hand, laterally locking evaporation panels together is not particularly limited at all, being limited only by the available footprint. A few example towers or evaporation panel assemblies, as well as two example closely positioned grouped evaporation panel assemblies, each prepared from many evaporation panels joined, and in some cases locked together, and stacked vertically can be seen in FIGS. 34-36.

Figure 34:
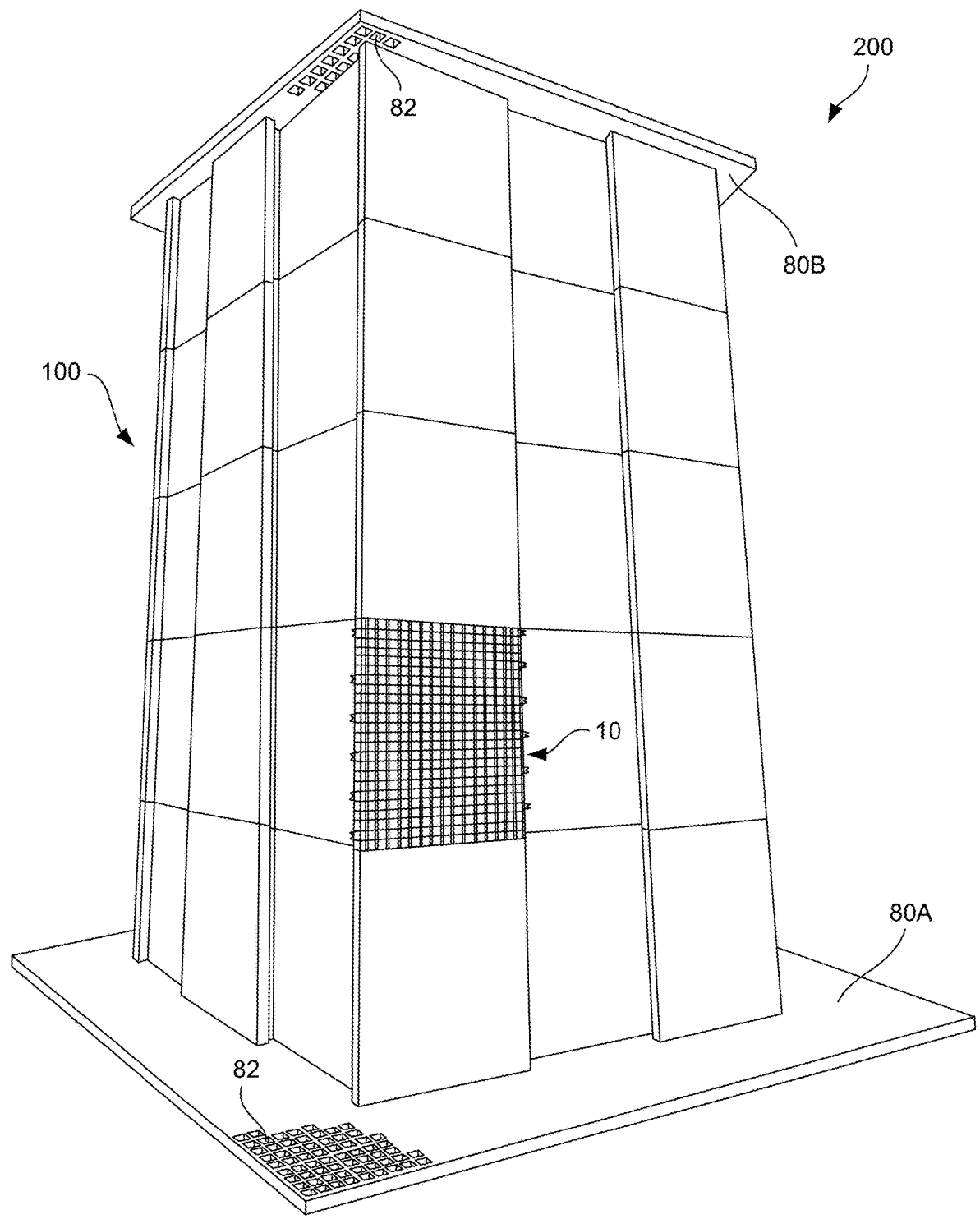
FIG. 34 is a perspective view illustrating an example wastewater evaporative separation system including an example evaporator panel assembly (stacked five levels vertically and configured laterally as that shown in FIG. 12C) positioned over and under example perforated platforms in accordance with the present disclosure.

Turning now to FIG. 34, another wastewater evaporative separation system 200 is shown. Though not shown specifically in this example, each of the features shown and discussed in FIG. 33, such as the wastewater delivery system, can also be relevant to FIG. 34, and vice versa. In further detail, this example shows an evaporation panel assembly 100 having a footprint similar to that shown in FIG. 12C, but which has been built up or stacked five (5) levels in height. Thus, for example, if the individual panels 10 (only one of which is shown in some detail) were prepared to be 2 feet by 2 feet in size (width by height), then the structure shown would be about 10 feet tall. The depth and width of the evaporation panel assembly in this example would each be less than 6 feet due to some overlap, as shown in greater detail viewing the top plan view of FIG. 12C. Furthermore, the evaporation panel assembly is also shown on a platform 80A, which is a lower platform similar to that shown in FIG. 33. In this particular example, however, there is an upper platform which can be used for a human operator, such as a builder, repair or cleaning technician, inspector, etc., to walk on the top surface. The upper platform may not be used, as the evaporation panel assembly is strong enough to support the weight of many operators, builders, inspectors, etc. But some instances, such when there may be relative vertical airshafts, the upper platform may be used for safety purposes, etc. Both platforms in this example are grating-like platforms, which include perforations 82 or voids defined by a grid structure (only a portion of the perforations on platforms are shown for simplicity, but the perforations could present across the entire top or bottom platforms, or at locations where wastewater can pass therethrough to either load the evaporation panel assembly, or fall or drop from the evaporation panel assembly to be returned to a body or wastewater. Thus, the platform can be positioned over a body of wastewater, such as a wastewater pond or other similar wastewater source, and when the wastewater falls through the platform perforations, it can be pumped back up and re-delivered to a top of the evaporation panel assembly for further processing, for example. Alternatively, wastewater can be redelivered to the body of wastewater using fluid return channels, e.g., pipes or open channels, or can be pumped back to the body of wastewater, for example.

Figure 35:
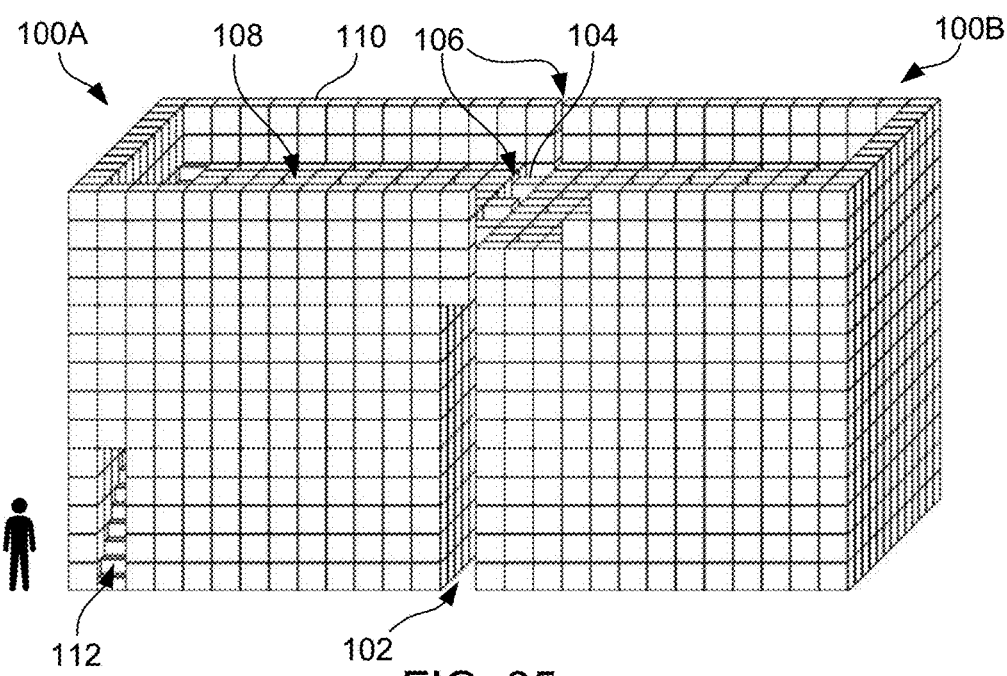
FIG. 35 is a perspective view illustrating two example evaporation panel assemblies spaced apart from one another by a small distance or gap, which can be used as part of an example wastewater evaporative separation system, and which provides example structures including a structural stairway, a passageway, upper platforms, and safety barriers or walls, and cantilevered bridging portions, all formed or defined in this example at least in part from assembled evaporation panels or evaporation panel sub-assemblies in accordance with the present disclosure.

Turning now to FIG. 35, a perspective view illustrating two adjacently positioned assembly towers including a first evaporation panel assembly 100A and a second evaporation panel assembly 100B are shown. Notably, the two evaporation panel assemblies can be spaced apart at the bottom leaving a passageway 102 wide enough for a human operator to enter for purposes of passage, inspection, repair, cleaning, building, etc. In this example, the passageway can be about the width of one evaporation panel sub-assembly, or other distance therebetween as may be practical. At an upper portion of the respective assembly towers, the evaporation panel assemblies can include a cantilevered bridging portion 104, which spans or mostly spans the width of the passageway. The cantilevered bringing portion can provide safe passage for a human operator to move from one tower to the next. In this specific example, a small distance (d) or gap 106, can be left or remain between the two evaporation panels or towers to protect against seismic shifting or other unforeseen movement that may occur at one evaporation panel assembly but not necessarily at the adjacent evaporation panel assembly. By isolating adjacent evaporation panel assemblies from one another by leaving a small distance (d) or gap, e.g., d=½ to 12 inches, d=1 to 6 inches, d=2 to 5 inches, d=3 to 5 inches, d=3 to 4 inches, or d=6 to 12 inches, etc., damage to one evaporation panel assembly can be isolated without carrying through to a much larger, and thus, more complex evaporation panel assembly. In some examples, the cantilevered bridging portion and/or the passageway may be removed, and the towers can be simply placed distance (d) from one another. However, such an arrangement would not permit a human operator to move freely therebetween.

In further detail, the first evaporation panel assembly 100A and/or the second evaporation panel assembly 100B can include a wall portion 110, also built from evaporation panel sub-assemblies assembled from individual evaporation panels. In this instance, the wall is shown as built at a height of two "cube sub-assemblies," which in one example can be about 4 feet high if individual evaporation panels are about 2 feet in length. However, the basic configuration can be similarly prepared using pi-shaped sub-assemblies or other comb-shaped sub-assemblies. The wall can provide human operator safety when walking on top of one or both evaporation panel assembly or tower. In this particular example, there can also be vertical airshafts 108 also designed into the evaporation panel assemblies to facilitate airflow and/or evaporative water vapor clearing from within the evaporation panel assembly. Thus, airflow and/or water vapor clearing from the evaporation panel assembly can occur either horizontally or vertically. To illustrate, with respect to horizontal airflow and water vapor clearing, open spaces (dedicated open spaces 48 shown in particular in FIGS. 17, 18, and 20; and unused female-receiving openings 42 providing open spaces shown in FIGS. 1-9, 18, 21A-24, etc.), enlarged evaporative airflow channels 58A,58B (shown in FIGS. 21A-24D), inter-panel spaces 39 (shown at least in FIGS. 11, 12B, 12C, and 12D), enlarged inter-panel spaces 28 (shown in FIGS. 12A, 12E, and 36) often aligned with enlarged evaporative airflow channels, and/or horizontal airshafts (not shown, but which can be formed by leaving a horizontal shaft which does not include (is devoid of) sub-assemblies along that horizontal shaft location) can allow for the inflow or outflow of air and/or water vapor horizontally. With respect to vertical airflow and water vapor clearing, the vertical airshafts, shown by example at 108 in this FIG. as well as in FIGS. 12E and 36, inter-panel spaces 39, and enlarged inter-panel spaces 28 for airflow and evaporation. For example, a chimney effect can occur at the vertical airshaft and vertical airflow can occur in between individual evaporation panels at the inter-panel spaces and/or enlarged inter-panel spaces.

In further detail, in one example, access to a top portion of the evaporation panel assembly can be provided by stairway 112, which can be assembled using evaporation panels or evaporation panel sub-structures integrated into the overall structure of the evaporation panel assembly or tower. In this example, the stairway is provided by evaporation panels that are about half the height of the other evaporation panels. This is an example of where it may be advantageous to use differently configured or sized evaporation panels. However, in other examples, full evaporation panel sub-assemblies could be used to form larger stairs, e.g., stairs 2 feet in height if the evaporation panel sub-assemblies are likewise two feet tall. In either case, in this and other examples, multiple evaporation panel sub-assemblies or evaporation panels individually can be used and configured to provide any of a number of structural features, such as a stairways, passageways, safety barriers or walls, vertical airshafts, cantilevered bridges, open rooms, benches, or the like, formed primarily or even completely from assembled evaporation panels. Furthermore, multiple assembly towers can be built in close proximity to one another and spaced apart at a small distance (d), as mentioned, as may be desired based on space or other constraints to protect against damage from tower to tower in the event of a tower failure of some type. These and other similar evaporation panel assemblies or towers used as part of a larger wastewater remediation or evaporative separation system, including with any of the other components shown and described in FIGS. 33 and 34, can be assembled or associated therewith, e.g., fluid pumps, sprayer nozzles or distribution pans, delivery pipes or tubing, grating or perforated platforms (upper and/or lower), etc. For reference, an approximately 6 foot tall human operator is shown in FIG. 35 for scale.

In further detail, FIG. 36 depicts a top plan view illustrating four (4) evaporation panel assemblies 100A-D. Adjacent assemblies or towers include passageways 102, cantilevered bridging portions 104 with gaps 106 therebetween. Only a portion of evaporation panel assembly towers 100 B-D are shown, but these evaporation assemblies can be the same size as evaporation assembly 100A, or can be of different sizes. With specific reference to tower 100A, the general sub-assembly configuration used to form this particular evaporation panel assembly is pi-shaped, as described generally in FIGS. 12A-C, and more specifically with respect to the assembly of pi-shaped sub-assemblies with vertical airshafts 108 and vertical support beam assemblies 68. In other words, the vertical airshafts can be formed in a straightforward manner by slightly modifying the pi-shaped assembly pattern shown and described with respect to FIGS. 12B and 12C to omit the addition of certain evaporation panels, which is described in greater detail with reference to FIG. 12E. Thus, the pi-shaped sub-assemblies in this example do not include the same number of evaporation panels in every sub-assembly, but rather, a varying number and configuration of various sub-assemblies can be used. In this specific example, some sub-assemblies can include six (6), seven (7), or eight (8) evaporation panels, depending on how the pi-shaped sub-assemblies are characterized.

With specific reference to evaporation panel assembly 100A, each level can include 896 individual evaporation panels, 138 evaporation panel sub-assemblies, and from 2 to 30 levels, e.g. 4 to 60 feet when each level is 2 feet tall, or even more levels in some instances. By way of example, if evaporation panel assembly 100A includes twelve (12) levels, for example, there may be 10,752 individual evaporation panels used. If there are four towers of equal size and dimensions, then the structure grouping shown in FIG. 36 would include 43,008 individual evaporation panels. At this size and dimension, with four closely positioned towers, the surface area of wastewater remediation or treatment can be immense with a footprint of less than about 3000 square feet. Considering examples where each panel can have many shelves, e.g., 8 to 36, 12 to 32, 16 to 24, etc., when vertically stacked, there may be close to 3000 square feet of 96 to 432 levels of shelves (of varying density or widths, depending on the specific assembly configuration). Furthermore, with a very large number of evaporation columns, e.g., from 4 to 24, from 8 to 20, etc. (horizontally offset or aligned) per evaporation panel, with each column including many individual evaporation fins, e.g., from 25 to 150 evaporation fins per column, the available surface area for wastewater evaporation to occur can be significantly increased. Notably, when using evaporation panels with the enlarged evaporative airflow channels, such as those shown in FIGS. 21A-24D, there may be less surface provided by the shelves and/or the evaporation fins per square foot, but this deficiency can be compensated by increasing the tower height by one or two levels without significant weight increase (because each panel weighs less due to the use of less material to form the individual evaporation panels).

In yet another example, a method of separating contaminants from wastewater can include loading wastewater on an upward facing upper surface of an evaporation shelf. An additional step can include flowing the wastewater along a flow path from the upper surface around a beveled side rim and onto a downward facing lower surface of the evaporation shelf, along the lower surface and onto evaporation fins of a vertical support column, and from the evaporation fins onto a second upper surface of a second evaporation shelf positioned beneath the evaporation shelf. The method can also include evaporating water from the wastewater while the wastewater is flowing down along the flow path. In one specific example, the upper surface can be flat or essentially flat. The upper surface can also include an upwardly extending ridge that traverses a length of the upper surface which can prevent wastewater from pooling toward a centerline of the upper surface. The lower surface can also be flat, but in one example, can be gradually sloped from horizontal at from greater than 0° to 5°. Thus, when the water rolls around the tapered edge on the bottom surface, the wastewater flow path does not require a full 180° turn from the upper surface to the lower surface, e.g., rolling from upper to lower surface at from 175° to less than 180°. In one example, the lower surface includes a downwardly extending ridge that traverses a length of the lower surface which can guide the wastewater along the lower surface toward the vertical support, or can promote the wastewater to drop down to the next evaporation shelf. As previously mentioned, the evaporation fins can be spaced apart so that when water is loaded thereon, a vertical water column is formed as a result of a surface tension of the water between the evaporation fins. Example spacing between evaporation fins can be from 0.2 cm to 1 cm, but more typically from 0.3 cm to 0.7 cm. Likewise, the evaporation fins can include a flat, horizontal upper surface having the shape of an airfoil in cross-section such that when the vertical water column forms, a vertical water column has the shape of an airfoil.

In accordance with additional examples, the flow path can continue from the second upper surface around a second beveled side rim and onto a downward facing second lower surface of the second evaporation shelf, along the second lower surface and onto the second evaporation fins of a second vertical support column, and from the second evaporation fins onto a third upper surface of a third evaporation shelf positioned beneath the second evaporation shelf. In one example, this can continue for at least four (4) vertically stacked evaporation shelves that are spaced apart by support columns. The support columns can also be configured with evaporation fins that deliver at least a portion of the wastewater from evaporation shelf to evaporation shelf. In additional detail, the method can also include moving contaminants along the flow path while the water is evaporating therefrom, thus causing the contaminants to move generally downward while increasing in concentration.

Turning now to the various industries that can benefit from the technology described herein, essentially any industry that generates wastewater and for which there would be a desire or motivation to separate the "waste" from the water can benefit from the evaporation panels, systems, sub-assemblies, assemblies, and methods described herein. In some instances, there may be environmental reasons to separate waste or contaminants from produced or other wastewater, and in other instances, there may be government regulations that may require or encourage "cleanup" after generating wastewater.

More specifically, examples of wastewater ponds/bodies of water generated by industry (or otherwise) that can benefit from using the evaporation panel systems and assemblies of the present disclosure include cleanup of the following bodies of water and/or associated waste: slag ponds such as those generated in mining, sewage ponds including that associated with utilities, oil wastewater, lithium ponds, gray water including treatment of city water, mining wastewater, wastewater associated with cooling towers, dairy farm pond waste, olive oil pond waste, mining tailings, leaching pond waste, uranium mining wastewater, thermoelectric/cooling wastewater, salt water evaporation, artificial lake remediation, wastewater removal at military installations, water remediation from produce production with chemical additions used for growth and bug kill, etc.

In one specific example, produced water can be particularly troublesome in the oil and gas industry, where oil and/or gas reservoirs often include water as well as hydrocarbons, sometimes in a zone that lies under or over the oil and/or gas hydrocarbons to be recovered, and sometimes in the same zone with the oil and/or gas hydrocarbons. Furthermore, oil wells often produce large volumes of water with the oil and/or gas. In other examples, sometimes to achieve a desired level of hydrocarbon recovery, water flooding, steam flooding, $CO_2$ flooding, etc. can often be used where water is injected into reservoirs to generate pressure to help force the oil to the production wells. The injected water, steam, etc., eventually reaches production wells, and particularly in the later stages of water flooding, a produced water proportion of the total hydrocarbon production can increase. Regardless, produced water can be present in recovered oil and/or gas Produced water is considered an industrial waste and coal seam gas (CSG) producers may want to dispose of produced water in an environmentally sound manner. In accordance with examples of the present disclosure, the wastewater "disposal" can thus be carried out by evaporation using an evaporation panel assembly and/or a wastewater evaporative separation system, such as that shown and described herein, and in particular detail in FIGS. 33 to 36, for example.

In further detail, using oil recovery at a single wellhead as an example, oil and water (and often some natural gas) can be brought up to the surface together as mixture during operation of the wellhead. In some wells, there may be a lot of water present, e.g., 90 wt % or more, and in other examples, there may be very little water present, e.g., 10 wt % or less. Thus, there can be varied mixtures of oil and water. Furthermore, there can also be various volume flows of the oil and water mixtures from a particular well, which can produce more water because of the large volume of the liquid mixture. Once collected in this form, the hydrocarbon fractions (natural gas, oil, etc.) can be separated conventionally, such as on-site in a separation vessel. For example, the hydrocarbon and water admixture (which can include various impurities such as salts, paraffin, solid particulates, undesired longer chained hydrocarbons, etc.) can be phase separated to form an upper hydrocarbon phase layer within the vessel and a lower wastewater phase layer therebeneath. Natural gas may also be collected above the hydrocarbon phase layer. Separation speeds may be enhanced using heat or other process to assist with breaking up the hydrocarbon and water admixture (which also includes other contaminants). Natural gas can also be collected from a top portion of the vessel if desired.

The evaporation panel assemblies and wastewater evaporative separation systems described herein can be relevant to what to do with the wastewater (with its contaminants) once it is separated from the oil, natural gas, and other hydrocarbons that may not remain in the wastewater. Rather than injecting the wastewater back into the earth, or rather than trucking the wastewater away to a remote wastewater pond, which can be expensive and time consuming, the wastewater collected from the bottom of the separation vessel can be treated as set forth herein. For example, the wastewater can be delivered to a wastewater pond or other body of wastewater, and in some instances, can be delivered on-site, right at or near the oil well without the need for trucking the wastewater away. A wastewater pond can exist or be provided (dug and lined, for example) that is close enough to the well that the wastewater from the bottom of the separation vessel can be gravity fed or pumped to the wastewater pond for processing.

Thus, a wastewater evaporative separation system, including at least some of the wastewater delivery system components as well as one or more evaporation panel assemblies described herein, can be used to remediate or treat the wastewater and separate the contaminants therefrom. In some instances, this can be done on-site without the need of trucking the wastewater away to remote site, but trucking can also be used if the wastewater pond or body of wastewater is at a remote location. Again, the wastewater delivery system can include structures and components (other than the evaporation panel assembly itself) used to deliver and recirculate wastewater to the evaporation panel assembly, including various components described with respect to FIG. 33 and/or elsewhere herein, e.g., computers, wireless or wired communication, backup generators, power supplies, valves, sensors, timers, fluid directing pipes or open canals, pumps, sprayer nozzles, sprinklers, distribution pan(s) or troughs, perforated platforms, suspended platforms, platforms, floating platforms, pond liners, hoses, and/or wastewater vessels, etc. The one or more evaporation panel assemblies can include assembly structures described generally herein, but can be shown more specific example at FIGS. 34-36.

For clarity, a specific on-site remediation or evaporative separation example can be considered at an oil or gas well is provided as follows. A mixture of oil, water, natural gas, and salt (and other) contaminants is recovered from an oil well and collected in a separation chamber. The water can be separated from the oil and natural gas by phase separating the water and many of the contaminants from the oil, leaving a wastewater or produced water at a bottom portion of the vessel. The oil and gas can be collected conventionally. However, the wastewater at the bottom can be gravity fed or pumped to a nearby wastewater pond that can be shallow or relatively deep, e.g., 2 feet to 30 feet. The wastewater can then be pumped to an upper surface of the evaporation panel assembly using one or more pump(s), fluid directing pipes, and a delivery device, such as one or more distribution pan, one or more series of distribution troughs, one or more sprayer nozzles, one or more sprinkler heads, etc. The wastewater can cascade down the evaporation panel assembly as described herein in great detail (including variants thereof). The water at the bottom of the evaporation panel assembly is now more concentrated with the contaminants than it was at the top because some of the water has been evaporated from the wastewater. At the bottom, the wastewater can be returned to the wastewater pond, which can be directly therebeneath, or if adjacent to the wastewater pond, collection topography beneath the evaporation panel assembly made of concrete, liner material, plastic, wood, or other material can be used to return the more concentrated wastewater back to the wastewater pond, e.g., such as by using fluid directing pipes or open canals. There, the wastewater is then recirculated back to the top of the evaporation panel to be repeated until the wastewater is sufficiently evaporated so that a thickened sludge-like material remains to be disposed of accordingly. Thus, rather than using daily semi-trucks to haul away (and remotely treat) the wastewater, a small truck could be used much less frequently to collect a much more concentrated contaminant sludge on an occasional basis. Furthermore, sludge removal can be minimized even more because each day (or other time increment), as water is collected from the separation vessel, it can be gravity fed into the same wastewater pond, thereby diluting the recently concentrated wastewater, and essentially providing a continuous flow of wastewater to be treated on a daily (or other incremental or continuous) basis. Thus, if the wastewater pond is 24 feet deep for example, and the wastewater is being treated by the evaporation panel assembly and new wastewater is being loaded continually or periodically, there may not be a need to collect concentrated sludge on more than a monthly basis, yearly basis, or perhaps over a period of a decade or more, depending on the water content produced, the size of the evaporation panel assembly, the ambient weather conditions, etc.

Thus, in one example, a single oil or gas wellhead can be associated with one or more evaporation panel assemblies and one or more source bodies of wastewater for cycling the wastewater through the evaporation panel assembly. If the evaporation panel assembly is efficient enough to handle all of the produced wastewater for that specific well, trucking away the wastewater can be eliminated or significantly reduced. It may also be that a single evaporation panel assembly is efficient enough to handle multiple oil or gas wellheads, and thus, the evaporation panel assembly can be positioned therebetween. Likewise, groups of evaporation panel assemblies can be used for high producing wellheads that produce a great deal of water, such as that shown in FIGS. 35 and 36 (two and four evaporation panel assemblies, respectively). As examples, if an oil or gas wellhead produces a significant amount of wastewater, then an evaporation panel assembly that is about 200 feet wide by 200 feet deep by 40 feet high can be built to treat the wastewater. If, on the other hand, an oil or gas wellhead produces very little wastewater, then an evaporation panel assembly that is about 50 feet wide by 50 feet deep by 20 feet high can be built to treat the wastewater. These are only examples of relative sizes, but it should be noted that one of the advantages of the systems and methods of the present disclosure is the ability to build an evaporation panel assembly that meets the needs of that particular site, taking into account wastewater volume, available footprint on-site to build the infrastructure, proximity of adjacent wellheads, the space available to receive oil trucks for carrying away the crude oil, etc. For example, oil trucks or some other system would still be provided room to collect and carry away the crude oil, but as long as there is the space to receive the oil trucks, etc., the evaporation panel assemblies could be positioned anywhere that is convenient and/or efficient. If the footprint is small, for example, and the water production is high, a 75 foot by 75 foot by 75 foot evaporation panel assembly may be able to be safely constructed and used, depending on the strength of the relative strength of the evaporation panels and/or the assembly design chosen.

With respect to the separation of the wastewater from undesirable content, in some cases, wastewater (or water that is not pure and has material to be separated therefrom) can also include material that may be desirable to collect. Thus, the term "wastewater" does not exclude the reclamation of desirable material from water, such as desirable salts, metal particulates, etc. Furthermore, even though the "sludge" described in the above example is considered a contaminant, it can be further processed to some good use, such as by allowing it to degrade over a period of months and admixing with manure or other components to generate a fertilizer or other useful compositions.

A similar approach to that described above with respect to the oil and gas industry could be implemented in any of the other industries described herein, as well as any other industry that may not have been mentioned, but which would be benefit from the separation of salts, solids, and/or other materials wastewater. One specific example is the mining, where a wastewater pond or other vessel and an evaporation panel assembly (and appropriate pumping and distributing equipment) could be delivered and built on-site at a mine, and the contaminated wastewater that may be produced therefrom can be treated onsite, in some instances without the need for high volume trucking away of the wastewater, as described above.

While the above examples, description, and drawings are illustrative of the principles of the present technology in one or more particular applications, it will be apparent to those of ordinary skill in the art that numerous modifications in form, usage and details of implementation can be made without the exercise of inventive faculty, and without departing from the principles and concepts of the present disclosure.

What is claimed is:

1. An evaporation panel system, comprising a plurality of evaporation panels, wherein a first evaporation panel and a second evaporation panel of the plurality of evaporation panels each include:
   evaporation shelves; and
   support columns to support and separate the evaporation shelves, wherein at least a portion of the support columns includes evaporation fins so that wastewater is loadable along the support column,
   and wherein the first evaporation panel and the second evaporation panel are releasably connectable to one another to form a sub-assembly.

2. The evaporation panel system of claim 1, wherein support columns including evaporation fins comprise fins that are vertically aligned and spaced apart so that when wastewater is received at the support column, a vertical water column along the evaporation fins is formed.

3. The evaporation panel system of claim 1, wherein the evaporation fins have a shape of a perpendicular cross-section of an airfoil taken from a leading edge to a trailing edge thereof.

4. The evaporation panel system of claim 1, wherein the plurality of evaporation panels further includes a third evaporation panel which also includes evaporation shelves and support columns configured the same as the first evaporation panel and the second evaporation panel, and wherein the third evaporation panel is releasably connectable to the first evaporation panel and the second evaporation panel to become a part of the sub-assembly.

5. The evaporation panel system of claim 1, wherein the plurality of evaporation panels each further includes:
   a plurality of female-receiving openings which are individually bordered by two evaporation shelves and two support columns; and
   a plurality of male connectors positioned at lateral ends of both the first evaporation panel and the second evaporation panel.

6. The evaporation panel system of claim 5, wherein individual male connectors of the first evaporation panel are compressible and insertable into individual female-receiving openings of the second evaporation panel to join the first evaporation panel orthogonally with the second evaporation panel.

7. The evaporation panel system of claim 1, wherein the plurality of evaporation panels are unitary monolithic plastic parts.

8. The evaporation panel system of claim 1, wherein multiple evaporation panels of the plurality of evaporation panels comprise a plastic material, and the plastic material is surface treated using a reactive fluorine gas process to generate a fluoro-oxidated surface having a surface depth from 10 nm to 20 µm and a surface energy from 60 dyne/cm to 75 dyne/cm.

9. The evaporation panel system of claim 1, wherein the first evaporation panel, the second evaporation panel, and additional evaporation panels of the same configuration as the first evaporation panel and the second evaporation panel are joined together to form the sub-assembly, wherein the sub-assembly includes a unit structure that is about one evaporation panel wide, about one evaporation panel deep, and about one evaporation panel high.

10. The evaporation panel system of claim 9, wherein the sub-assembly includes a comb-shaped sub-assembly or a pi-shaped sub-assembly with an evaporation panel spine and from 2 to 10 orthogonally connected evaporation panel teeth.

11. The evaporation panel system of claim 9, comprising the sub-assembly and a plurality of additional sub-assemblies laterally joined together to form an evaporation panel assembly.

12. The evaporation panel system of claim 11, wherein the evaporation panel assembly includes at least 4 pi-shaped sub-assemblies joined together to form a support beam assembly.

13. The evaporation panel system of claim 11, wherein the evaporation panel assembly includes multiple vertically stacked levels of sub-assemblies that laterally joined together on each of multiple vertically stacked levels.

14. The evaporation panel assembly of claim 11, wherein the evaporation panel assembly includes one or more features selected from a stairway, a safety wall, a passageway, an open room, or a bench, and wherein the one or more features are formed using a plurality of evaporation panels or a plurality of evaporation panel sub-assemblies.

15. A method of assembling the evaporation panel system of claim 1, comprising:
   orthogonally orienting the first evaporation panel with respect to the second evaporation panel; and
   releasably joining the first evaporation panel with the second evaporation panel to form an evaporation panel sub-assembly.

16. The method of claim 15, wherein releasably joining the first evaporation panel with the second evaporation panel forms a T-shaped sub-assembly, an asymmetric T-shaped sub-assembly, or an L-shaped sub-assembly.

17. The method of claim 16, further comprising releasably joining additional evaporation panels with the first evaporation panel or the second evaporation panel to form a comb-shaped sub-assembly or a pi-shaped sub-assembly including from 3 to 12 evaporation panels.

18. The method of claim 17, further comprising firming a second evaporation panel sub-assembly, wherein the evaporation panel sub-assembly is joined with the second evaporation panel sub-assembly to form a first level of an evaporation panel assembly.

19. The method of claim 18, further comprising stacking a second level of laterally joined evaporation panel sub-assemblies on top of the first level to form a multi-level evaporation panel assembly.

20. The method of claim 15, wherein the evaporation fins are spaced apart so that when wastewater is loaded at individual support columns, the evaporation fins receive the wastewater and form a vertical water column along the evaporation fins.

\* \* \* \* \*